US010979200B2

(12) United States Patent
Yang et al.

(10) Patent No.: US 10,979,200 B2
(45) Date of Patent: Apr. 13, 2021

(54) ACKNOWLEDGMENT FEEDBACK FOR MULTIPLE ACTIVE DOWNLINK SEMI-PERSISTENT SCHEDULING CONFIGURATIONS

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/880,226

(22) Filed: May 21, 2020

(65) Prior Publication Data

US 2020/0374089 A1 Nov. 26, 2020

Related U.S. Application Data

(60) Provisional application No. 62/852,542, filed on May 24, 2019, provisional application No. 62/867,696, (Continued)

(51) Int. Cl.
*H04L 5/00* (2006.01)
*H04L 1/18* (2006.01)
*H04W 72/04* (2009.01)

(52) U.S. Cl.
CPC .......... *H04L 5/0055* (2013.01); *H04L 1/1854* (2013.01); *H04L 5/001* (2013.01); *H04W 72/042* (2013.01); *H04W 72/044* (2013.01)

(58) Field of Classification Search
None
See application file for complete search history.

(56) References Cited

U.S. PATENT DOCUMENTS 9,362,998 B2 * 6/2016 He .................. H04B 7/0417
10,039,087 B2    7/2018 Nayeb Nazar et al.
(Continued)

OTHER PUBLICATIONS

Nokia et al.,"Support for SPS Periodicities below a Slot", 3GPP TSG RAN WG1 Meeting #97, 3GPP Draft; R1-1906758_HARQ Impact of Short SPS_FINAL, 3rd Generation Partnership Project (3GPP), Mobile Competence Centre ; 650, Route Des Lucioles ; F-06921 Sophia-Antipolis Cedex ; France, val. RAN WG1, No. Reno, NV, USA; May 13, 2019-May 17, 2019 May 13, 2019 (May 13, 2019), 8 Pages, XP051728209, Retrieved from the Internet: URL: http://www.3gpp.org/ftp/Meetings%5F3GPP%5FSYNC/RAN1/Docs/R1%2D1906758%2Ezip [retrieved on May 13, 2019], p. 2, Paragraph 2.1—p. 5; figures 1, 2.
(Continued)

*Primary Examiner* — Diane L Lo
(74) *Attorney, Agent, or Firm* — Holland & Hart LLP

(57) ABSTRACT

Methods, systems, and devices for wireless communications are described. A base station may configure uplink resources within a slot to enable a user equipment (UE) to transmit an acknowledgment (ACK) feedback message for multiple downlink semi-persistent scheduling (SPS) configurations. For example, the base station may transmit an additional configuration to the UE that indicates uplink resources that the UE can use to transmit acknowledgment feedbacks for multiple downlink messages received according to the SPS configurations, where the UE determines which uplink resource to use based on a number of acknowledgment information bits to be transmitted for the acknowledgment feedback message. For example, if the number of acknowledgment information bits is below a threshold value, the UE may use a first uplink resource configured by the base station. Alternatively, if the number of acknowledgment information bits is above the threshold value, the UE may use a second uplink resource.

29 Claims, 24 Drawing Sheets

Related U.S. Application Data filed on Jun. 27, 2019, provisional application No. 62/891,086, filed on Aug. 23, 2019.

(56) References Cited

U.S. PATENT DOCUMENTS

| | | | |
|---|---|---|---|
| 10,237,042 B2 | 3/2019 | Fan et al. | |
| 10,517,096 B2 | 12/2019 | Lyu | |
| 2011/0243066 A1* | 10/2011 | Nayeb Nazar | H04L 1/0057 |
| | | | 370/328 |
| 2015/0195072 A1* | 7/2015 | Seo | H04L 1/1614 |
| | | | 370/329 |
| 2018/0048994 A1* | 2/2018 | Kwon | H04W 72/1263 |
| 2018/0092122 A1* | 3/2018 | Babaei | H04W 72/14 |
| 2018/0160445 A1* | 6/2018 | Babaei | H04W 72/14 |
| 2019/0074935 A1* | 3/2019 | Babaei | H04W 72/0453 |
| 2020/0228248 A1* | 7/2020 | Islam | H04L 1/1854 |

OTHER PUBLICATIONS

Partial International Search Report—PCT/US2020/034227—ISA/EPO—dated Sep. 2, 2020.

Huawei., et al., "Discussion on DL SPS Enhancement", 3GPP Draft, R1-1906063, 3GPP TSG RAN WG1 Meeting #97, 3rd Generation Partnership Project (3GPP), Mobile Competence Centre, 650, Route Des Lucioles, F-06921 Sophia-Antipolis Cedex, France vol. RAN WG1, No. Reno, USA; May 13, 2019-May 17, 2019, May 13, 2019 (May 13, 2019), XP051727520, 4 Pages, Retrieved from the Internet: URL:http://www.3gpp.org/ftp/Meetings%5F3GPP%5FSYNC/RAN1/Docs/R1%2D1906063%2Ezip [retrieved on May 13, 2019] p. 3.

International Search Report and Written Opinion—PCT/US2020/034227 -ISA/EPO—dated Nov. 19, 2020.

NTT Docomo., et al., "Physical Layer Enhancements for DL SPS," 3GPP Draft, 3GPP TSG RAN WG1 #97, R1-1906219, 3rd Generation Partnership Project (3GPP), Mobile Competence Centre, 650, Route Des Lucioles, F-06921 Sophia-Antipolis Cedex, France, vol. RAN WG1. No. Reno, USA, May 13, 2019-May 17, 2019, May 13, 2019 (May 13, 2019), XP051727673, 7 Pages, Retrieved from the Internet: URL: http://www.3gpp.org/ftp/Meetings%5F3GPP%5FSYNC/RAN1/Docs/R1%2D1906219%2Ezip, http://www.3gpp.org/ftp/Meetings%5F3GPP%5FSYNC/RAN1/Docs/R1%2D1906219%2Ezip [retrieved on May 4, 2019], The Whole Document, Section 2, Section 4 figures 1. 2, Paragraph [0004].

* cited by examiner

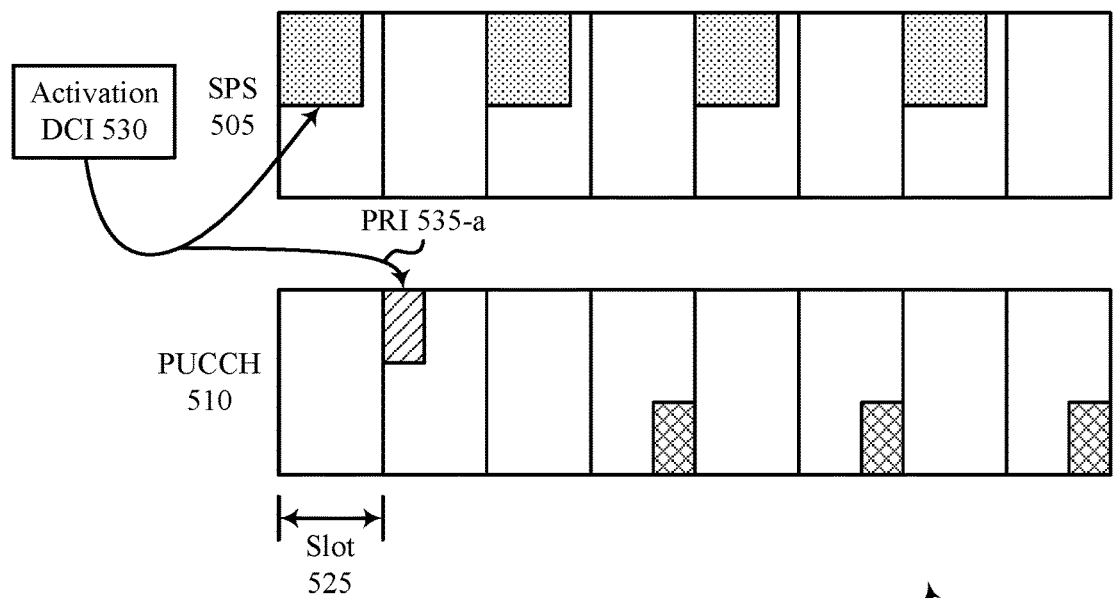
FIG. 5A
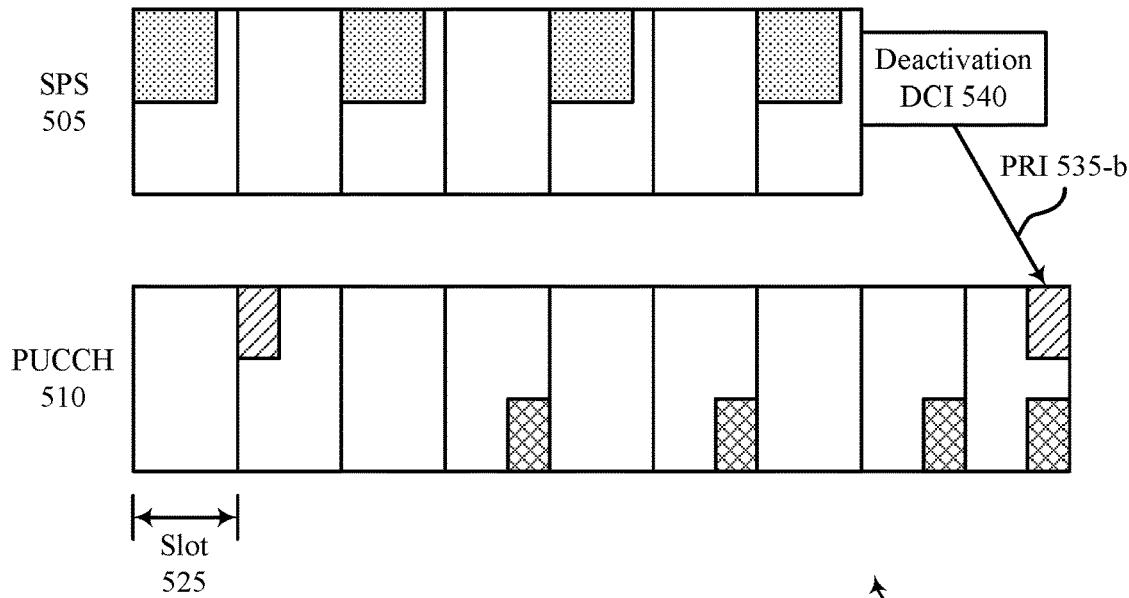
FIG. 5B
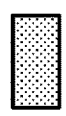 PDSCH 515
 ACK 520-a for SPS Configuration
 ACK 520-b on Indicated PUCCH Resource

ACKNOWLEDGMENT FEEDBACK FOR MULTIPLE ACTIVE DOWNLINK SEMI-PERSISTENT SCHEDULING CONFIGURATIONS

CROSS REFERENCE

The present Application for Patent claims the benefit of U.S. Provisional Patent Application No. 62/852,542 by YANG et al., entitled "ACKNOWLEDGMENT FEEDBACK FOR MULTIPLE ACTIVE DOWNLINK SEMI-PERSISTENT SCHEDULING CONFIGURATIONS," filed May 24, 2019, and the benefit of U.S. Provisional Patent Application No. 62/867,696 by YANG et al., entitled "ACKNOWLEDGMENT FEEDBACK FOR MULTIPLE ACTIVE DOWNLINK SEMI-PERSISTENT SCHEDULING CONFIGURATIONS," filed Jun. 27, 2019, and the benefit of U.S. Provisional Patent Application No. 62/891,086 by YANG et al., entitled "ACKNOWLEDGMENT FEEDBACK FOR MULTIPLE ACTIVE DOWNLINK SEMI-PERSISTENT SCHEDULING CONFIGURATIONS," filed Aug. 23, 2019, assigned to the assignee hereof, and expressly incorporated by reference herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may transmit a downlink message to a UE, where the UE transmits acknowledgment feedback indicating whether the downlink message is received correctly or not. For example, if the downlink message is received and decoded correctly by the UE, the UE may transmit a positive acknowledgment (ACK) in the acknowledgment feedback to the base station. Alternatively, if the downlink message is not received or decoded correctly by the UE, the UE may transmit a negative acknowledgment (NACK) in the acknowledgment feedback to the base station, and the base station may perform a mitigative action based on receiving the NACK feedback message (e.g., retransmit the downlink message, increase transmission power for the downlink message, etc.). However, in some cases, the UE may receive multiple downlink messages for which the UE is to provide acknowledgment feedback, which may cause collisions for the acknowledgment feedback and issues for the UE that is to prepare the acknowledgment feedback for the multiple downlink messages.

SUMMARY

The described techniques relate to improved methods, systems, devices, and apparatuses that support acknowledgment (ACK) feedback (e.g., positive ACK/negative ACK (NACK) feedback, hybrid automatic repeat request (HARD)-ACK feedback, HARQ-ACK information feedback, etc.) for multiple active downlink semi-persistent scheduling (SPS) configurations. Generally, the described techniques provide for a user equipment (UE) to receive a configuration of control channel resources (e.g., physical uplink control channel (PUCCH) resources) for multiple SPS configurations, where the control channel resources may be used by the UE to transmit ACK feedback for downlink signals received according to the multiple SPS configurations. For example, the UE may receive a first downlink signal (e.g., physical downlink shared channel (PDSCH)) according to a first SPS configuration and a second downlink signal according to a second SPS configuration, where ACK information for each downlink signal is scheduled to be transmitted in a same slot. Accordingly, the UE may select a control channel resource (e.g., set of control channel resources) from the configuration of control channel resources based on the ACK information to be transmitted for the first and second downlink signals (e.g., based on a number of ACK information bits to be transmitted) and may transmit the ACK information using the selected control channel resource. In some cases, the UE may compare the number of ACK information bits to a threshold number of bits (e.g., a maximum payload size) and select the control channel resource based on the comparison (e.g., select a first control channel resource if the number of ACK bits is below the threshold or a second control channel resource if the number of ACK bits is at or above the threshold). Additionally or alternatively, the UE may use a configured control channel resource for an SPS configuration for transmitting the ACK information if one downlink signal associated with the SPS configuration is received.

In some cases, the UE may receive a third downlink signal according to a dynamic configuration (e.g., a dynamic PDSCH, for example configured according to downlink control information (DCI)). Accordingly, the UE may identify a codebook and select the control channel resource for transmitting ACK information for the first, second, and third downlink signals based on dynamically receiving the third downlink signal. Additionally, the UE may delay transmitting ACK information for a downlink signal based on a slot in which the ACK information would otherwise be sent being unavailable for the transmission and may transmit the ACK information in a next available slot. In some cases, the UE may combine (e.g., multiplex) the ACK information with subsequent ACK information that was scheduled to be transmitted in the next available slot. Additionally, a base station may perform similar techniques for selecting a control channel resource that the UE may use for transmitting ACK information for downlink signals transmitted to the UE according to the multiple SPS configurations (e.g., and for delaying the ACK feedback). In some cases, the base station may transmit the configuration of control channel resources that the UE can use for transmitting the ACK information with configurations for each of the multiple SPSs or with a configuration for the control channel resources (e.g., a PUCCH configuration).

A method of wireless communication at a UE is described. The method may include receiving a configuration identifying a plurality of sets of control channel resources for a plurality of SPS configurations, the plurality of sets of control channel resources including at least one set corresponding to multiple of the plurality of SPS configurations; receiving a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot; selecting, based on a number of ACK information bits for the first downlink signal and the second downlink signal, a set of control channel resources of the plurality of sets of control channel resources identified by the received configuration; and transmitting the ACK information bits to the base station using the selected set of control channel resources.

An apparatus for wireless communication at a UE is described. The apparatus may include a processor, memory coupled with the processor, and instructions stored in the memory. The instructions may be executable by the processor to cause the apparatus to receive a configuration identifying a plurality of sets of control channel resources for a plurality of SPS configurations, the plurality of sets of control channel resources including at least one set corresponding to multiple of the plurality of SPS configurations; to receive a first downlink signal according to a first SPS configuration of the plurality of SPS configurations and a second downlink signal according to a second SP configuration of the plurality of SPS configurations, where ACK information for the first downlink signal and the second downlink signal are scheduled to be transmitted during a slot; to select, based on a number of ACK information bits for the first downlink signal and the second downlink signal, a set of control channel resources of the plurality of sets of control channel resources identified by the received configuration; and to transmit the ACK information bits to the base station using the selected set of control channel resources.

Another apparatus for wireless communication at a UE is described. The apparatus may include means for receiving a configuration identifying a plurality of sets of control channel resources for a plurality of SPS configurations, the plurality of sets of control channel resources including at least one set corresponding to multiple of the plurality of SPS configurations; means for receiving a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot; means for selecting, based on a number of ACK information bits for the first downlink signal and the second downlink signal, a set of control channel resources of the plurality of sets of control channel resources identified by the received configuration; and means for transmitting the ACK information bits to the base station using the selected set of control channel resources.

A non-transitory computer-readable medium storing code for wireless communication at a UE is described. The code may include instructions executable by a processor to receive a configuration identifying a plurality of sets of control channel resources for a plurality of SPS configurations, the plurality of sets of control channel resources including at least one set corresponding to multiple of the plurality of SPS configurations; to receive a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot; to select, based on a number of ACK information bits for the first downlink signal and the second downlink signal, a set of control channel resources of the plurality of sets of control channel resources identified by the received configuration; and to transmit the ACK information bits to the base station using the selected set of control channel resources.

Some examples of the method, apparatuses, and non-transitory computer-readable medium described herein may further include operations, features, means, or instructions for receiving, from the base station, the plurality of SPS configurations, including the first SPS configuration and the second SPS configuration.

In some examples of the method, apparatuses, and non-transitory computer-readable medium described herein, selecting the set of control channel resources may include operations, features, means, or instructions for comparing the number of ACK information bits to a threshold number of bits, and selecting the set of control channel resources from among the plurality of sets of control channel resources based on the comparing.

In some examples of the method, apparatuses, and non-transitory computer-readable medium described herein, transmitting the ACK information bits may include operations, features, means, or instructions for identifying a control channel format to use to transmit the ACK information bits, and transmitting the ACK information bits to the base station according to the identified control channel format using the selected set of control channel resources.

In some examples of the method, apparatuses, and non-transitory computer-readable medium described herein, the received configuration may further identify the threshold number of bits.

In some examples of the method, apparatuses, and non-transitory computer-readable medium described herein, the threshold number of bits may include two bits.

Some examples of the method, apparatuses, and non-transitory computer-readable medium described herein may further include operations, features, means, or instructions for receiving, in the slot, a third downlink signal scheduled according to a dynamic configuration.

Some examples of the method, apparatuses, and non-transitory computer-readable medium described herein may further include operations, features, means, or instructions for receiving the first SPS configuration and the second SPS configuration in radio resource control (RRC) signaling, and receiving the dynamic configuration in DCI.

Some examples of the method, apparatuses, and non-transitory computer-readable medium described herein may further include operations, features, means, or instructions for identifying a type of codebook configured for the UE, the type of codebook being one of a semi-static codebook or a dynamic codebook, where the number of ACK bits may be determined based on the identified type of codebook.

Some examples of the method, apparatuses, and non-transitory computer-readable medium described herein may further include operations, features, means, or instructions for receiving one or more dynamically scheduled downlink signals according to the dynamic configuration, where the dynamically scheduled downlink signals includes an indication of corresponding acknowledgment messages to be transmitted for the dynamically scheduled downlink signals, combining the acknowledgment information bits for the first downlink signal and the second downlink signal with the acknowledgment messages to be transmitted for the dynamically scheduled downlink signals, and transmitting, to the base station, the combined acknowledgment information bits with the acknowledgment messages to be transmitted for the dynamically scheduled downlink signals based on an acknowledgment codebook.

In some examples of the method, apparatuses, and non-transitory computer-readable medium described herein, the acknowledgment codebook may include a semi-static codebook based on a first occasion that the first downlink signal is received and a second occasion that the second downlink signal is received, where the acknowledgment information bits for the first downlink signal and the second downlink signal may be combined with the acknowledgment messages to be transmitted for the dynamically scheduled downlink signals based on the semi-static codebook.

Some examples of the method, apparatuses, and non-transitory computer-readable medium described herein, the acknowledgment codebook may include a dynamic codebook (e.g., based on a downlink assignment index in an activation message for the first SPS configuration), where the acknowledgment information bits for the first downlink signal and the second downlink signal may be appended to the acknowledgment messages to be transmitted for the dynamically scheduled downlink signals based on the dynamic codebook.

In some examples of the method, apparatuses, and non-transitory computer-readable medium described herein, transmitting the ACK information bits may include operations, features, means, or instructions for identifying a first slot for transmitting the ACK information bits using the selected set of control channel resources, determining that at least one symbol in the selected set of control channel resources in the identified first slot may be unavailable for transmitting the ACK information bits, determining that a second slot may be a next available slot for transmitting ACK information bits, and transmitting the ACK information bits in the second slot based on the second slot being the next available slot.

Some examples of the method, apparatuses, and non-transitory computer-readable medium described herein may further include operations, features, means, or instructions for identifying the second slot for transmitting the ACK information bits for the one of the SPS configurations, where the second slot includes the slot during which the first downlink signal and the second downlink signal may be scheduled to be transmitted, combining ACK information for the first downlink signal received according to the first SPS configuration and the second downlink signal received according to the one of the plurality of SPS configurations, and determining, for the combined ACK information, a set of control channel resources from the plurality of sets of control channel resources.

In some examples of the method, apparatuses, and non-transitory computer-readable medium described herein, transmitting the ACK information bits in the second slot based on the second slot being the next available slot further may include operations, features, means, or instructions for identifying a threshold number of slots allowable to delay transmitting the ACK information, and transmitting the ACK information bits in the second slot based on the second slot being the next available slot and the second slot being less than or equal to the threshold number of slots.

In some examples of the method, apparatuses, and non-transitory computer-readable medium described herein, the second slot may immediately follow the first slot that is unavailable.

Some examples of the method, apparatuses, and non-transitory computer-readable medium described herein may further include operations, features, means, or instructions for receiving, from the base station, an indication of a threshold number of slots allowable for the UE to delay transmitting the ACK information following the slot.

In some examples of the method, apparatuses, and non-transitory computer-readable medium described herein, the ACK information bits may include HARQ-ACK information bits.

In some examples of the method, apparatuses, and non-transitory computer-readable medium described herein, the individual one of the plurality of SPS configurations may be a same SPS configuration as the first SPS configuration.

In some examples of the method, apparatuses, and non-transitory computer-readable medium described herein, the individual one of the plurality of SPS configurations may be a different SPS configuration than the first SPS configuration.

In some examples of the method, apparatuses, and non-transitory computer-readable medium described herein, the plurality of SPS configurations may be configured on a set of component carriers (CCs).

In some examples of the method, apparatuses, and non-transitory computer-readable medium described herein, multiple of the plurality of SPS configurations may be active for the UE during a same time.

In some examples of the method, apparatuses, and non-transitory computer-readable medium described herein, the configuration identifying at least one set corresponding to the individual one of the plurality of SPS configurations may be received in a corresponding SPS configuration of the plurality of SPS configurations.

In some examples of the method, apparatuses, and non-transitory computer-readable medium described herein, the configuration identifying at least one set of control channel resources corresponding to the multiple of the plurality of SPS configurations may be received in a PUCCH configuration.

Some examples of the method, apparatuses, and non-transitory computer-readable medium described herein may further include operations, features, means, or instructions for determining to use a set of the at least one set of control channel resources corresponding to the multiple of the plurality of SPS configurations based on identifying that the number of ACK information bits may be greater than one.

Some examples of the method, apparatuses, and non-transitory computer-readable medium described herein may further include operations, features, means, or instructions for determining to use a set of the at least one set of control channel resources corresponding to the individual one of the plurality of SPS configurations based on identifying that the number of ACK information bits may be one.

Some examples of the method, apparatuses, and non-transitory computer-readable medium described herein may further include operations, features, means, or instructions for receiving an activation message for starting communications according to the first SPS configuration, where the first downlink signal may be received based on the activation message, identifying an uplink resource indicator in the activation message, the uplink resource indicator including an indication of an uplink resource for transmitting the ACK information bits to the base station, transmitting a first set of the ACK information bits to the base station based on the uplink resource indicator, and transmitting subsequent sets of the ACK information bits after the first set of ACK information bits based on the selected set of control channel resources.

Some examples of the method, apparatuses, and non-transitory computer-readable medium described herein may further include operations, features, means, or instructions for receiving one or more dynamically scheduled downlink signals, where the dynamically scheduled downlink signals include an indication of corresponding ACK messages to be transmitted for the dynamically scheduled downlink signals, combining the first set of the ACK information bits with the ACK messages to be transmitted for the dynamically scheduled downlink signals, and transmitting, to the base station, the combined first set of the ACK information bits with the ACK messages to be transmitted for the dynamically scheduled downlink signals based on an ACK codebook.

In some examples of the method, apparatuses, and non-transitory computer-readable medium described herein, the ACK codebook includes a semi-static codebook based on an occasion that the first downlink signal may be received or includes a dynamic codebook based on a downlink assignment index in the activation message.

Some examples of the method, apparatuses, and non-transitory computer-readable medium described herein may further include operations, features, means, or instructions for receiving a deactivation message for ending communications according to the first SPS configuration, determining an uplink resource for transmitting an ACK message based on receiving the deactivation message, and transmitting the ACK message using the determined uplink resource.

Some examples of the method, apparatuses, and non-transitory computer-readable medium described herein may further include operations, features, means, or instructions for combining the ACK message with one or more additional ACK messages from additional SPS configurations, dynamic downlink messages, or a combination thereof, and transmitting, to the base station, the combined ACK messages based on an ACK codebook.

In some examples of the method, apparatuses, and non-transitory computer-readable medium described herein, the ACK codebook includes a semi-static codebook based on one or more occasions where downlink messages may be received according to the set of SPS configurations and an occasion where the deactivation message may be received or includes a dynamic codebook based on concatenating the ACK message for the deactivation message to the ACK information bits for the first downlink signal and the second downlink signal.

In some examples of the method, apparatuses, and non-transitory computer-readable medium described herein, the determined uplink resource may include an indicated uplink resource via an uplink resource indicator included in the deactivation message (e.g., or the selected set of control channel resources).

In some examples of the method, apparatuses, and non-transitory computer-readable medium described herein, at least one SPS configuration of the plurality of SPS configurations may include a periodicity less than a length of a first slot and may further include operations, features, means, or instructions for determining a list of time-domain resource allocations (TDRAs) for receiving corresponding downlink signals for the set of SPS configurations in the first slot, determining an additional TDRA for the at least one SPS configuration that occurs in the first slot with the list of TDRAs based on the periodicity being less than the length of the first slot, determine an ACK codebook based on the list of TDRAs and the additional TDRA, and transmitting ACK messages for the corresponding downlink signals for the set of SPS configurations according to the determined ACK codebook.

Some examples of the method, apparatuses, and non-transitory computer-readable medium described herein may further include operations, features, means, or instructions for determining the ACK codebook based on a list of potential TDRAs.

Some examples of the method, apparatuses, and non-transitory computer-readable medium described herein may further include operations, features, means, or instructions for receiving, from the base station, an indication of the list of TDRAs including the additional TDRA.

In some examples of the method, apparatuses, and non-transitory computer-readable medium described herein, the indication may be received within an activation message for starting communications according to one or more SPS configurations of the set of SPS configurations.

In some examples of the method, apparatuses, and non-transitory computer-readable medium described herein, the additional TDRA may be determined based on an indicated TDRA in an activation message for starting communications according to one or more SPS configurations of the plurality of SPS configurations.

In some examples of the method, apparatuses, and non-transitory computer-readable medium described herein, the additional TDRA may be determined based on all of the TDRAs in the list of TDRAs that have a length smaller than or equal to a period of the at least one SPS configuration.

A method of wireless communication at a UE is described. The method may include receiving a plurality of SPS configurations; receiving a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot; determining an order of a set of downlink signals received according to the set of SPS configurations, the set of downlink signals including at least the first downlink signal and the second downlink signal; generating, for transmitting ACK information bits to the base station, an ACK codebook (e.g., a dynamic ACK codebook, a semi-static ACK codebook, etc.) based on the determined order of the set of downlink signals; and transmitting the acknowledgment information bits to the base station using the generated dynamic acknowledgment codebook.

An apparatus for wireless communication at a UE is described. The apparatus may include a processor, memory coupled with the processor, and instructions stored in the memory. The instructions may be executable by the processor to cause the apparatus to receive a plurality of SPS configurations; to receive a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot; to determine an order of a set of downlink signals received according to the set of SPS configurations, the set of downlink signals including at least the first downlink signal and the second downlink signal; to generate, for transmitting ACK information bits to the base station, an ACK codebook (e.g., a dynamic ACK codebook, a semi-static ACK codebook, etc.) based on the determined order of the set of downlink signals; and to transmit the acknowledgment information bits to the base station using the generated dynamic acknowledgment codebook.

Another apparatus for wireless communication at a UE is described. The apparatus may include means for receiving a plurality of SPS configurations; means for receiving a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot; means for determining an order of a set of downlink signals received according to the set of SPS configurations, the set of downlink signals including at least the first downlink signal and the second downlink signal; means for generating, for transmitting ACK information bits to the base station, an ACK codebook (e.g., a dynamic ACK codebook, a semi-static ACK codebook, etc.) based on the determined order of the set of downlink signals; and means for transmitting the acknowledgment information bits to the base station using the generated dynamic acknowledgment codebook.

A non-transitory computer-readable medium storing code for wireless communication at a UE is described. The code may include instructions executable by a processor to receive a plurality of SPS configurations; to receive a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot; to determine an order of a set of downlink signals received according to the set of SPS configurations, the set of downlink signals including at least the first downlink signal and the second downlink signal; to generate, for transmitting ACK information bits to the base station, an ACK codebook (e.g., a dynamic ACK codebook, a semi-static ACK codebook, etc.) based on the determined order of the set of downlink signals; and to transmit the acknowledgment information bits to the base station using the generated dynamic acknowledgment codebook.

In some examples of the method, apparatuses, and non-transitory computer-readable medium described herein, the determined order of the set of downlink signals may include a time-first, CC-second order.

In some examples of the method, apparatuses, and non-transitory computer-readable medium described herein, the order of the set of downlink signals may be determined based on a corresponding index of each of the set of SPS configurations and a CC index, where each of the set of SPS configurations may be configured within a same CC associated with the CC index.

In some examples of the method, apparatuses, and non-transitory computer-readable medium described herein, the determined order of the set of downlink signals may include a CC-first, time-second order.

Some examples of the method, apparatuses, and non-transitory computer-readable medium described herein may further include operations, features, means, or instructions for determining, for each transmission time interval (TTI) that a downlink signal can be received for each of the set of SPS configurations, a common index number based on a downlink serving cell with a highest subcarrier spacing (SCS), where the CC-first, time-second order may be determined based on the determined common index number.

In some examples of the method, apparatuses, and non-transitory computer-readable medium described herein, the determined order of the set of downlink signals may include a time-first, CC-second, slot-third order.

Some examples of the method, apparatuses, and non-transitory computer-readable medium described herein may further include operations, features, means, or instructions for determining, for the time-first, CC-second, slot-third order, a slot to use for the determined order based on a slot of a downlink cell with a lowest SCS, a slot duration of an uplink cell used for transmitting the ACK information bits, or a combination thereof.

Some examples of the method, apparatuses, and non-transitory computer-readable medium described herein may further include operations, features, means, or instructions for generating a semi-static ACK codebook including the ACK information bits and default values for transmission occasions where no downlink signal may be received, and extracting the ACK information bits from the semi-static ACK codebook to generate the dynamic ACK codebook, where an order of the ACK information bits may be the same for the semi-static ACK codebook and the dynamic ACK codebook.

A method of wireless communication at a base station is described. The method may include transmitting a configuration identifying a plurality of sets of control channel resources for a plurality of SPS configurations of a UE, the plurality of sets of control channel resources including at least one set corresponding to multiple of the plurality of SPS configurations; transmitting a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot; selecting, based on a number of ACK information bits for the first downlink signal and the second downlink signal, a set of control channel resources of the plurality of sets of control channel resources identified by the transmitted configuration; and receiving the ACK information bits from the UE using the selected set of control channel resources.

An apparatus for wireless communication at a base station is described. The apparatus may include a processor, memory coupled with the processor, and instructions stored in the memory. The instructions may be executable by the processor to cause the apparatus to transmit a configuration identifying a plurality of sets of control channel resources for a plurality of SPS configurations of a UE, the plurality of sets of control channel resources including at least one set corresponding to multiple of the plurality of SPS configurations; to transmit a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot; to select, based on a number of ACK information bits for the first downlink signal and the second downlink signal, a set of control channel resources of the plurality of sets of control channel resources identified by the transmitted configuration; and to receive the ACK information bits from the UE using the selected set of control channel resources.

Another apparatus for wireless communication at a base station is described. The apparatus may include means for transmitting a configuration identifying a plurality of sets of control channel resources for a plurality of SPS configurations of a UE, the plurality of sets of control channel resources including at least one set corresponding to multiple of the plurality of SPS configurations; means for transmitting a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot; means for selecting, based on a number of ACK information bits for the first downlink signal and the second downlink signal, a set of control channel resources of the plurality of sets of control channel resources identified by the transmitted configuration; and means for receiving the ACK information bits from the UE using the selected set of control channel resources.

A non-transitory computer-readable medium storing code for wireless communication at a base station is described. The code may include instructions executable by a processor to transmit a configuration identifying a plurality of sets of control channel resources for a plurality of SPS configurations of a UE, the plurality of sets of control channel resources including at least one set corresponding to multiple of the plurality of SPS configurations; to transmit a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot; to select, based on a number of ACK information bits for the first downlink signal and the second downlink signal, a set of control channel resources of the plurality of sets of control channel resources identified by the transmitted configuration; and to receive the ACK information bits from the UE using the selected set of control channel resources.

Some examples of the method, apparatuses, and non-transitory computer-readable medium described herein may further include operations, features, means, or instructions for transmitting, to the UE, the plurality of SPS configurations, including the first SPS configuration and the second SPS configuration.

In some examples of the method, apparatuses, and non-transitory computer-readable medium described herein, selecting the set of control channel resources may include operations, features, means, or instructions for comparing the determined number of ACK information bits to a threshold number of bits, and selecting the set of control channel resources from among the plurality of sets of control channel resources based on the comparing.

In some examples of the method, apparatuses, and non-transitory computer-readable medium described herein, receiving the ACK information bits may include operations, features, means, or instructions for identifying a control channel format to use to receive the ACK information bits, and receiving the ACK information bits from the UE according to the identified control channel format using the selected set of control channel resources.

In some examples of the method, apparatuses, and non-transitory computer-readable medium described herein, the transmitted configuration may further identify the threshold number of bits.

In some examples of the method, apparatuses, and non-transitory computer-readable medium described herein, the threshold number of bits may include two bits.

Some examples of the method, apparatuses, and non-transitory computer-readable medium described herein may further include operations, features, means, or instructions for transmitting, in the slot, a third downlink signal scheduled according to a dynamic configuration.

Some examples of the method, apparatuses, and non-transitory computer-readable medium described herein may further include operations, features, means, or instructions for transmitting the first SPS configuration and the second SPS configuration in radio resource control signaling, and transmitting the dynamic configuration in downlink control information.

Some examples of the method, apparatuses, and non-transitory computer-readable medium described herein may further include operations, features, means, or instructions for identifying a type of codebook configured for the UE, the type of codebook being one of a semi-static codebook or a dynamic codebook, where the number of ACK bits may be determined based on the identified type of codebook.

In some examples of the method, apparatuses, and non-transitory computer-readable medium described herein, receiving the ACK information bits may include operations, features, means, or instructions for identifying a first slot for receiving the ACK information bits using the selected set of control channel resources, determining that at least one symbol in the selected set of control channel resources in the identified first slot may be unavailable for the UE to transmit the ACK information bits, determining that a second slot may be a next available slot for the UE to transmit ACK information bits, and receiving the ACK information bits in the second slot based on the second slot being the next available slot.

Some examples of the method, apparatuses, and non-transitory computer-readable medium described herein may further include operations, features, means, or instructions for identifying the second slot for receiving the ACK information bits for the one of the SPS configurations, where the second slot includes the slot during which the first downlink signal and the second downlink signal may be scheduled to be transmitted, determining that the UE may be to combine ACK information for the first downlink signal transmitted according to the first SPS configuration and the second downlink signal transmitted according to the one of the plurality of SPS configurations, and determining, for the combined ACK information, a set of control channel resources from the plurality of sets of control channel resources.

In some examples of the method, apparatuses, and non-transitory computer-readable medium described herein, receiving the ACK information bits in the second slot based on the second slot being the next available slot further may include operations, features, means, or instructions for identifying a threshold number of slots allowable for the UE to delay transmitting the ACK information, and receiving the ACK information bits in the second slot based on the second slot being the next available slot and the second slot being less than or equal to the threshold number of slots.

In some examples of the method, apparatuses, and non-transitory computer-readable medium described herein, the second slot may immediately follow the first slot that is unavailable.

Some examples of the method, apparatuses, and non-transitory computer-readable medium described herein may further include operations, features, means, or instructions for transmitting, to the UE, an indication of a threshold number of slots allowable for the UE to delay transmitting the ACK information following the slot.

In some examples of the method, apparatuses, and non-transitory computer-readable medium described herein, the ACK information bits may include HARQ-ACK information bits.

In some examples of the method, apparatuses, and non-transitory computer-readable medium described herein, the individual one of the plurality of SPS configurations may be a same SPS configuration as the first SPS configuration.

In some examples of the method, apparatuses, and non-transitory computer-readable medium described herein, the individual one of the plurality of SPS configurations may be a different SPS configuration than the first SPS configuration.

In some examples of the method, apparatuses, and non-transitory computer-readable medium described herein, the plurality of SPS configurations may be configured on a set of CCs.

In some examples of the method, apparatuses, and non-transitory computer-readable medium described herein, multiple of the plurality of SPS configurations may be active for the UE during a same time.

In some examples of the method, apparatuses, and non-transitory computer-readable medium described herein, the configuration identifying at least one set corresponding to the individual one of the plurality of SPS configurations may be transmitted in a corresponding SPS configuration of the plurality of SPS configurations.

In some examples of the method, apparatuses, and non-transitory computer-readable medium described herein, the configuration identifying at least one set of control channel resources corresponding to the multiple of the plurality of SPS configurations may be transmitted in a PUCCH configuration.

Some examples of the method, apparatuses, and non-transitory computer-readable medium described herein may further include operations, features, means, or instructions for determining that the UE may be to use a set of the at least one set of control channel resources corresponding to the multiple of the plurality of SPS configurations based on identifying that the number of ACK information bits to be transmitted by the UE may be greater than one.

Some examples of the method, apparatuses, and non-transitory computer-readable medium described herein may further include operations, features, means, or instructions for determining that the UE to use a set of the at least one set of control channel resources corresponding to the individual one of the plurality of SPS configurations based on identifying that the number of ACK information bits to be transmitted by the UE may be one.

Some examples of the method, apparatuses, and non-transitory computer-readable medium described herein may further include operations, features, means, or instructions for transmitting an activation message for starting communications according to the first SPS configuration, where the activation message includes an uplink resource indicator that indicates an uplink resource for the UE to transmit the ACK information bits, receiving a first set of the ACK information bits from the UE based on the uplink resource indicator, and receiving subsequent sets of the ACK information bits after the first set of ACK information bits based on the selected set of control channel resources.

Some examples of the method, apparatuses, and non-transitory computer-readable medium described herein may further include operations, features, means, or instructions for transmitting a deactivation message for ending communications according to the first SPS configuration, determining an uplink resource for receiving an ACK message based on transmitting the deactivation message, and receiving the ACK message using the determined uplink resource.

In some examples of the method, apparatuses, and non-transitory computer-readable medium described herein, the determined uplink resource may include an indicated uplink resource via an uplink resource indicator included in the deactivation message or the selected set of control channel resources.

In some examples of the method, apparatuses, and non-transitory computer-readable medium described herein, at least one SPS configuration of the set of SPS configurations may include a periodicity less than a length of a first slot and may further include operations, features, means, or instructions for determining a list of TDRAs for transmitting corresponding downlink signals for the set of SPS configurations in the first slot, determining an additional TDRA for the at least one SPS configuration that occurs in the first slot with the list of TDRAs based on the periodicity being less than the length of the first slot, and receiving ACK messages for the corresponding downlink signals for the set of SPS configurations based on the TDRAs, the additional TDRA, or a combination thereof.

Some examples of the method, apparatuses, and non-transitory computer-readable medium described herein may further include operations, features, means, or instructions for transmitting, to the UE, an indication of the list of TDRAs including the additional TDRA.

In some examples of the method, apparatuses, and non-transitory computer-readable medium described herein, the indication may be received within an activation message for starting communications according to one or more SPS configurations of the set of SPS configurations.

In some examples of the method, apparatuses, and non-transitory computer-readable medium described herein, the additional TDRA may be determined based on an indicated TDRA in an activation message for starting communications according to one or more SPS configurations of the plurality of SPS configurations.

In some examples of the method, apparatuses, and non-transitory computer-readable medium described herein, the additional TDRA may be determined based on all of the TDRAs in the list of TDRAs that have a length smaller than or equal to a period of the at least one SPS configuration.

In some examples of the method, apparatuses, and non-transitory computer-readable medium described herein, the ACK information bits may be received based on a dynamic ACK codebook including the ACK information bits in an order that may be based on when each of a set of downlink signals may be transmitted for each of the set of SPS configurations, a CC that each of the set of downlink signals may be transmitted on, a slot in which each of the set of downlink signals may be transmitted, a semi-static ACK codebook, or a combination thereof.

BRIEF DESCRIPTION OF THE DRAWINGS

FIGS. 5A and 5B illustrate examples of ACK feedback configurations that support ACK feedback for multiple active downlink SPS configurations in accordance with aspects of the present disclosure.

DETAILED DESCRIPTION

Figure 1:
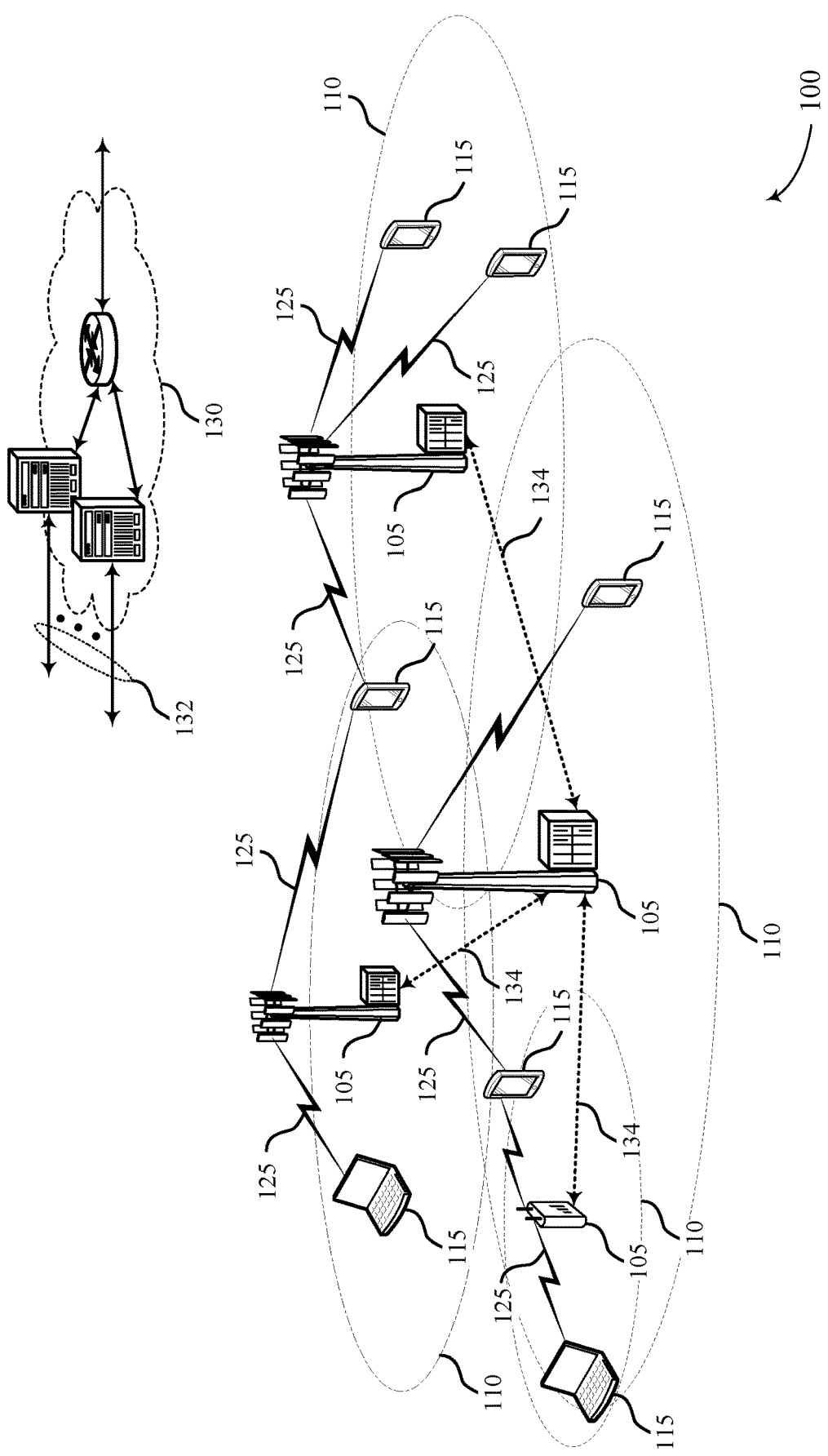
FIG. 1 illustrates an example of a system for wireless communications that supports acknowledgment (ACK) feedback for multiple active downlink semi-persistent scheduling (SPS) configurations in accordance with aspects of the present disclosure.

In some wireless communications systems, a base station may configure a user equipment (UE) for receiving periodic downlink traffic according to a semi-persistent scheduling (SPS) configuration and for transmitting acknowledgment (ACK) feedback for the periodic downlink traffic. For example, the SPS configuration may include periodic downlink messages transmitted by the base station on a physical downlink shared channel (PDSCH) every 'X' slots (e.g., every slot, every second slot, every fourth slot, etc.). Subsequently, the UE may transmit the ACK feedback on a physical uplink control channel (PUCCH) after receiving a periodic downlink message (e.g., on time-frequency resources configured by the base station, such as in a next occurring slot, two slots later, etc.). Conventionally, the base station may configure the UE with one active downlink SPS configuration per PUCCH, where the UE transmits the ACK feedback on the PUCCH for the one active downlink SPS configuration. However, in some cases, the base station may configure the UE with multiple active downlink SPS configurations per PUCCH (e.g., for multiple service types or for other reasons or implementations), such that the UE receives multiple downlink messages where multiple corresponding ACK feedback messages are configured to be transmitted simultaneously. Accordingly, the ACK feedback messages may collide at the UE, impacting the ability of the UE to transmit ACK feedback for each received downlink message.

As described herein, the base station may configure one or more PUCCH resources (e.g., via a PUCCH configuration) within an uplink slot that enable the UE to transmit an ACK feedback message for multiple downlink SPS configurations. For example, the base station may transmit an additional configuration to the UE that indicates multiple PUCCH resources that the UE can use to transmit the ACK feedback message for downlink messages received from the base station, where the UE determines which PUCCH resource to use based on a number of ACK information bits (e.g., a payload size) that are to be transmitted for the ACK feedback message. In some cases, the number of ACK information bits may correspond to the number of downlink messages received and the number of ACK feedbacks to be transmitted (e.g., one bit per downlink message/ACK feedback). If the UE multiplexes the ACK information bits for the ACK feedback message, the order of the ACK information bits may be based on a component carrier (CC) index for the downlink SPS configurations, an index for the downlink SPS configurations (e.g., a starting symbol or ending symbol for each downlink SPS configuration), based on a time each downlink SPS configuration is activated, or a combination of two or more of these. Additionally, a downlink SPS opportunity (e.g., to receive a corresponding downlink message) may be cancelled and/or an ACK feedback message may be delayed until a next available slot based on symbols originally allocated for either transmission being unavailable.

Aspects of the disclosure are initially described in the context of a wireless communications system. Additionally, aspects of the disclosure are illustrated through an additional wireless communications system, an ACK feedback configuration, an ACK feedback delay configuration, a mixed numerology configuration, and a process flow. Aspects of the disclosure are further illustrated by and described with reference to apparatus diagrams, system diagrams, and flowcharts that relate to ACK feedback for multiple active downlink SPS configurations.

FIG. 1 illustrates an example of a wireless communications system 100 that supports ACK feedback for multiple active downlink SPS configurations in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing (SCS) or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and SCS may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, a UE 115 may support downlink SPS for receiving periodic downlink traffic from a base station 105. For example, the base station 105 may transmit a grant scheduling multiple occasions (e.g., SPS occasions) for downlink receptions (e.g., an SPS configuration) that the UE 115 monitors for receiving the periodic downlink traffic, where the multiple occasions occur according to a periodic configuration (e.g., every slot, every second slot, every fourth slot, etc.). Additionally, the base station 105 may configure the UE 115 to provide ACK feedback for the periodic downlink traffic transmitted according to the SPS configuration. For example, the base station 105 may indicate resources (e.g., time-frequency resources) of an uplink channel for the UE 115 to transmit the ACK feedback. In some cases, the base station 105 may transmit the configuration information for transmitting the ACK feedback with the grant for the SPS configuration. Additionally, the resources used for transmitting the ACK feedback may occur in any slot occurring after the periodic downlink traffic is received (e.g., a next occurring slot, two slots after the downlink traffic is received, three slots after, etc.). While the periodicities and ACK feedback transmission are discussed in terms of slots above, the SPS configurations may include periodicities of less than a slot (e.g., a half-slot, a mini-slot, two OFDM symbols, etc.). For example, multiple occasions may occur for transmitting/receiving downlink traffic for an SPS configuration within a single slot (e.g., two downlink SPS occasions per slot).

In some cases, the UE 115 may support one active downlink SPS configuration per PUCCH group (e.g., per PUCCH for transmitting the ACK feedback). Accordingly, in a given slot (e.g., or in a different length TTI or other time resource), the UE 115 may generate a one bit ACK feedback message (e.g., HARQ ACK feedback message) for the downlink SPS to indicate if a periodic downlink message is received and decoded correctly. However, in other cases, the UE 115 may support multiple active downlink SPS configurations per PUCCH group simultaneously. For example, the multiple active downlink SPS configurations may be associated with multiple service and/or service types to enhance communications between the UE 115 and the base station 105. Additionally, each downlink SPS configuration may include a separate PUCCH configuration for performing (e.g., transmitting) the ACK feedback for the corresponding downlink SPS configuration.

In some cases, the ACK feedbacks for the multiple active downlink SP configurations may collide in time, causing issues for the UE 115 to prepare one or more of the ACK feedbacks. For example, if multiple ACK feedbacks occur in a same slot (e.g., the UE 115 has multiple ACK feedbacks to transmit in a same slot) and the UE 115 is configured to transmit one ACK feedback per slot, the UE 115 may not be able to prepare and transmit all of the multiple ACK feedbacks. Additionally or alternatively, if multiple ACK feedbacks occur in a same slot and corresponding PUCCH resources for the multiple ACK feedbacks are overlapping in time, the UE 115 may not be able to transmit the appropriate ACK feedback messages. Conventionally, the UE 115 may transmit the ACK feedback for whichever SPS configuration was activated first and may drop the ACK feedbacks for the later activated SPS configurations, which may increase latency and retransmissions for the later activated SPS configurations. Additionally or alternatively, the UE 115 may transmit the ACK feedback for whichever SPS configuration was activated last and drop the ACK feedback for the previously activated SPS configurations (e.g., or a separately activated SPS configuration).

Wireless communications system 100 may support efficient techniques for configuring one or more PUCCH resources within an uplink slot (e.g., via a PUCCH configuration) that enable a UE 115 to transmit an ACK feedback message for multiple downlink SPS configurations. For example, a base station 105 may transmit an additional configuration to the UE 115 that indicates multiple PUCCH resources that the UE 115 can use to transmit ACK feedbacks for multiple downlink messages received from the base station 105, where the UE 115 determines which PUCCH resource to use based on a number of ACK information bits (e.g., number of ACK feedbacks) to be transmitted for the ACK feedback message. For example, if the number of ACK information bits is below a threshold value (e.g., a maximum payload size), the UE 115 may use a first PUCCH resource configured by the base station 105. Alternatively, if the number of ACK information bits is above the threshold value, the UE 115 may use a second PUCCH resource. Additionally, a downlink SPS opportunity (e.g., to receive a corresponding downlink message) may be cancelled and/or an ACK feedback message may be delayed until a next available slot based on symbols originally allocated for either transmission being unavailable for the corresponding transmission. Based on the techniques as described herein, the UE 115 may determine a PUCCH resource to use for transmitting the ACK feedback message for the multiple downlink messages (e.g., via the PUCCH configuration from the base station 105 and from the determination of the number of ACK information bits). Additionally, the base station 105 and the UE 115 may use dynamic signaling to indicate the PUCCH resources and activating the different SPS configurations, rather than defining and using additional signaling.

Figure 2:
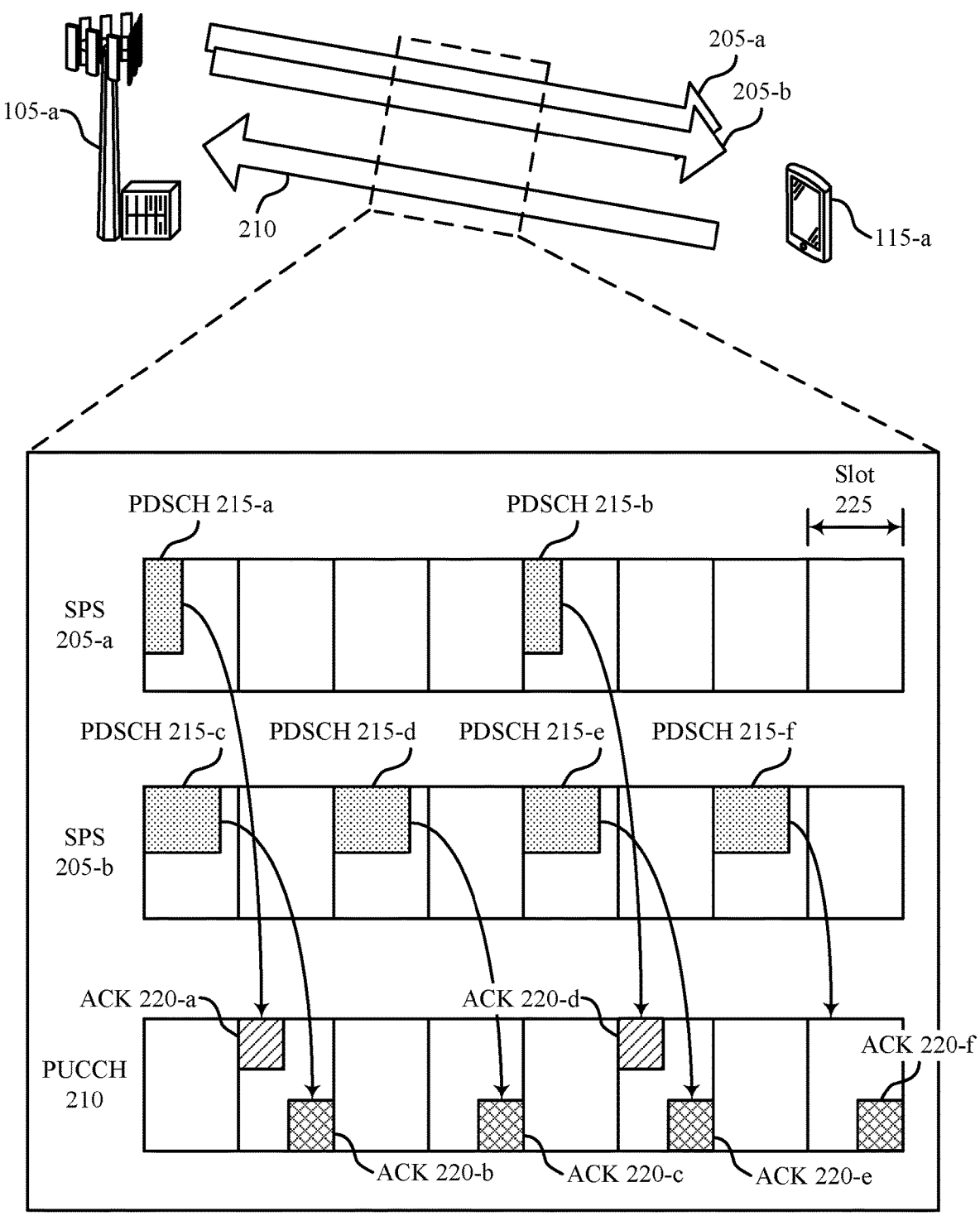
FIG. 2 illustrates an example of a wireless communications system that supports ACK feedback for multiple active downlink SPS configurations in accordance with aspects of the present disclosure.

FIG. 2 illustrates an example of a wireless communications system 200 that supports ACK feedback for multiple active downlink SPS configurations in accordance with aspects of the present disclosure. In some examples, wireless communications system 200 may implement aspects of wireless communications system 100. Wireless communication system 200 may include a base station 105-a and a UE 115-a, which may be examples of corresponding base stations 105 and UEs 115, respectively, as described above with reference to FIG. 1. In some cases, UE 115-a and base station 105-a may communicate on resources of different carriers (e.g., and/or CCs) for uplink and/or downlink transmissions.

As described herein, UE 115-a may support multiple configurations for respective downlink SPSs 205 to receive downlink messages from base station 105-a and support a single PUCCH 210 (e.g., PUCCH carrier) to transmit uplink messages to base station 105-a based on the messages received according to the SPSs 205. For example, UE 115-a may receive the downlink messages on physical downlink shared channels (PDSCHs) 215 that occur at regular intervals (e.g., in numbers of slots 225) in each SPS 205. As shown and as an illustrative example, base station 105-a may configure a first SPS 205-a with PDSCHs 215 that occur every fourth slot 225 and a second SPS 205-b with PDSCHs 215 that occur every second slot 225. While slots 225 are shown for each SPS 205, it is to be understood that the SPSs 205 may include periodicities that occur at different length intervals (e.g., other TTIs, mini-slots, etc.).

In some cases, base station 105-*a* may transmit a separate configuration (e.g., grant) for each SPS 205 (e.g., via RRC signaling). The configuration for each SPS 205 may include a periodicity for the downlink SPS 205 (e.g., an SPS downlink interval). For example, the periodicity may be 2 OFDM symbols, 7 OFDM symbols, one slot, 2 slots, 4 slots, 5 slots, 8 slots, 10 slots, 16 slots, 20 slots, 32 slots, 40 slots, 64 slots, 80 slots, 128 slots, 160 slots, 320 slots, 640 slots, etc. Additionally, the SPS configurations may indicate a number of configured processes (e.g., HARQ processes) for the SPS 205 (e.g., downlink SPS). In some cases, the number of configured processes may range from one to eight. In some cases, the SPS configurations may include resource(s) (e.g., HARQ resources) for PUCCH 210 for transmitting ACK messages (e.g., an ACK 220) for PDSCHs 215 in the corresponding SPS 205. Accordingly, base station 105-*a* (e.g., the network) may configure the resource(s) for PUCCH 210 in different formats (e.g., as format0, format1, etc.).

Accordingly, base station 105-*a* may configure PUCCH 210 to carry ACKs 220 (e.g., HARQ ACK feedback messages, ACK feedback messages, ACK feedbacks, etc.) that UE 115-*a* transmits for the PDSCHs 215. For example, UE 115-*a* may transmit ACKs 220 to indicate whether a corresponding PDSCH 215 was received and decoded successfully (e.g., an ACK if successfully received and decoded or a NACK if unsuccessfully received or decoded). In some cases, base station 105-*a* may configure UE 115-*a* to transmit an ACK 220 in a next occurring slot that a PDSCH 215 is transmitted to UE 115-*a*. Additionally or alternatively, base station 105-*a* may configure UE 115-*a* to transmit an ACK 220 a number of slots (e.g., K1 slots) after a PDSCH 215 is transmitted to UE 115-*a*. Accordingly, this number of slots may be an integer signaled in a downlink control information (DCI) message that activates the SPS 205 for the PDSCH 215 transmissions.

For example, for first SPS 205-*a*, UE 115-*a* may receive PDSCH 215-*a* in a first slot 225 and PDSCH 215-*b* in a fifth slot 225 and be configured to transmit ACK 220-*a* in a second slot 225 occurring sequentially after the first slot 225 and ACK 220-*d* in a sixth slot 225 occurring sequentially after fifth slot 225. Additionally, for second SPS 205-*b*, UE 115-*a* may receive PDSCH 215-*c*, PDSCH 215-*d*, PDSCH 215-*e*, and PDSCH 215-*f* in the first slot 225, a third slot 225, the fifth slot 225, and a seventh slot 225, respectively. Accordingly, base station 105-*a* may configure UE 115-*a* to transmit ACK 220-*b* in the second slot 225 for PDSCH 215-*c* (e.g., sequentially occurring after the first slot 225), ACK 220-*c* in a fourth slot 225 for PDSCH 215-*d* (e.g., sequentially occurring after the third slot 225), ACK 220-*e* in the sixth slot 225 for PDSCH 215-*e* (e.g., sequentially occurring after the fifth slot 225), and ACK 220-*f* in an eighth slot 225 for PDSCH 215-*f* (e.g., sequentially occurring after the seventh slot 225). Additionally or alternatively, although not shown, ACKs 220 may occur in any subsequent slot 225 (e.g., or TTI according to an integer K1) after a PDSCH 215 is transmitted by base station 105-*a* (e.g., not only a next occurring slot).

However, as can be seen, base station 105-*a* may configure UE 115-*a* to transmit more than one ACK 220 for multiple PDSCHs 215 in one or more slots 225 of PUCCH 210. For example, PDSCH 215-*a* of first SPS 205-*a* and PDSCH 215-*c* of second SPS 205-*b* may include ACK 220-*a* and ACK 220-*b*, respectively, in the second slot 225, and/or PDSCH 215-*b* of first SPS 205-*a* and PDSCH 215-*e* of second SPS 205-*b* may include ACK 220-*d* and ACK 220-*e*, respectively, in the sixth slot 225 of PUCCH 210. In some cases, UE 115-*a* may be capable of transmitting a single ACK 220 per slot 225 (e.g., or symbol, TTI, etc.) and, therefore, may be unable to prepare the multiple ACKs 220 configured for multiple PDSCHs 215 received for corresponding SPSs 205. For example, UE 115-*a* may be capable of transmitting one PUCCH transmission containing ACK information bits for one PDSCH 215 per a slot 225 (e.g., one or more bits of ACK information per slot for the PDSCH 215). Additionally or alternatively, base station 105-*a* may configure resources for both ACKs 220 (e.g., for the two PDSCHs 215 received) such that the resources overlap in time and/or frequency, which may also limit the ability of UE 115-*a* to transmit both ACKs 220 (e.g., if UE 115-*a* were able to transmit multiple ACKs 220 in a single slot 225). In some cases, UE 115-*a* may combine (e.g., multiplex) the ACKs 220 into a single ACK feedback message but may not know where (e.g., which PUCCH resource(s) to use) to transmit the combined ACK feedback message or an order for combining the ACKs 220.

Additionally, base station 105-*a* may transmit an activation grant for each SPS 205 that indicates for UE 115-*a* to activate and use the corresponding SPS 205 to monitor for and receive the periodic PDSCHs 215. In some cases, UE 115-*a* may determine a priority for transmitting an ACK 220 for a PDSCH 215 based on when an activation grant is received for each SPS 205. For example, base station 105-*a* may transmit an activation grant for first SPS 205-*a* first and then transmit an activation grant for second SPS 205-*b* after transmitting the activation grant for first SPS 205-*a*. Accordingly, if two PDSCHs 215 are received within a same slot 225 according to the two SPSs 205, UE 115-*a* may prioritize the PDSCH 215 received with first SPS 205-*a* and prepare the corresponding ACK 220, while refraining from decoding the PDSCH 215 received with second SPS 205-*b* (e.g., and may transmit a NACK). Additionally or alternatively, base station 105-*a* may transmit an indication within the activation grant for second SPS 205-*b* of a different location (e.g., time and frequency resources, different slot 225, etc.) for transmitting an ACK 220 for second SPS 205-*b* based on determining a collision between multiple PDSCHs 215 may occur between the two SPSs 205. However, this inclusion of more information with the activation grant may result in a new type of activation signaling to be configured, which may not scalable for additional PDSCHs 215 received within a same slot 225.

As described herein, base station 105-*a* may configure one or more resources for PUCCH 210 (e.g., a PUCCH configuration) within a slot 225 (e.g., uplink slot) for a multiple downlink SPS ACK feedback (e.g., multi-DL-SPS-AN feedback). For example, each resource for PUCCH 210 may correspond to a given payload size or number of ACK information bits to be transmitted for the multiple ACKs 220 (e.g., one ACK information bit per ACK 220 for a corresponding received PDSCH 215). In some cases, UE 115-*a* may determine which resource for PUCCH 210 (e.g., PUCCH resource) to use based on comparing the number of ACK information bits to transmit against a threshold value (e.g., a maximum payload size, such as two bits). Accordingly, if the number of ACK information bits is less than or equal to the threshold value (e.g., less than or equal to two bits), UE 115-*a* may use a first PUCCH resource (e.g., PUCCH resource 0) for transmitting the corresponding ACKs 220. Alternatively, if the number of ACK information bits is greater than the threshold value (e.g., greater than two bits), UE 115-*a* may use a second PUCCH resource (e.g., PUCCH resource 1) for transmitting the corresponding ACKs 220.

Base station 105-*a* may transmit the indication of the PUCCH resources and the threshold value in a separate configuration message (e.g., grant) for transmitting multiple SPS ACK feedbacks than the configurations for each SPS 205. Accordingly, each downlink configuration for each SPS 205 may still indicate a resource for PUCCH 210 (e.g., PUCCH resource) to transmit an ACK 220 for the given SPS 205. As such, if one PDSCH 215 is received within a slot 225, UE 115-*a* may use the PUCCH resource configured for the corresponding SPS 205 to transmit the ACK 220 for the one PDSCH 215 received. Additionally or alternatively, if multiple PDSCHs 215 are received within a slot 225, then UE 115-*a* may determine a PUCCH resource to use for transmitting the corresponding ACKs 220 based on the separate configuration message and the number of ACK information bits needed to be transmitted (e.g., number of ACKs to transmit). In some cases, UE 115-*a* may multiplex the multiple ACKs 220 into a single ACK feedback message (e.g., based on different codebooks). Additionally, a downlink SPS opportunity (e.g., to receive a corresponding PDSCH 215) may be cancelled and/or an ACK 220 may be delayed until a next available slot 225 based on symbols originally allocated for either transmission being unavailable for the corresponding transmission.

The above described techniques with reference to FIG. 2 may be performed on different length TTIs than the illustrated slots 225. For example, the downlink SPSs 205 may include a periodicity less than a slot (e.g., a sub-slot, mini-slot, or similar shorter TTI length instead of a slot 225). Accordingly, each slot 225 as shown in FIG. 2 may represent a sub-slot or mini-slot (e.g., or similar shorter TTI length) rather than a slot length duration, and the ACKs 220 (e.g., ACK/NACK feedback), PUCCH resource determination for transmitting the ACKs 220 on PUCCH 210, and counting of the number of ACK information bits (e.g., ACK/NACK information bits) for each ACK 220 may be performed for each sub-slot or mini-slot.

Figure 3:
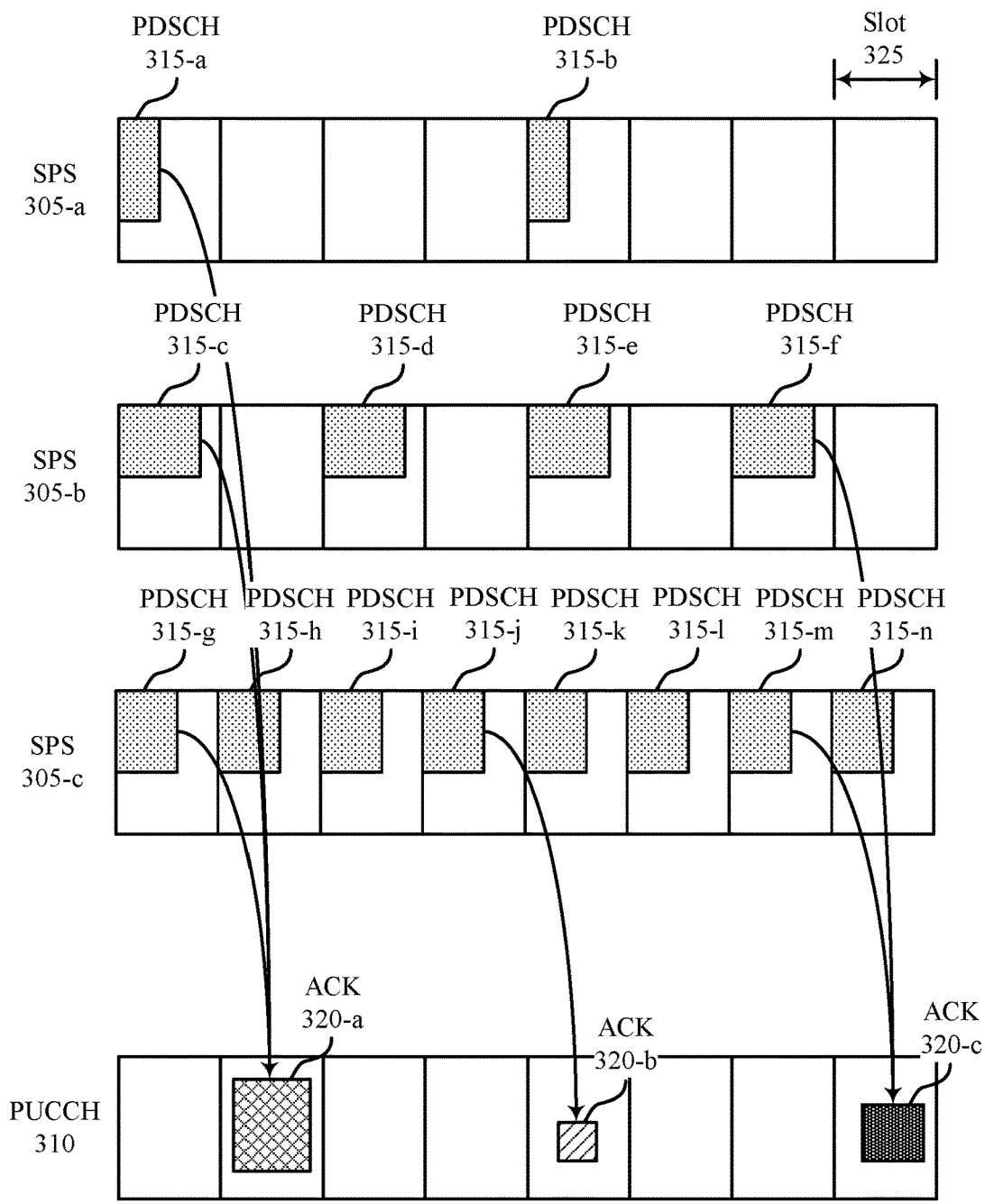
FIG. 3 illustrates an example of an ACK feedback configuration that supports ACK feedback for multiple active downlink SPS configurations in accordance with aspects of the present disclosure.

FIG. 3 illustrates an example of an ACK feedback configuration 300 that supports ACK feedback for multiple active downlink SPS configurations in accordance with aspects of the present disclosure. In some examples, ACK feedback configuration 300 may implement aspects of wireless communications systems 100 and/or 200. In some cases, a UE 115 may support multiple SPSs 305 for receiving downlink messages from a base station 105, where each SPS 305 includes periodic opportunities for receiving PDSCHs 315 from the base station 105 at regular intervals in the SPS 305. Additionally, the base station 105 may configure the UE 115 to transmit ACKs 320 on a PUCCH 310 for the corresponding PDSCHs 315. Accordingly, UE 115-*a* may use ACK feedback configuration 300 to determine which resources to use for transmitting the ACKs 320 on PUCCH 310 if multiple PDSCHs 315 are received within a same slot 325.

As shown in FIG. 3, the base station 105 may configure the UE 115 with three SPSs 305, each with different periodicities for receiving PDSCHs 315. For example, for a first SPS 305-*a*, the UE 115 may receive a PDSCH 315-*a* in a first slot 325 and a PDSCH 315-*b* in a fifth slot 325. Additionally, for a second SPS 305-*b*, the UE 115 may receive a PDSCH 315-*c*, PDSCH 315-*d*, PDSCH 315-*e*, and PDSCH 315-*f* in the first slot 325, a third slot 325, the fifth slot 325, and a seventh slot 325, respectively. For a third SPS 305-*c*, the UE 115 may receive a PDSCH 315-*g*, PDSCH 315-*h*, PDSCH 315-*i*, PDSCH 315-*j*, PDSCH 315-*k*, PDSCH 315-1, PDSCH 315-*m*, and PDSCH 315-*n* in each slot 325. Additionally, the base station 105 may configure the UE 115 to transmit an ACK 320 on PUCCH 310 for the received PDSCHs 315 (e.g., to indicate whether the PDSCHs 315 are received and decoded correctly) on resources indicated in PUCCH 310 for each SPS 305.

However, as described herein, multiple PDSCHs 315 may be received within a same slot 325, affecting how the UE 115 prepares the ACK 320. For example, an ACK 320-*a* may need to include ACKs for PDSCH 315-*a* of first SPS 305-*a*, PDSCH 315-*c* of second SPS 305-*b*, and PDSCH 315-*g* of third SPS 305-*c*. Additionally, an ACK 320-*c* may need to include ACKs for PDSCH 315-*f* of second SPS 305-*b* and for PDSCH 315-*n* of third SPS 305-*c*. In some slots 325, an ACK 320 may need to include an ACK for one PDSCH 315. For example, an ACK 320-*b* may include an ACK for PDSCH 315-*j* of third SPS 305-*c*.

To accommodate the multiple PDSCHs 315 received within a slot 325, the base station 105 may configure (e.g., via a PUCCH configuration) one or more PUCCH resources 330 (e.g., resources on PUCCH 310) within a slot 325 for the multiple received PDSCHs 315 for multiple SPSs 305 to transmit corresponding ACKs 320 (e.g., multiple downlink SPS ACK feedback). Each PUCCH resource may corresponds to a number of ACK information bits to be transmitted (e.g., a given payload size). For example, a first PUCCH resource 330-*a* (e.g., PUCCH resource 0) may be used for less than or equal to two ACK information bits (e.g., bits of feedback for an ACK 320), and a second PUCCH resource 330-*b* (e.g., PUCCH resource 1) may be used for more than two ACK information bits (e.g., bits of feedback). In some cases, the different PUCCH resources 330 may be needed based on different PUCCH formats (e.g., format0 or format1) used for transmitting less than or equal to two ACK information bits and greater than two ACK information bits (e.g., payload bits, maximum payload size, etc.). This information of the different PUCCH formats for the different number of ACK information bits may be included as part of the PUCCH configuration for the multiple downlink SPS ACK feedback. Each SPS 305 (e.g., downlink SPS configuration) may still indicate one PUCCH resource 330 for the given SPS (e.g., SPS configured PUCCH resource 330-*c*). In some cases, SPS configured PUCCH resource 330-*c* for each SPS 305 (e.g., for SPS 305-*c* as shown in FIG. 3) may be absent, and the UE 115 may use the PUCCH resource configuration for the multiple downlink SPS ACK feedback to determine a PUCCH resource 330 to transmit the ACK 320 (e.g., ACK feedback).

In a given slot 325, the UE 115 may check how many ACKs 320 (e.g., HARQ ACK information bits) to generate for the SPSs 305. If one ACK 320 is needed to be generated, then the UE 115 may use a PUCCH resource 330 configured in the corresponding SPS 305 configuration to transmit an ACK 320 (e.g., SPS configured PUCCH resource 330-*c*). For example, in the fifth slot 325, the UE 115 may need to transmit an ACK feedback message for PDSCH 315-*j* of third SPS 305-*c* and, therefore, may transmit ACK 320-*b* based on the configuration for third SPS 305-*c* using SPS configured PUCCH resource 330-*c*. Additionally or alternatively, the base station 105 may not configure a PUCCH resource for each SPS 305. Accordingly, each SPS 305 may use a same one or more PUCCH resources as configured for the multiple downlink SPS ACK feedbacks. That is, if one PDSCH 315 transmission is present for a particular ACK feedback occasion for all of the configured SPSs 305, the UE 115 may still use the one or more PUCCH resources configured for the multiple downlink SPS ACK feedbacks (e.g., first PUCCH resource 330-*a*, second PUCCH resource 330-*b*, etc.).

If more than one ACK 320 is needed to be generated, the UE 115 may first determine the payload size (e.g., the number of ACK information bits) and then select a PUCCH resource from the configured one or more PUCCH resources in the multiple downlink SPS ACK feedback configuration. For example, if two ACK information bits are needed, the UE 115 may use first PUCCH resource 330-*a* (e.g., PUCCH resource 0). As shown in FIG. 3, ACK 320-*c* in eighth slot 325 may include two ACK information bits for PDSCH 315-*f* of second SPS 305-*b* and PDSCH 315-*m* of third SPS 305-*c*, and, as such, the UE 115 may use first PUCCH resource 330-*a* to transmit ACK 320-*c*. If more than two ACK information bits are needed, then the UE 115 may use second PUCCH resource 330-*b* (e.g., PUCCH resource 1). For example, as shown, ACK 320-*a* may include three bits for PDSCH 315-*a* of first SPS 305-*a*, PDSCH 315-*c* of second SPS 305-*b*, and PDSCH 315-*g* of third SPS 305-*c*, and, as such, the UE 115 may use second PUCCH resource 330-*b* to transmit ACK 320-*a*.

In some cases, the UE 115 may use an ACK multiplexing to transmit the ACK 320 (e.g., if the UE 115 needs to report more than one ACK information bit in PUCCH 310 for the ACK 320). Accordingly, the UE 115 may determine the order of the ACK information bits in an ACK codebook for the ACK multiplexing based on different parameters associated with the SPSs 305. For example, the UE 115 may determine the order based on a CC index (e.g., from low to high) of the corresponding SPSs 305. In some cases, the UE 115 may use the CC indexes if one SPS 305 is activated per CC. Additionally or alternatively, the UE 115 may determine the order of ACK information bits based on SPS indexes (from low to high) for each SPS 305 (e.g., in case more than one SPS 305 is active per CC). In other cases, the UE 115 may determine the order of the ACK information bits based on a starting symbol (e.g., OFDM symbol) of the corresponding PDSCHs 315 (e.g., SPS transmissions) from earlier to later or an ending symbol of the corresponding PDSCHSs 315. Accordingly, the UE 115 may base the order on which starting or ending symbol occurs earliest to the last received symbol. Additionally or alternatively, the UE 115 may base the ordering of the ACK information bits (e.g., SPS ACK/NACK bits) on a time at which the SPSs 305 are activated. For example, if first SPS 305-*a* is activated at slot A (e.g., the second slot 325) and second SPS 305-*b* is activated at slot B (e.g., the first slot 325) such that A>B (e.g., SPS 305-*a* is activated after SPS 305-*b*), then the UE 115 may put an ACK information bit for a PDSCH 315 for first SPS 305-*a* after an ACK information bit for second SPS 305-*b*.

Additionally or alternatively, the UE 115 may be configured with a Type 1 ACK codebook (e.g., a semi-static codebook), where the UE 115 needs to send more than one ACK information bit for the SPS 305. Accordingly, the UE 115 may generate the semi-static ACK codebook based on one or more ACKs 320 for SPSs 305 in a corresponding location based on the occasion for receiving a PDSCH 315. Additionally, the UE 115 may select the PUCCH resource for transmitting the ACK 320 based on a total payload size of the ACK codebook instead of the number of actual ACK information bits to be transmitted for the SPS 305. In some cases, the semi-static codebook may contain ACK information bits (e.g., ACK/NACK bits) for all possible occasions for PDSCHs 315, regardless of whether the UE 115 receives a PDSCH 315 in the corresponding location or not. For a given PDSCH occasion, if the UE 115 receives a PDSCH 315, then the UE 115 may insert the corresponding ACK information bit. Alternatively, if the UE 115 does not receive a PDSCH 315 in a PDSCH occasion, the UE 115 may insert a NACK bit (i.e., a bit that represent a non-acknowledgement). Accordingly, the UE 115 may determine the PUCCH resource(s) based on the total payload size of the ACK codebook, instead of the actual number of ACK/NACK bits for the PDSCHs 315.

In some cases, the ACK feedback (e.g., an ACK 320 for a PDSCH 315) for one or more SPSs 305 may collide with ACK feedback for a dynamically scheduled PDSCH 315 (e.g., a PDSCH 315 received at an aperiodic time not according to an SPS 305, such as via a DCI message). If a Type 1 codebook (e.g., a semi-static codebook) is configured, then the UE 115 may put the ACK(s) 320 for the SPS(s) 305 and any ACKs for the dynamic PDSCH(s) in the joint semi-static codebook. Additionally or alternatively, if a Type 2 codebook (e.g., a dynamic codebook) is configured, then the UE 115 may append the ACK(s) 320 for the SPS(s) 305 to the dynamic codebook of the dynamic PDSCH(s). Accordingly, the UE 115 may select the PUCCH resource according to a payload size of the joint codebook size (e.g., with the appended ACK(s) 320) and a PUCCH resource indicator included in the grant of the dynamic PDSCH(s).

The above described techniques with reference to FIG. 3 may be performed on different length TTIs than the illustrated slots 325. For example, the downlink SPSs 305 may include a periodicity less than a slot (e.g., a sub-slot, mini-slot, or similar shorter TTI length instead of a slot 325). Accordingly, each slot 325 as shown in FIG. 3 may represent a sub-slot or mini-slot (e.g., or similar shorter TTI length) rather than a slot length duration, and the ACKs 320 (e.g., ACK/NACK feedback), PUCCH resource determination for transmitting the ACKs 320 on PUCCH 310, and counting of the number of ACK information bits (e.g., ACK/NACK information bits) for each ACK 320 may be performed for each sub-slot or mini-slot.

Figure 4:
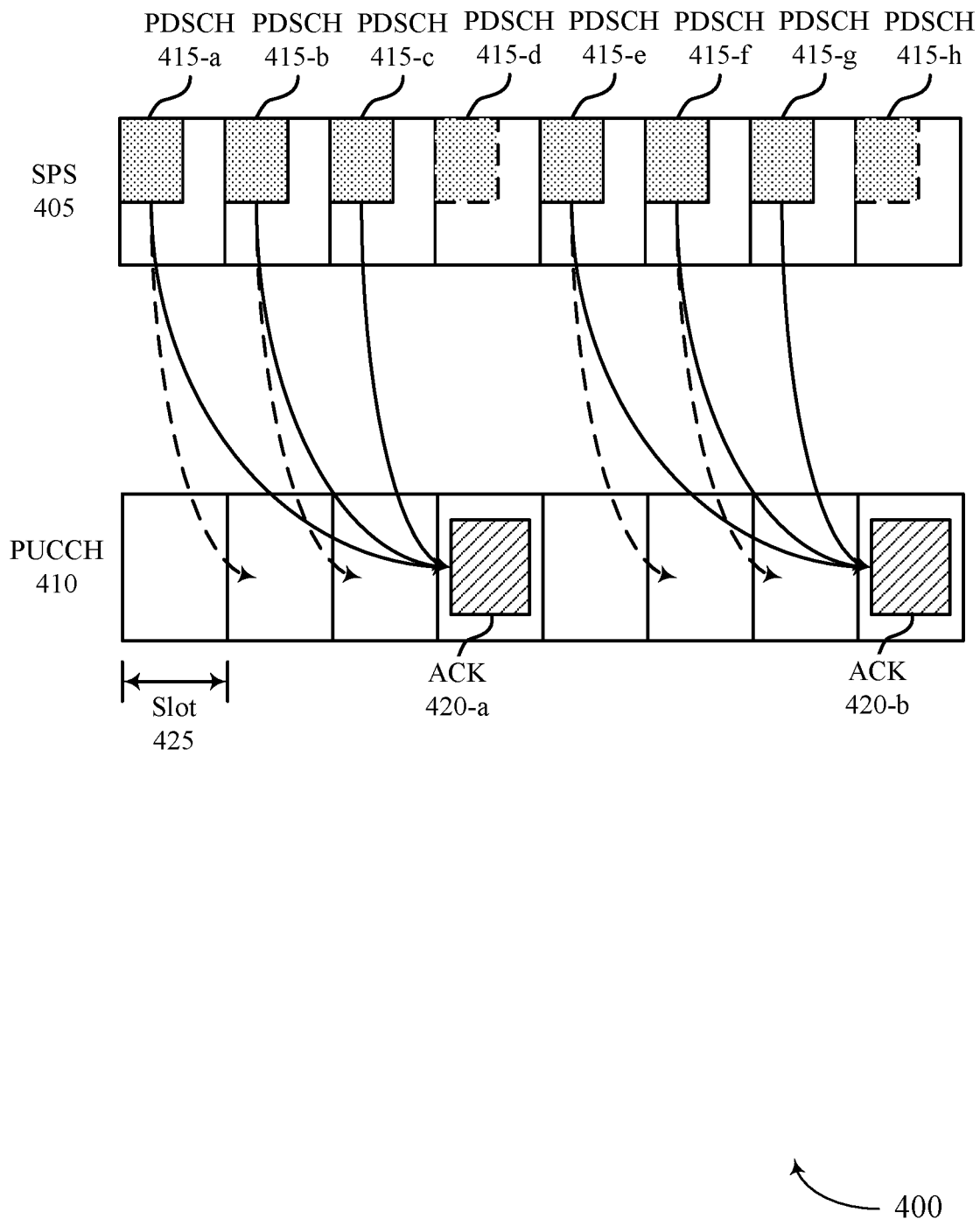
FIG. 4 illustrates an example of an ACK feedback delay configuration that supports ACK feedback for multiple active downlink SPS configurations in accordance with aspects of the present disclosure.

FIG. 4 illustrates an example of an ACK feedback delay configuration 400 that supports ACK feedback for multiple active downlink SPS configurations in accordance with aspects of the present disclosure. In some examples, ACK feedback delay configuration 400 may implement aspects of wireless communications systems 100 and/or 200. As described herein, a base station 105 may configure a UE 115 with an SPS 405 to receive one or more PDSCHs 415 transmitted at regular intervals, as well as with a PUCCH 410 to transmit ACKs 420 for the received PDSCHs 415. As shown, SPS 405 may include a PDSCH 415 that is transmitted in each slot 425.

In some cases, a given SPS opportunity for the base station 105 to transmit a PDSCH 415 in a slot 425 according to SPS 405 may be cancelled. For example, a TDD configuration of a slot 425 in SPS 405 may prevent the base station 105 from transmitting a PDSCH 415 or prevent the UE 115 from receiving the PDSCH 415. For example, at least one symbol of the transmission occasion may be indicated as flexible (e.g., downlink or uplink) or uplink by a slot format indicator (SFI), cancelling the PDSCH 415. Additionally or alternatively, the UE 115 may be dynamically scheduled to transmit an uplink signal in at least one symbol initially configured for receiving a PDSCH 415, thereby preventing the UE 115 from receiving the PDSCH 415. In some cases, a dynamically scheduled PDSCH (e.g., transmitted via a DCI message) may occur on overlapping symbols of one or more of the configured PDSCHs 415 for the SPS 405. Accordingly, the UE 115 may also cancel an ACK 420 transmission for this SPS occasion (e.g., no HARQ-ACK information is generated by the UE 115). For example, a PDSCH 415-*d* in a fourth slot 425 and/or a PDSCH 415-*h* in an eighth slot 425 may be cancelled (e.g., the base station 105 refrains from transmitting the PDSCH 415 or the UE 115 refrains from receiving and decoding the PDSCH 415) of the SPS 405. As shown, the base station 105 may configure the UE 115 with a TDD configuration that includes a "DDDUDDDU" configuration of slots 425, where D represents a downlink slot, and U represents an uplink slot. Accordingly, the fourth and eighth slots 425 may be uplink slots, and, hence, PDSCHs 415-*d* and 415-*h* may be cancelled based on the UE 115 being configured for uplink in the corresponding slots 425 (e.g., along with cancelling the corresponding ACK feedback).

Additionally or alternatively, in a TDD system, after determining an ACK codebook as described above with reference to FIG. 3, the UE 115 may determine that a corresponding PUCCH resource cannot be transmitted. For example, the UE 115 may identify a TDD restriction (e.g., some symbols cannot be used to transmit an uplink signal) to prevent the UE 115 from transmitting an ACK 420 in a configured slot 425 for a received PDSCH 415 in the SPS 405. As shown, the base station 105 may configure the UE 115 with a TDD configuration that includes a "DDDUDDDU" configuration of slots 425, where D represents a downlink slot, and U represents an uplink slot, as described above. Therefore, the second and third slots 425 as shown in FIG. 4 may be downlink slots and cannot be used to transmit the ACK feedback (e.g., ACKs 420) for a PDSCHs 415-*a* and 415-*b*, respectively. Similarly, the sixth and seventh slot 425 as shown in FIG. 4 may also be downlink slots and cannot be used to transmit ACK feedback (e.g., ACKs 420) for PDSCHs 415-*e* and 415-*f*, respectively.

Accordingly, the ACK 420 may be delayed to a next available slot 425. In this next available slot 425, the UE 115 may multiplex the delayed ACK(s) 420 with an ACK 420 originally configured and scheduled to be transmitted in this slot 425. For example, an ACK 420 for a PDSCH 415-*a* and an ACK 420 for a PDSCH 415-*b* may not be transmitted by the UE 115 due to a conflict or restriction. Accordingly, the UE 115 may then multiplex the cancelled ACKs 420 for PDSCHs 415-*a* and 415-*b* with an ACK 420 for a PDSCH 415-*c* originally scheduled for a fourth slot 425 and transmit a combined ACK 420-*a* for PDSCH 415-*a*, PDSCH 415-*b*, and PDSCH 415-*c*. The UE 115 may follow the same process for transmitting a combined ACK 420-*b* for a PDSCH 415-*e* and PDSCH 415-*f* that have cancelled ACKs 420 and for a PDSCH 415-*g* originally scheduled with an ACK 420 in the eighth slot 425.

Accordingly, the UE 115 may determine a PUCCH resource for transmitting the multiplexed codebook using techniques as described above with reference to FIG. 3. For example, the UE 115 first determine a payload size for an ACK 420 (e.g., a number of ACK information bits, a total payload size, etc.) and then determine the PUCCH resource from a configuration for a multiple downlink SPS ACK feedback based on the payload size. For example, as described above with reference to FIG. 3, a first PUCCH resource 330-*a* and a second PUCCH resource 330-*b* may be configured for transmitting ACK feedback based on the number of ACK information bits to be transmitted. As shown, since the ACKs 420 include ACK information bits for three PDSCHs 415, the UE 115 may determine to use the second PUCCH resource 330-*b* based on the number of ACK information bits exceeding two bits. In some cases, the base station 105 may, in addition, configure a number that indicates a maximum number of slots 425 that an ACK 420 can be delayed. Accordingly, if the ACK 420 (e.g., HARQ-ACK feedback) is delayed more than this number of slots 425, then the UE 115 may discard the corresponding ACK 420. This number of slots limitation may be a mechanism to limit the number of bits on each transmission on PUCCH 410. In some cases, the base station 105 may include this number of slots limitation in the configuration for the multiple downlink SPS ACK feedback.

The above described techniques with reference to FIG. 4 may be performed on different length TTIs than the illustrated slots 425. For example, the downlink SPSs 405 may include a periodicity less than a slot (e.g., a sub-slot, mini-slot, or similar shorter TTI length instead of a slot 425). Accordingly, each slot 425 as shown in FIG. 4 may represent a sub-slot or mini-slot (e.g., or similar shorter TTI length) rather than a slot length duration, and the ACKs 420 (e.g., ACK/NACK feedback), PUCCH resource determination for transmitting the ACKs 420 on PUCCH 410, and counting of the number of ACK information bits (e.g., ACK/NACK information bits) for each ACK 420 may be performed for each sub-slot or mini-slot.

Additionally, two PDSCH occasions corresponding to two SPS configurations in a same CC may overlap in time (and optionally in frequency). In this case, the UE 115 may report its capability of receiving two PDSCHs 415 in overlapping time (and frequency) domain resources. If the UE 115 is capable of receiving two PDSCHs 415 in overlapping time (and frequency) domain resources, then the base station 105 may further configure the UE 115 (e.g., via RRC configuration) whether the UE 115 is expected to decode two PDSCHs 415 in these overlapping resources or just one PDSCH 415. If the UE 115 reports a capability of supporting being able to simultaneously receive two PDSCHs 415 on overlapping time (and frequency) resources and if the base station 105 configures the UE 115 to perform such operation, then the UE 115 may transmit feedback of one ACK information bit for each of the two PDSCH occasions.

Alternatively, if either the UE 115 does not have the capability of simultaneous reception or the base station 105 does not configure the UE 115 to perform simultaneous reception, the UE 115 may be expected to receive one PDSCH 415 in the two PDSCH occasions. Accordingly, the UE 115 may receive a PDSCH 415 on an SPS 405 that is activated later (i.e., the SPS 405 whose activation grant comes later in time). Alternatively, the UE 115 may receive a PDSCH 415 on an SPS 405 that is activated earlier in time. In both options, the UE 115 may follow a deterministic rule to figure out which PDSCH 415 to receive and which to drop. Therefore, the UE 115 may not need to perform a blind detection. In this case, the UE 115 may transmit an ACK 420 of one bit (e.g., an ACK/NACK feedback) for the two PDSCH occasions. Additionally, the ACK 420 (e.g., ACK/NACK) may be transmitted either on the PUCCH resource corresponding to the received SPS configuration for one of the SPSs 405 or on a PUCCH resource determined as described above with reference to FIGS. 3 and 4 (e.g., from the multi-DL-SPS-AN PUCCH resource, PUCCH configuration, etc.).

FIGS. 5A and 5B illustrate examples of ACK feedback configurations 500 and 501 that support ACK feedback for multiple active downlink SPS configurations in accordance with aspects of the present disclosure. In some examples, ACK feedback configurations 500 and 501 may implement aspects of wireless communication systems 100 and/or 200.

As described herein, a base station 105 may configure one or more SPSs 505 (e.g., SPS configurations) to a UE 115, where the SPSs 505 further include a configuration of a PUCCH 510. For example, the SPSs 505 may include a periodic transmission of a PDSCH 515 that the base station 105 transmits to the UE 115 at regular intervals, where the UE 115 transmits an ACK 520 on the PUCCH 510 to indicate whether the PDSCH 515 is received and decoded successfully. In some cases, the base station 105 may transmit an activation and/or deactivation signal (e.g., activation DCI 530, deactivation DCI 540, etc.) to the UE 115, and the activation and/or deactivation signal may contain an uplink resource (e.g., PUCCH resource indicator (PRI) 535).

As shown in ACK feedback configuration 500, for a first PDSCH 515 transmission and repetitions of the transmission, after receiving the activation DCI 530, the UE 115 may report an ACK 520-b feedback message (e.g., on an indicated PUCCH resource) following a same rule as for reporting ACK feedback messages for a dynamically scheduled PDSCH 515 as described above. For example, a base station 105 may transmit a PRI 535-a field in activation DCI 530, and the UE 115 may identify an uplink resource in the PUCCH 510 based on the transmitted PRI 535-a for transmitting ACK 520-b.

Additionally, the UE 115 may multiplex an ACK feedback message for a first signal (e.g., a first occurring PDSCH 515 for SPS 505) with an ACK feedback message for other dynamically scheduled PDSCH 515 signals. For example, the UE 115 may multiplex the ACK feedback messages based on a dynamic ACK codebook (e.g., type II codebook), where a location for ACK 520-b may be indicated in a downlink assignment index (DAI) in activation DCI 530. Additionally or alternatively, the UE 115 may multiplex the ACK feedback messages based on a semi-static ACK codebook (e.g., type I codebook), where a location of ACK 520-b may be determined according to a downlink occasion over which a first occurring PDSCH 515 is received for SPS 505. In some cases, the UE 115 may need to report two or more ACK feedback bits, each ACK feedback bit corresponding to the first PDSCH 515 of SPS 505 (e.g., or an additional downlink SPS configuration).

Additionally or alternatively, as shown in ACK feedback configuration 501, after receiving a signal indicating a downlink resource release (e.g., downlink SPS release) in deactivation DCI 540, the UE 115 may need to determine an uplink resource in PUCCH 510 for reporting ACK feedback to indicate whether deactivation DCI 540 was received and decoded successfully. For example, the UE 115 may determine the PUCCH 510 resource based on a PM 535-b received in deactivation DCI 540 (e.g., dynamic deactivation DCI). In some cases, the UE 115 may need to report multiple ACK feedback bits for releasing multiple downlink resources in a same PUCCH 510 transmission. Accordingly, the UE 115 may multiplex feedback bits for ACK 520-b and additional ACKs 520 (e.g., ACK 520-a as configured for SPS 505) and determine the PUCCH 510 resource following the last downlink resource release signal (e.g., according to time at which the DCI is received, the CC index, etc.). For example, UE 115 may use the PUCCH 510 resource configured in the corresponding SPS 505 configuration to report ACK feedback. In some cases, a UE 115 may need to report multiple ACK feedback bits for releasing multiple downlink resources in the same PUCCH 510 transmission. The UE 115 may multiplex the ACK feedback bits and transmit them over an ACK 520-a (e.g., multi-SPS-PUCCH resource, multi-DL-SPS-AN PUCCH resource, PUCCH resources configured for SPS 505, etc.).

In some cases, the UE 115 may multiplex ACK feedback corresponding to PDSCH 515 transmissions of one or more SPS 505 configurations and ACK feedback corresponding to the release of another one or more SPS 505 configurations in the same PUCCH 510 transmission. The UE 115 (e.g., and/or the base station 105) may determine the uplink resource in PUCCH 510 for transmitting the ACK feedback according to a deactivation DCI 540 or resources determined for transmitting ACK 520-a (e.g., a multi-SPS-PUCCH resource). The UE 115 may be configured with a semi-static codebook (e.g., type I ACK codebook, Type 1 codebook, etc.), which may be used in determining the location of ACK feedback. In some cases, the location of ACK feedback for SPS 505 PDSCHs 515 may be determined according to the PDSCH 515 occasions and/or the location of ACK feedback for SPS 505 release according to a corresponding PDSCH 515 occasion for SPS 505 within the slot over which the release DCI is received. Additionally or alternatively, the UE 115 may be configured with a dynamic codebook (e.g., type II ACK codebook, Type 2 codebook, etc.). In some cases, the location of ACK 520-b (e.g., ACK feedback for deactivation DCI 540, SPS 505 release, etc.) may be concatenated with ACKs 520-a (e.g., for PDSCH 515 transmissions of SPS 505) for the dynamic codebook. In some cases, the order of ACK(s) 520-b (e.g., ACK feedback for SPS 505 release) may be ordered according to a DAI field in deactivation DCI 540 (e.g., the release DCI). Additionally or alternatively, the ACK feedback for PDSCHs 515 of SPS 505 (e.g., ACK(s) 520-a) may be ordered in accordance with the ACK feedback ordering as described above with reference to FIG. 3.

In some cases, collisions may occur for the semi-static (e.g., type I) ACK codebook with an ACK 520 for deactivation DCI 540 (e.g., downlink SPS 505 release). For example, an occasion for a PDSCH 515 of SPS 505 corresponding to deactivation DCI 540 (e.g., a release message for SPS 505) may overlap with another dynamically scheduled PDSCH 515 or another PDSCH 515 transmission for SPS 505 PDSCH 515. Subsequently, in some cases, the UE 115 may treat this as an error case.

Figure 6:
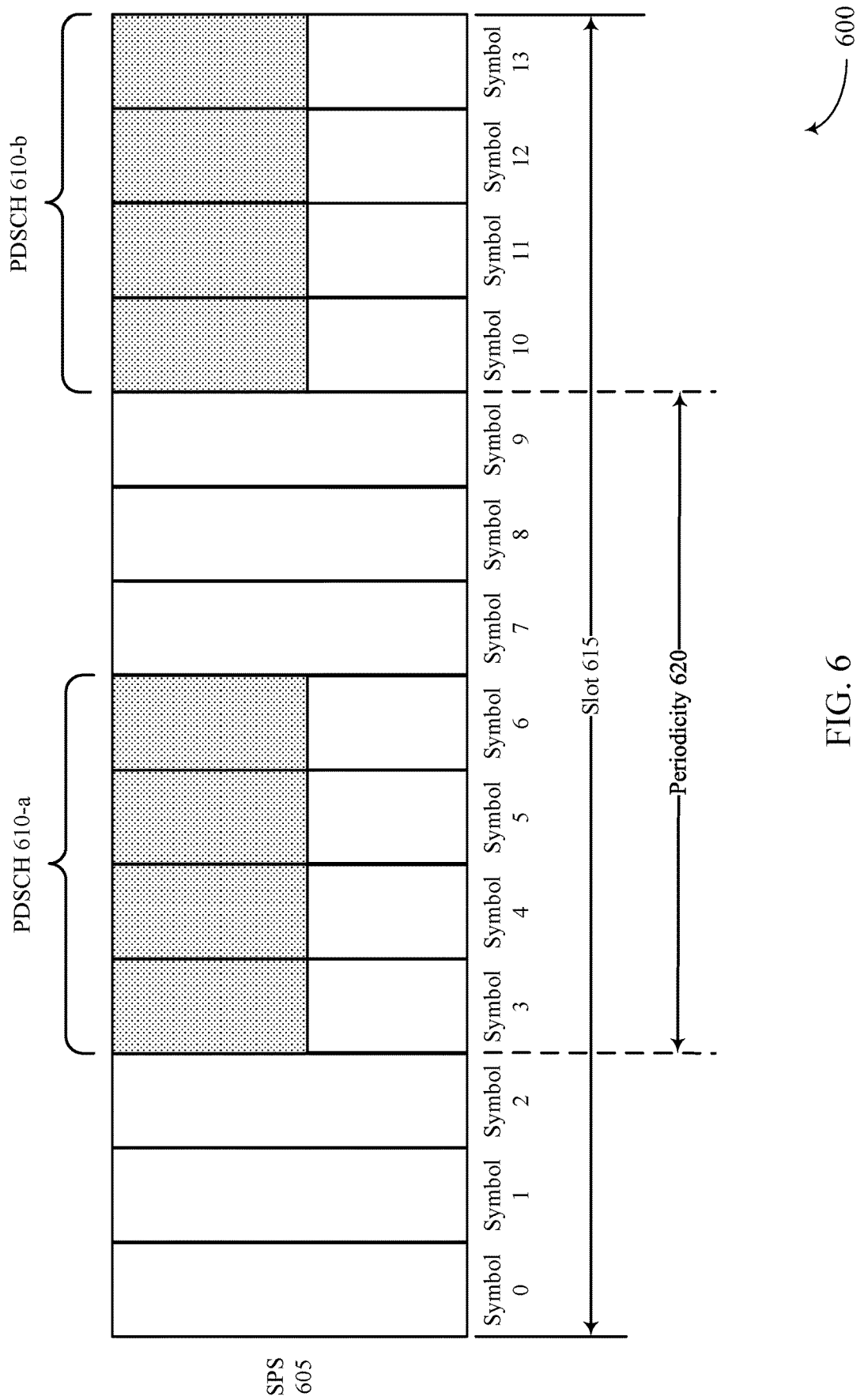
FIG. 6 illustrates an example of a subslot downlink configuration that supports ACK feedback for multiple active downlink SPS configurations in accordance with aspects of the present disclosure.

FIG. 6 illustrates an example of a subslot downlink configuration 600 that supports ACK feedback in accordance with aspects of the present disclosure. In some examples, subslot downlink configuration 600 may implement aspects of wireless communications systems 100 and/or 200. As described herein, a UE 115 and a base station 105 may support a downlink SPS with subslot periodicity. For example, the base station 105 may indicate an SPS 605 for the UE 115 to use for searching for and detecting a PDSCH 610 in a slot 615. In some cases, the PDSCH 610 may be transmitted according to a periodicity 620 that is less than a slot duration (e.g., subslot periodicity, mini-slot periodicity, etc.). For example, slot 615 may include 14 symbols (e.g., numbered from 0 to 13), and the periodicity 620 may be shorter than 14 symbols long such that multiple PDSCHs 610 can be transmitted within slot 615. While slot 615 is shown having 14 symbols, it is to be understood that slot 615 may include fewer or more symbols and/or different length TTIs than a symbol.

As shown, the base station 105 may indicate a time-domain resource allocation (TDRA) of a first PDSCH 610 to the UE 115, and the UE 115 may derive additional PDSCHs 610 based on periodicity 620 for PDSCHs 610 in SPS 605. For example, base station 105 may signal for the UE 115 to transmit ACK feedback for a first PDSCH 610-a received on symbols 3-6 (e.g., starting from symbol 0) of slot 615. Subsequently, the UE 115 may be indicated that periodicity 620 for receiving PDSCHs 610 in SPS 605 (e.g., downlink SPS) is seven (7) symbols. Accordingly, the UE 115 may determine that there will be two PDSCHs 610 (e.g., downlink SPS 605 transmissions) in each slot (e.g., from symbol 3-6 and symbol 10-13). For example, the UE 115 may determine that a second PDSCH 610-*b* is received within slot 615 during symbols 10-13 based on periodicity 620 being seven (7) symbols and the first PDSCH 610-*a* being received starting at symbol 3 of slot 615. In some cases, the UE 115 may not be able to report an ACK for the second PDSCH 610-*b* based on conventional techniques. Accordingly, the techniques as described herein may support the UE 115 to determine how to report ACK for multiple PDSCHs 615 transmitted within slot 615 according to a subslot periodicity (e.g., periodicity 620).

Figure 7:
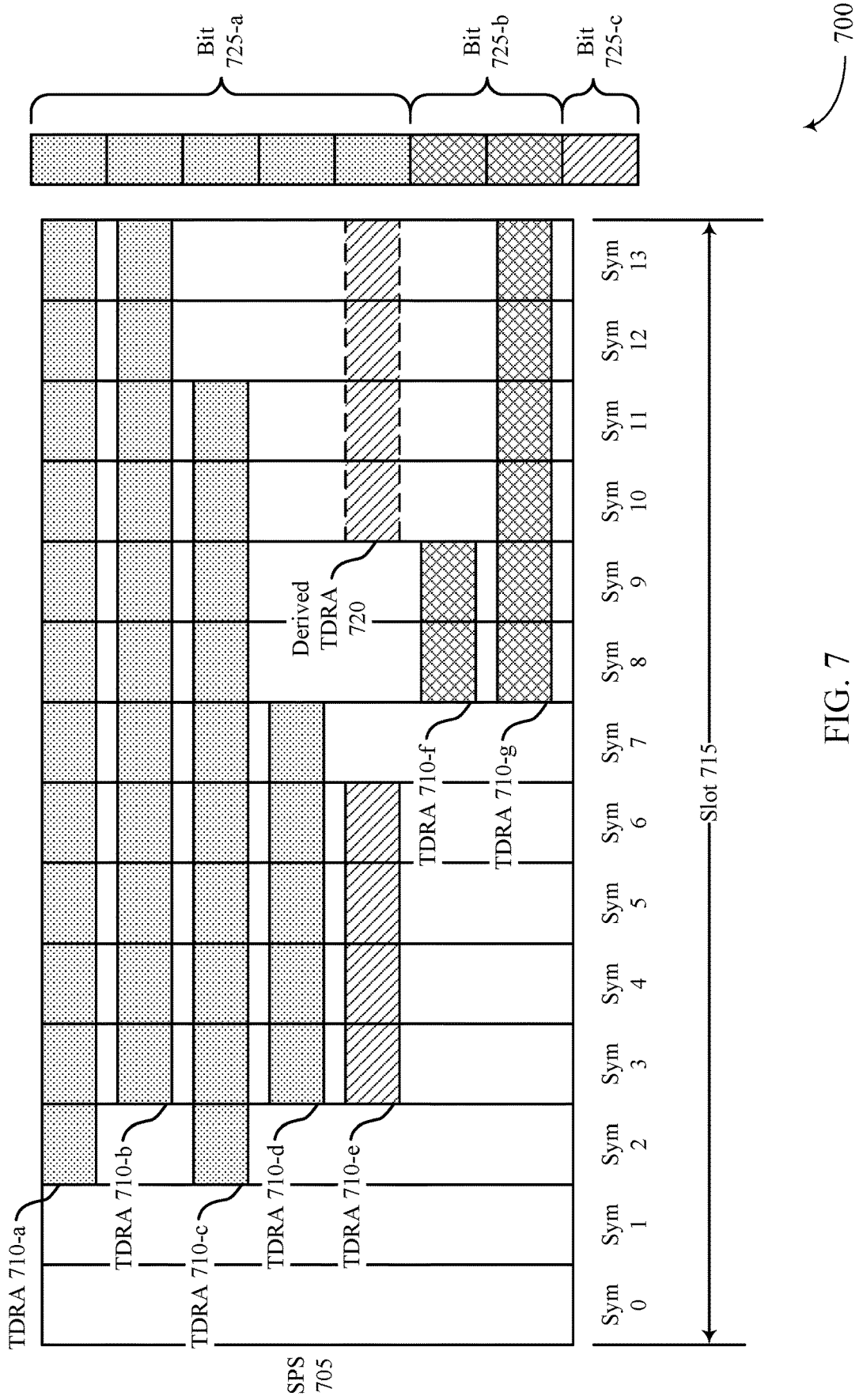
FIGS. 7 and 8 illustrate examples of time-domain resource allocation (TDRA) configurations that support ACK feedback for multiple active downlink SPS configurations in accordance with aspects of the present disclosure.

FIG. 7 illustrates an example of TDRA configuration 700 that supports ACK feedback in accordance with aspects of the present disclosure. In some examples, TDRA configuration 700 may implement aspects of wireless communications systems 100 and/or 200. As described herein, a UE 115 may perform a procedure to determine a semi-static ACK feedback codebook for communications with a base station 105, which depends in part on the TDRAs 710 that could potentially be used by a base station 105 to schedule a PDSCH (e.g., for an SPS configuration, a dynamic PDSCH, etc.) in a slot 715. For example, slot 715 may include 14 symbols (e.g., numbered from 0 to 13). While slot 715 is shown having 14 symbols, it is to be understood that slot 715 may include fewer or more symbols and/or different length TTIs than a symbol.

In some cases, the base station 105 may use a DCI (e.g., a downlink grant) to indicate to UE 115 one or more TDRAs 710 used by a particular PDSCH transmission. Accordingly, the UE 115 may determine a minimum ACK codebook size within each time resource (e.g., slot, mini-slot, etc.) that can accommodate all ACK feedback messages corresponding to non-overlapping PDSCH transmissions. Subsequently, the UE 115 may then map each of the TDRAs 710 to a particular location in the codebook. In some cases (e.g., NR), the UE 115 may not expect the base station 105 to schedule two PDSCHs on a same CC that partially or fully overlap in time.

However, in some cases, the UE 115 may take into account semi-statically configured TDRAs 710 and may not take into account a derived TDRA 720 for determining a codebook for transmitting corresponding ACKs based on PDSCHs transmitted in either TDRAs. For example, the UE 115 may identify or determine the derived TDRA 720 based on the techniques described above with reference to FIG. 6 (e.g., based on subslot periodicities). Additionally, the base station 105 may configure one or more bits 725 to transmit ACKs for the PDSCHs received in the potential TDRAs 710. Accordingly, no bits 725 may be configured for any derived TDRA 720 identified/determined by the UE 115.

In some cases, when the UE 115 determines the list of TDRAs 710 for semi-static codebook determination, in addition to the configured TDRAs 710 by the base station, UE 115 may include the derived TDRA 720 signaled from the activation DCI (e.g., if the derived TDRA 720 is not already included in the list of configured TDRAs 710). For example, the base station 105 may indicate for the UE 115 to receive a first PDSCH according to a configuration of SPS 705 for TDRA 710-*e*, and if the periodicity for SPS 705 for a PDSCH transmitted according to TDRA 710-*e* is seven (7) symbols (e.g., or a length and periodicity less than or equal to half the duration of slot 715), then the UE 115 may derive the derived TDRA 710 for receiving a second PDSCH according to the same SPS configuration. Accordingly, the UE 115 may generate three bits 725 (e.g., 725-*a*, 725-*b*, and 725-*c*) instead of the two bits 725 signaled by the base station 105 (e.g., 725-*a* and 725-*b*) for PDSCHs received in slot 715 according to the TDRAs 710 and the derived TDRA 720. For example, the UE 115 may transmit ACKs for TDRAs 710-*a*, 710-*b*, 710-*c*, 710-*d*, and 710-*e* in bit 725-*a*, ACKs for TDRAs 710-*f* and 710-*g* in bit 725-*b*, and an ACK for derived TDRA 720 in bit 725-*c*. In some cases, this determination of TDRAs 710 and/or derived TDRAs 720 applies to transmitting multiple ACKs in slot 715 (e.g., slot based ACK feedback, subslot based ACK feedback, etc.).

In some cases, the base station 105 may transmit an indication of the TDRAs 710 for SPS 705 in an activation DCI. Additionally or alternatively, the base station 105 may transmit indications of both the signaled TDRAs 710 and any derived TDRAs 720 in a semi-statically configured list of TDRAs (e.g., using a TDRA table used by the base station 105 and the UE 115 to find each TDRA entry).

Figure 8:
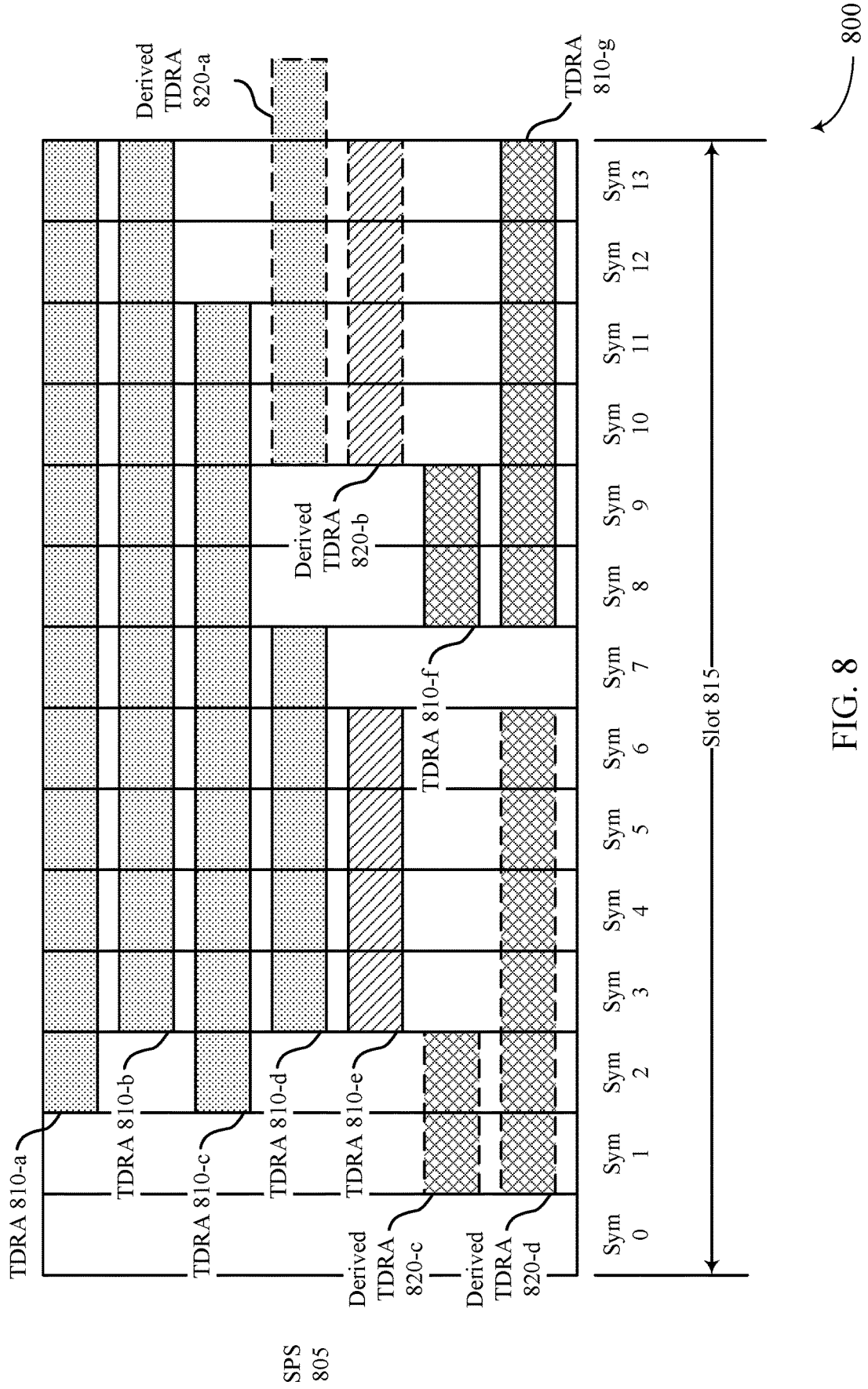

FIG. 8 illustrates an example of TDRA configuration 800 that supports ACK feedback in accordance with aspects of the present disclosure. In some examples, TDRA configuration 800 may implement aspects of wireless communications systems 100 and/or 200. As described herein, a UE 115 may be configured with an SPS 805 that includes PDSCHs transmitted with a periodicity less than a duration of a slot 815 (e.g., 14 symbols) on a downlink cell for communications with a base station 105. For example, slot 815 may include 14 symbols (e.g., numbered from 0 to 13). While slot 815 is shown having 14 symbols, it is to be understood that slot 815 may include fewer or more symbols and/or different length TTIs than a symbol. In some cases, the UE 115 may use TDRA configuration 800 for multiple active downlink SPS configurations as described herein.

As described above with reference to FIG. 7, the base station 105 may transmit an indication of one or more TDRAs 810 for the UE 115 to receive a PDSCH in one of the TDRAs 810 during slot 815. For example, as shown, the base station 105 may indicate seven (7) TDRAs for the UE 115 to potentially receive a PDSCH during SPS 805. The seven (7) TDRAs 810 may include a TDRA 810-*a* that begins at symbol 2 and has a length of 12 symbols, a TDRA 810-*b* that begins at symbol 3 and has a length of 11 symbols, a TDRA 810-*c* that begins at symbol 2 and has a length of 10 symbols, a TDRA 810-*d* that begins at symbol 3 and has a length of 5 symbols, a TDRA 810-*e* that begins at symbol 3 and has a length of 4 symbols, a TDRA 810-*f* that begins at symbol 8 and has a length of 2 symbols, and a TDRA 810-*g* that begins at symbol 2 and has a length of 6 symbols.

Subsequently, the UE 115 may then check all configured TDRAs 810 that have a length smaller than or equal to a period value of an SPS configuration. As shown, the period value may equal seven (7) symbols (e.g., half of the duration of slot 815), but the period value may equal different durations within slot 815 (e.g., two (2) symbols). In some cases, the UE 115 may take all configured TDRAs 810 that have a length less than or equal to half of a duration for slot 815 (e.g., or a different indicated period value) and find the derived TDRAs 820 within slot 815. For example, the UE 115 may identify a derived TDRA 820-*a* that begins at symbol 10 and has a length of five (5) symbols, a derived TDRA 820-*b* that begins at symbol 10 and has a length of four (4) symbols, a derived TDRA 820-*c* that begins at symbol 1 and has a length of two (2) symbols, and a derived TDRA 820-*d* that begins at symbol 1 and has a length of six (6) symbols. However, the UE 115 may remove any derived TDRAs 820 that cross the slot boundary (e.g., derived TDRA 820-*a*). Accordingly, the UE 115 may then form a semi-static codebook (e.g., type I codebook) based on the configured TDRAs 810 as well as the derived (e.g. virtual) TDRAs 820. In some cases, the base station 105 may signal an indication of the derived TDRAs 820 to the UE 115 in addition to the configured TDRAs 810.

In some cases, the UE 115 may be configured with multiple SPS 805 configurations of period less than a slot on a same cell and may perform this procedure for all possible period values. If two downlink SPSs 805 on the same cell have equal sub-slot periods, UE 115 may perform the procedure once. For example, even though multiple derived TDRAs 820 may be identified for TDRA 810-f, the UE 115 and/or the base station 105 may identify one TDRA 820-c (e.g., perform the procedure once) rather than identifying multiple derived TDRAs 820 in slot 815.

Figure 9A:
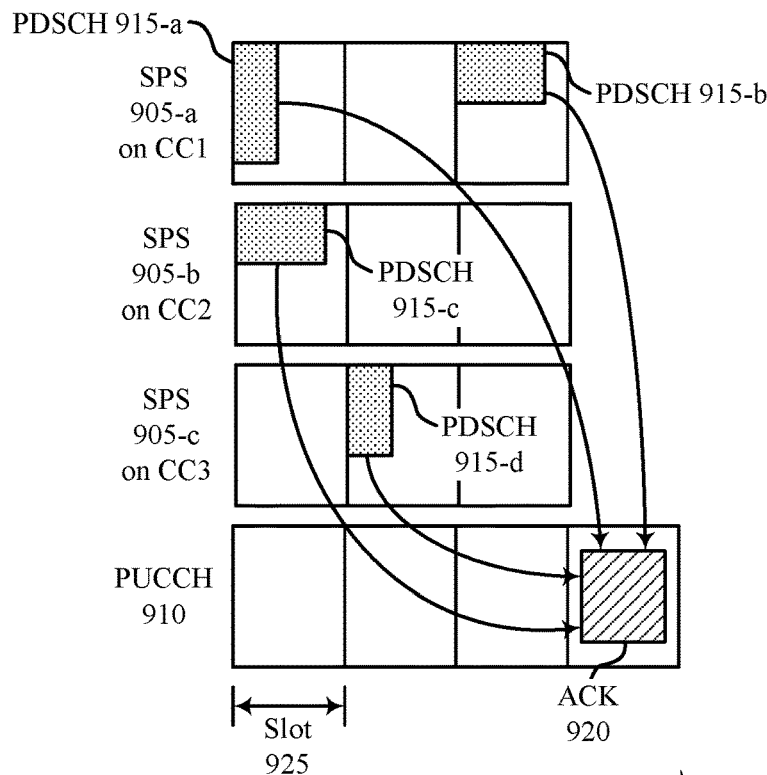
FIGS. 9A and 9B illustrate examples of ACK feedback configurations that support ACK feedback for multiple active downlink SPS configurations in accordance with aspects of the present disclosure.
Figure 9B:
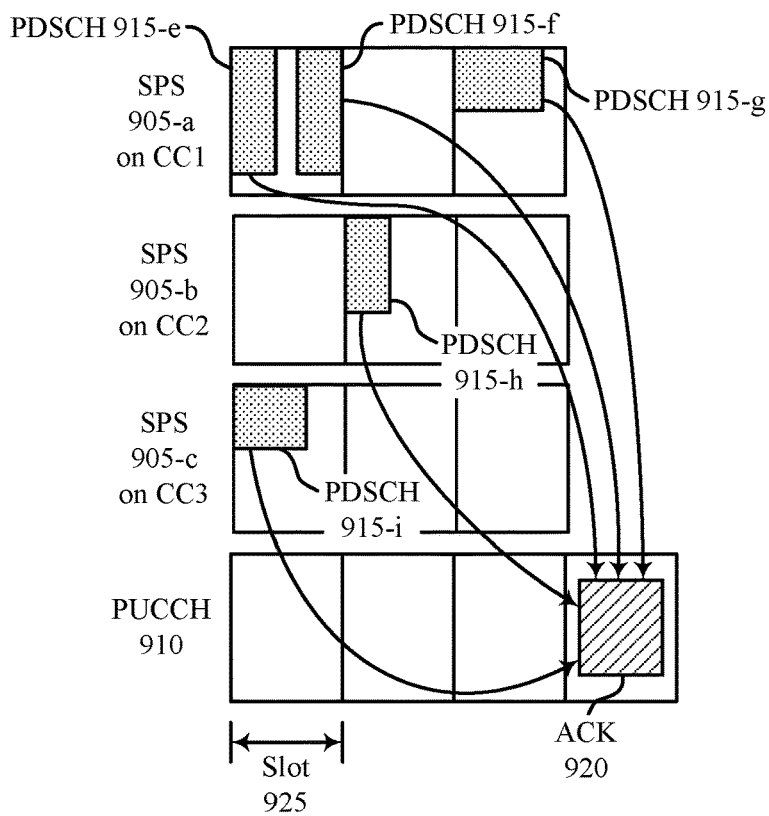

FIGS. 9A and 9B illustrate examples of ACK feedback configurations 900 and 901 that support ACK feedback for multiple active downlink SPS configurations in accordance with aspects of the present disclosure. In some examples, ACK feedback configurations 900 and 901 may implement aspects of wireless communications systems 100 and/or 200. In some cases, a UE 115 may support multiple SPSs 905 for receiving downlink messages from a base station 105, where each SPS 905 includes periodic opportunities for receiving PDSCHs 915 from the base station 105 at regular intervals in the SPS 905. Additionally, the base station 105 may configure the UE 115 to transmit an ACK 920 on a PUCCH 910 for the corresponding PDSCHs 915. As described above, the UE 115 may determine which resources to use for transmitting the ACK 920 on PUCCH 910 if multiple PDSCHs 915 are received within a same slot 925. Additionally, the UE 115 may generate (e.g., determine) a dynamic ACK codebook (e.g., HARQ-ACK codebook, type 2 codebook, type II codebook, etc.) based on ACK feedback configurations 900 and 901 as described below.

For example, when transmitting ACK 920 (e.g., ACK feedback) for multiple PDSCHs 915 received in different CCs at different times (e.g., in different slots 925), the UE 115 may generate the dynamic ACK codebook (which may be referred to as A as described herein) based on ordering corresponding ACKs for each PDSCH 915 according to different orders when generating the dynamic ACK codebook and encoding ACK 920. For example, a first option for generating A may include ordering the ACKs for each PDSCH based on a time-first, CC-second order. Initially, the UE 115 may set the dynamic ACK codebook, A, to Ø (e.g., an empty set). Subsequently, for c=1 to $N_{cell}^{DL}$ (e.g., from a first PDSCH to a last PDSCH configured across all CCs), the UE 115 may loop over the downlink serving cells to generate A.

Additionally, the UE 115 may then identify M, which may represent the set of PDSCHs 915 received on a serving cell, c, sorted in an ascending order of the last OFDM symbol of the corresponding PDSCH reception. For example, the UE 115 may order the PDSCHs 915 received in each serving cell first in an ascending order based on a corresponding last symbol of each PDSCH 915 on that serving cell. As shown, The UE 115 may order PDSCHs 915 received according to a first SPS 905-a on a first CC (e.g., serving cell) with a first PDSCH 915-a coming first and then a second PDSCH 915-b coming second in the order (e.g., based on second PDSCH 915-b having a later occurring last OFDM symbol than first PDSCH 915-a).

The UE 115 may also set a C(M) to be a cardinality of M, representing a total number of PDSCHs 915 received on a CC (e.g., serving cell). For example, a C(M) for the first CC may equal two (2). Accordingly, for m=1 to C(M), the UE 115 may add an ACK information bit associated with an SPS PDSCH reception m in M. For example, the ACK information bit associated with a corresponding SPS PDSCH reception may be represented by $o_{ack}$, and the UE 115 may generate A based on $A = A \cup o_{ack}$ (e.g., a union between A and $o_{ack}$). Accordingly, the UE 115 may generate A based on ordering the ACK information bits for PDSCHs across time on a CC by CC basis. For example, as shown, the ordering of ACK bits for the UE 115 generating the dynamic ACK codebook, A, may include ACK bits for the first PDSCH 915-a received on the first CC (e.g., CC1), then for the second PDSCH 915-b on the first CC, then for a third PDSCH 915-c received according to a second SPS 905-b on a second CC (e.g., CC2), and then for a fourth PDSCH 915-d received according to a third SPS 905-c on a third CC (e.g., CC3). With $a_n$ representing an ACK bit for a corresponding n-th PDSCH 915, A may equal $[a_1, a_2, a_3, a_4]$ in the example of ACK feedback configuration 900 (e.g., indicating ACK bits in the order of first PDSCH 915-a, second PDSCH 915-b, third PDSCH 915-c, and fourth PDSCH 915-d). Accordingly, the UE 115 may transmit ACK 920 based on the dynamic ACK codebook determined based on the above described order.

Additionally or alternatively, the UE 115 may generate A (e.g., the dynamic ACK codebook) based on a CC-first, time-second order. For example, the UE 115 may set M to be a set of OFDM symbol indices counted across slots sorted in an ascending order. Initially, the UE 115 may set A=Ø, and then while m<M, the UE 115 may set c=0. Subsequently, for c=1 to $N_{cell}^{DL}$, if there is an SPS PDSCH 915 on serving cell c with ending OFDM symbol m, the UE 115 may add an ACK bit for a PDSCH reception m in M to an order of ACK bits in order to generate A (e.g., based on $A = A \cup o_{ack}$, that is, the union between A and $o_{ack}$). For example, the UE 115 may order the ACK bits based on any PDSCHs 915 located in a first slot 925 on a first CC, any PDSCHs 915 then located in the first slot 925 on a second CC, any PDSCHs 915 located in the first slot 925 on a third CC, etc., and repeat for each subsequent slot 925 going down the list of configured CCs. As shown, the UE 115 may generate A based on an ordering of ACK bits that includes the ACK bits for first PDSCH 915-a in the first slot 925 on the first CC, then for third PDSCH 915-c in the first slot 925 on the second CC, then for fourth PDSCH 915-d in a second slot 925 on the third CC, and then for second PDSCH 915-b in a third slot 925 on the first CC. Accordingly, the UE 115 may transmit ACK 920 based on the dynamic ACK codebook determined based on the above described order.

In some cases, the UE 115 may generate A (e.g., the dynamic ACK codebook) based on a time-first, CC-second, slot-third order. Accordingly, the UE 115 may follow the time-first, CC-second order as described above, but perform the ordering for each slot separately. Subsequently, the UE 115 may concatenate the ACK bits for each slot in an ascending order of the slot index. As shown with ACK feedback configuration 900, using the time-first, CC-second, slot-third order may result in a same order and dynamic ACK codebook as the CC-first, time-second order as described above (e.g., first PDSCH 915-a, then third PDSCH 915-c, then fourth PDSCH 915-d, and then second PDSCH 915-b).

Additionally or alternatively, the UE 115 may generate a semi-static ACK codebook (e.g., type 1 codebook, semi-static HARQ-ACK codebook, type I codebook, etc.), A', using conventional means. For example, the UE 115 may determine ACK bits for each slot 925 on each CC at a time, such as ACK bits for a first slot 925 of a first CC, for a second slot 925 of the first CC, for a third slot 925 of the first CC, etc., and then repeat the determination for any subsequent configured CC for the UE 115 (e.g., in an ascending order of CC index). Accordingly, if no PDSCH 915 is included in a particular slot on a CC, the UE 115 may transmit a null (e.g., or NACK) for that particular slot. As shown, A' may include ACK bits for first PDSCH 915-a, then a null (N) (e.g., for the second slot 925 of CC1), then ACK bits for second PDSCH 915-b, then ACK bits for third PDSCH 915-c, then N (e.g., for the second slot 925 of CC2), then N (e.g., for the third slot 925 of CC2), then N (e.g., for the first slot 925 of CC3), then ACK bits for a fourth PDSCH 915-d, and then N (e.g., for the third slot 925 of CC3).

Subsequently, the UE 115 may then extract the ACK bits that correspond to the downlink SPS PDSCH receptions (e.g., the ACK bits for each received PDSCH 915) and put the extracted ACK bits into the dynamic ACK codebook, A. Accordingly, the ordering of the ACK bits in A for the PDSCHs 915 may follow the same ordering as the ordering of the ACK bits for the PDSCHs 915 in A' (e.g., excluding the Ns). For example, A may include an order of ACK bits for PDSCHs 915 including for first PDSCH 915-a, then for second PDSCH 915-b, then for third PDSCH 915-c, and then ACK for fourth PDSCH 915-d.

The above described ordering techniques may also be applied for ACK feedback configuration 901. For example, as shown, for the time-first, CC-second order, the UE 115 may generate A based on an order of ACK bits for a first PDSCH 915-e, then for a second PDSCH 915-f, then for a third PDSCH 915-g, then for a fourth PDSCH 915-h, and then for a fifth PDSCH 915-i. Additionally or alternatively, for the CC-first, time-second order, the UE 115 may generate A based on an order of ACK bits for first PDSCH 915-e, then for fifth PDSCH 915-i (e.g., based on fifth PDSCH 915-i having an earlier ending OFDM symbol than second PDSCH 915-f), then for second PDSCH 915-f, then for fourth PDSCH 915-h, then for third PDSCH 915-g. Additionally or alternatively, for the time-first, CC-second, slot-third order, the UE 115 may generate A based on an order of ACK bits for first PDSCH 915-e, then for second PDSCH 915-f (e.g., based on second PDSCH 915-f being received in the same slot and on the same CC as first PDSCH 915-e), then for fifth PDSCH 915-i, then for fourth PDSCH 915-h, and then for third PDSCH 915-g. If the UE 115 generates the semi-static ACK codebook, A', and extracts the ACK bits for the PDSCHs 915 to generate the dynamic ACK codebook, A, the order of the ACK bits may be the same as the above described order for the time-first, CC-second ordering (e.g., first PDSCH 915-e, second PDSCH 915-f, third PDSCH 915-g, fourth PDSCH 915-h, and fifth PDSCH 915-i).

In some cases, different SPSs 905 on different CCs may have different numerologies. For example, first SPS 905-a may have a first SCS, second SPS 905-b may have a second SCS that is the same or different than the first SCS, and third SPS 905-c may have a third SCS that is the same or different than the first SCS and/or second SCS. The different SCSs may indicate different number of frequency subcarriers that can be used for receiving and transmitting messages on each CC, which may then correspond to different length TTIs that the UE 115 can use. However, the different SCSs may impact how the UE 115 determines the ordering of the ACK bits for received PDSCHs 915 received according to each SPS 905 on each CC.

Figure 10:
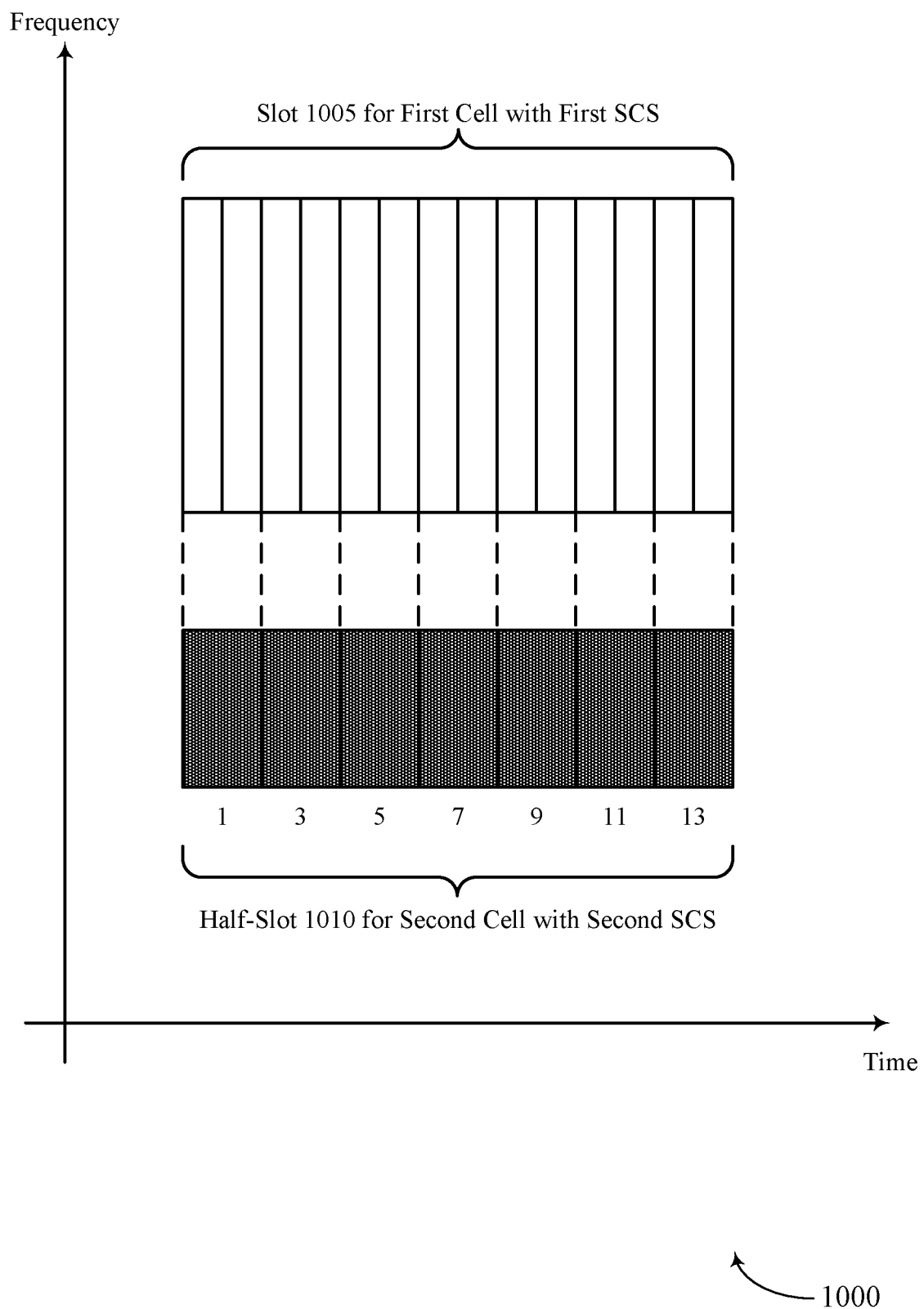
FIG. 10 illustrates an example of a mixed numerology configuration that supports ACK feedback for multiple active downlink SPS configurations in accordance with aspects of the present disclosure.

FIG. 10 illustrates an example of a mixed numerology configuration 1000 that supports ACK feedback for multiple active downlink SPS configurations in accordance with aspects of the present disclosure. In some examples, mixed numerology configuration 1000 may implement aspects of wireless communications systems 100 and/or 200. Mixed numerology configuration 1000 may include a slot 1005 for a first cell (e.g., CC1) with a first SCS and a half-slot 1010 for a second cell (e.g., CC2) with a second SCS. For example, the first SCS may be 30 kHz, and the second SCS may be 15 kHz. Accordingly, with a SCS half the size, the half-slot 1010 may include half the TTIs (e.g., symbols) as slot 1005 for a given duration, but the TTIs for half-slot 1010 may be twice the size as TTIs (e.g., symbols) for slot 1005. When determining a dynamic ACK codebook for transmitting ACK feedback for received PDSCHs as described above with reference to FIG. 9, the different SCSs may impact how a UE 115 orders the corresponding ACK bits when determining an order of the ACK bits based in part on time (e.g., time-first, time-second, etc.).

As described herein, in case of mixed numerologies (e.g., downlink serving cells may be configured with different SCSs), the UE 115 may set OFDM symbol indices for each SPS PDSCH reception using a downlink serving cell with a highest SCS. Additionally, OFDM symbol indices may be counted across slots (e.g., not restricted to smaller than 14). For example, as shown, since slot 1005 has the higher SCS (e.g., 30 kHz versus 15 kHz for half-slot 1010), the OFDM symbol indices for both slot 1005 and for half-slot 1010 may be set based on the OFDM symbol indices for slot 1005.

For example, as shown, the first index for a first OFDM symbol of half-slot 1010 may be one (1) to correspond with the second OFDM symbol of slot 1005 (e.g., based on the first OFDM symbol of slot 1005 starting at index 0), the second index for a second OFDM symbol of half-slot 1010 may be 3 to correspond with the fourth OFDM symbol of slot 1005, the third index for a third OFDM symbol of half-slot 1010 may be 5 to correspond with the sixth OFDM symbol of slot 1005, the fourth index for a fourth OFDM symbol of half-slot 1010 may be 7 to correspond with the eighth OFDM symbol of slot 1005, the fifth index for a fifth OFDM symbol of half-slot 1010 may be 9 to correspond with the tenth OFDM symbol of slot 1005, the sixth index for a sixth OFDM symbol of half-slot 1010 may be 11 to correspond with the twelfth OFDM symbol of slot 1005, and the seventh index for a seventh OFDM symbol of half-slot 1010 may be 13 to correspond with the fourteenth OFDM symbol of slot 1005.

Accordingly, the UE 115 may then determine the orderings of ACK bits based on an ascending order of OFDM symbol indices where applicable (e.g., for the CC-first, time-second ordering; the time-first, CC-second, slot-third ordering; etc., as described above with reference to FIG. 9). For the time-first, CC-second, slot-third ordering, in case of mixed numerologies for the different CCs, the UE 115 may determine the slot for the ordering determination based on the different SCSs and/or slot duration. For example, the UE 115 may use a slot for the ordering determination based on the slot on a downlink cell with a lowest SCS (e.g., the downlink cell that has the longest slot duration). Additionally or alternatively, the UE 115 may use a slot for the ordering determination based on the slot duration of the uplink cell on which the UE 115 transmits the HARQ-ACK feedback (e.g., whichever slot duration is used on a PUCCH carrier for transmitting the ACK feedback for the one or more received PDSCHs).

Figure 11:
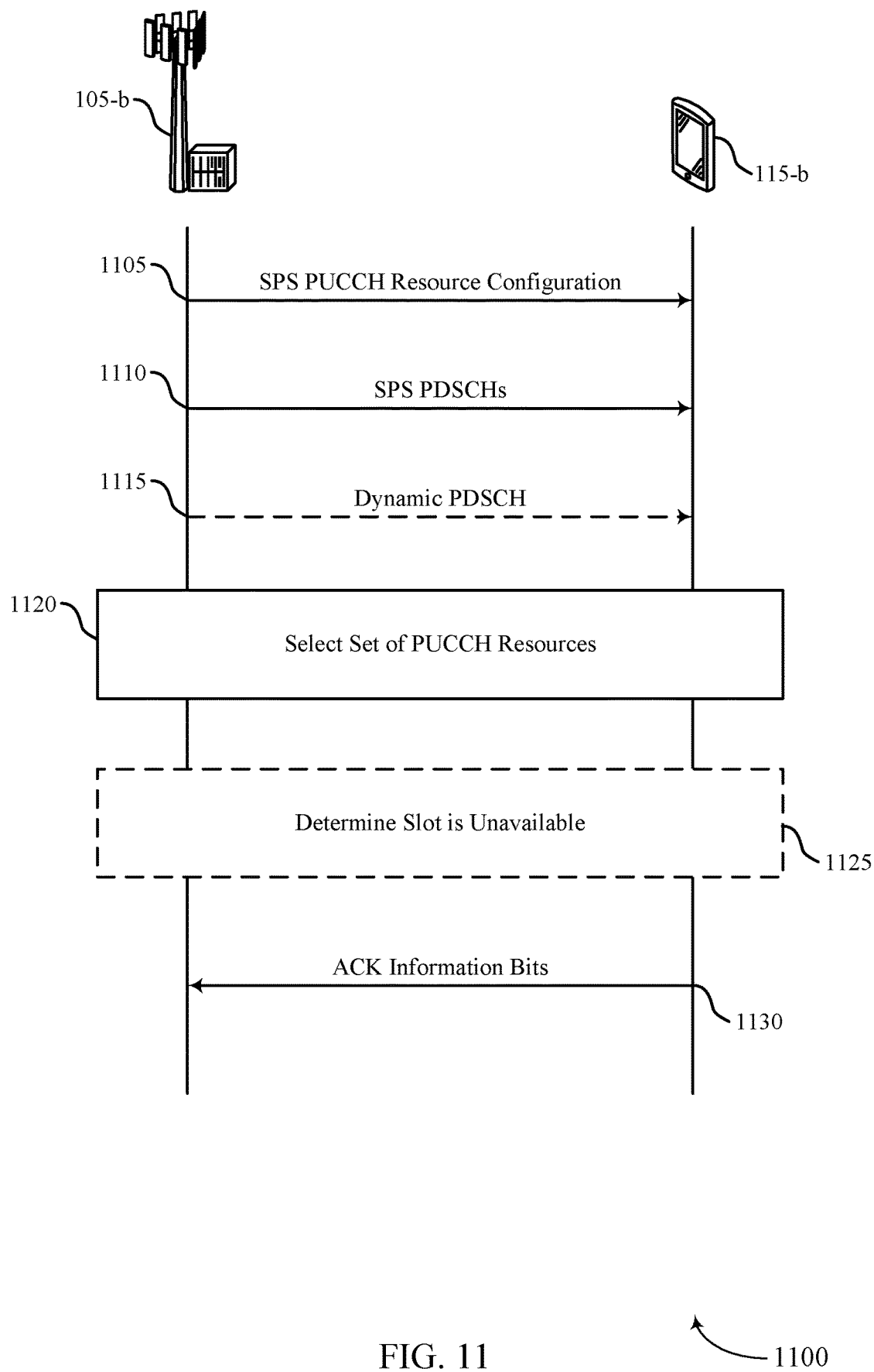
FIG. 11 illustrates an example of a process flow that supports ACK feedback for multiple active downlink SPS configurations in accordance with aspects of the present disclosure.

FIG. 11 illustrates an example of a process flow 1100 that supports ACK feedback for multiple active downlink SPS configurations in accordance with aspects of the present disclosure. In some examples, process flow 1100 may implement aspects of wireless communications systems 100 and/ or 200. Process flow 1100 may include a base station 105-*b* and a UE 115-*b*, which may be examples of corresponding base stations 105 and UEs 115, respectively, as described above with reference to FIGS. 1-10. In some cases, UE 115-*b* may support multiple downlink SPSs for receiving periodic traffic from base station 105-*b* and may transmit an ACK for the periodic traffic in a PUCCH configured by base station 105-*b*.

In the following description of the process flow 1100, the operations between UE 115-*b* and base station 105-*b* may be transmitted in a different order than the order shown, or the operations performed by base station 105-*b* and UE 115-*b* may be performed in different orders or at different times. Certain operations may also be left out of the process flow 1100, or other operations may be added to the process flow 1100. It is to be understood that while base station 105-*b* and UE 115-*b* are shown performing a number of the operations of process flow 1100, any wireless device may perform the operations shown.

At 1105, UE 115-*b* may receive, from base station 105-*b*, a configuration identifying multiple sets of control channel (e.g., PUCCH) resources for a set of SPS configurations, the multiple sets of control channel resources including at least one set corresponding to multiple of the set of SPS configurations (e.g., and at least one set corresponding to an individual one set of the set of SPS configurations). In some cases, UE 115-*b* may receive, from base station 105-*b*, the set of SPS configurations, including a first SPS configuration and a second SPS configuration. Additionally, the second SPS configuration of the set of SPS configuration may be a same SPS configuration as the first SPS configuration or may be a different SPS configuration than the first SPS configuration. In some cases, the set of SPS configurations may be configured on a set of CCs. Additionally, multiple of the set of SPS configurations may be active for UE 115-*b* during a same time. In some cases, the at least one set corresponding to the individual one set of the set of SPS configurations may be received in a corresponding SPS configuration of the set of SPS configurations. Additionally or alternatively, the configuration identifying the at least one set of control channel resources corresponding to multiple sets of the set of SPS configurations may be received in a PUCCH configuration.

At 1110, UE 115-*b* may receive, from base station 105-*b*, a first downlink signal (e.g., PDSCH) according to a first SPS configuration of the set of SPS configurations and a second downlink signal (e.g., PDSCH) according to a second SPS configuration of the set of SPS configurations, where ACK information for the first downlink signal and the second downlink signal is scheduled to be transmitted during a slot. In some cases, UE 115-*b* may receive the first SPS configuration and the second SPS configuration in RRC signaling.

At 1115, UE 115-*b* may receive, from base station 105-*b* and within the slot, a third downlink signal scheduled according to a dynamic scheduling (e.g., a dynamic PDSCH). Additionally, base station 105-*b* may schedule UE 115-*b* to transmit ACK information for the third downlink signal in the same slot as the ACK information for the first downlink signal and the second downlink signal. In some cases, UE 115-*b* may receive the dynamic scheduling in DCI. Additionally, UE 115-*b* (e.g., and/or base station 105-*b*) may identify a type of codebook configured for UE 115-*b*, the type of codebook being one of a semi-static codebook (e.g., Type I, Type 1, etc.) or a dynamic codebook (e.g., Type II, Type 2, etc.).

In some cases, UE 115-*b* may receive one or more dynamically scheduled downlink signals according to the dynamic configuration, where the dynamically scheduled downlink signals include an indication of corresponding ACK messages to be transmitted for the dynamically scheduled downlink signals. Accordingly, UE 115-*b* may combine the ACK information bits for the first downlink signal and the second downlink signal with the ACK messages to be transmitted for the dynamically scheduled downlink signals and may transmit, to base station 105-*b*, the combined ACK information bits with the ACK messages to be transmitted for the dynamically scheduled downlink signals based on an ACK codebook. For example, the ACK codebook may include a semi-static codebook based on a first occasion that the first downlink signal is received and a second occasion that the second downlink signal is received, where the ACK information bits for the first downlink signal and the second downlink signal are combined with the ACK messages to be transmitted for the dynamically scheduled downlink signals based on the semi-static codebook. Additionally or alternatively, the ACK codebook may include a dynamic codebook (e.g., based on a downlink assignment index in an activation message for the first SPS configuration), where the ACK information bits for the first downlink signal and the second downlink signal are appended to the ACK messages to be transmitted for the dynamically scheduled downlink signals based on the dynamic codebook.

At 1120, UE 115-*b* may select, based on a number of ACK information bits for the first downlink signal and the second downlink signal, a set of control channel resources of the multiple sets of control channel resources identified by the received configuration. In some cases, UE 115-*b* may compare the number of ACK information bits to a threshold number of bits (e.g., a maximum payload size) and select the set of control channel resources from among the multiple sets of control channel resources based on the comparing. For example, the configuration received at 1105 may further identify the threshold number of bits, where the threshold number of bits includes two (2) bits. In some cases, the number of ACK bits may be determined based on the identified type of codebook. Additionally, the ACK bits may include HARQ-ACK information bits. Additionally or alternatively, base station 105-*b* may perform similar techniques as UE 115-*b* to select the set of control channel resources as described at 1120. In some cases, UE 115-*b* may determine to use a set of the at least one set of control channel resources corresponding to multiple sets of the set of SPS configurations based on identifying that the number of ACK information bits is greater than one. Additionally or alternatively, UE 115-*b* may determine to use a set of the at least one set of control channel resources corresponding to the individual one set of the set of SPS configurations based on identifying that the number of ACK information bits is one (1).

At 1125, UE 115-*b* may identify a first slot for transmitting the ACK bits using the selected set of control channel resources, determine that at least one symbol in the selected set of control channel resources in the identified first slot is unavailable for transmitting the ACK information bits, and determine that a second slot is a next available slot for transmitting ACK information bits. Additionally, UE 115-*b* may identify the second slot for transmitting the ACK information bits for the one of the SPS configurations, where the second slot includes the slot during which ACK information bits for the first downlink signal and the second downlink signal are scheduled to be transmitted. Accordingly, UE 115-*b* may combine ACK information for the first downlink signal received according to the first SPS configuration and the second downlink signal received according to the one of the plurality of SPS configurations and determine, for the combined ACK information, a set of control channel resources from the multiple sets of control channel resources. In some cases, the second slot may immediately follow the first slot that is unavailable. Additionally or alternatively, base station 105-*b* may perform similar techniques as UE 115-*b* to determine if a slot is unavailable as described at 1125.

At 1130, UE 115-*b* may transmit, to base station 105-*b*, the ACK bits using the selected set of control channel resources. In some cases, UE 115-*b* may identify a control channel format (e.g., PUCCH format 0, PUCCH format 1, etc.) to transmit the ACK information bits and transmit the ACK information bits to base station 105-*b* according to the identified control channel format using the selected set of control channel resources. Additionally or alternatively, UE 115-*b* may transmit the ACK information bits in the second slot based on the second slot being the next available slot. In some cases, UE 115-*b* may identify a threshold number of slots allowable to delay transmitting the ACK information and transmit the ACK bits in the second slot based on the second slot being the next available slot and the second slot being less than or equal to the threshold number of slots. For example, UE 115-*b* may receive, from base station 105-*b*, an indication of the threshold number of slots allowable for UE 115-*b* to delay transmitting the ACK information following the slot.

In some cases, UE 115-*b* may determine an order of a set of downlink signals received according to the set of SPS configurations and may generate, for transmitting the ACK information bits to base station 105-*b*, an ACK codebook based on the determined order of the set of downlink signals. For example, the order of the set of downlink signals may be determined based on a corresponding index of each of the set of SPS configurations and a CC index, where each of the set of SPS configurations are configured within a same CC associated with the CC index. In some cases, the determined order of the set of downlink signals may include a time-first, CC-second order; a CC-first, time-second order; a time-first, CC-second, slot-third order; or a combination thereof. Additionally, UE 115-*b* may determine, for each TTI that a downlink signal can be received for each of the set of SPS configurations, a common index number based on a downlink serving cell with a highest SCS, where the CC-first, time-second order is determined based on the determined common index number. In some cases, UE 115-*b* may also determine for the time-first, CC-second, slot-third order, a slot to use for the determined order based on a slot of a downlink cell with a lowest SCS, a slot duration of an uplink cell used for transmitting the ACK information bits, or a combination thereof.

Additionally or alternatively, UE 115-*b* may generate a semi-static ACK codebook including the ACK information bits and default values for transmission occasions where no downlink signal is received. Subsequently, UE 115-*b* may extract the ACK information bits from the semi-static ACK codebook to generate a dynamic ACK codebook, where an order of the ACK information bits is the same for the semi-static ACK codebook and the dynamic ACK codebook.

Figure 12:
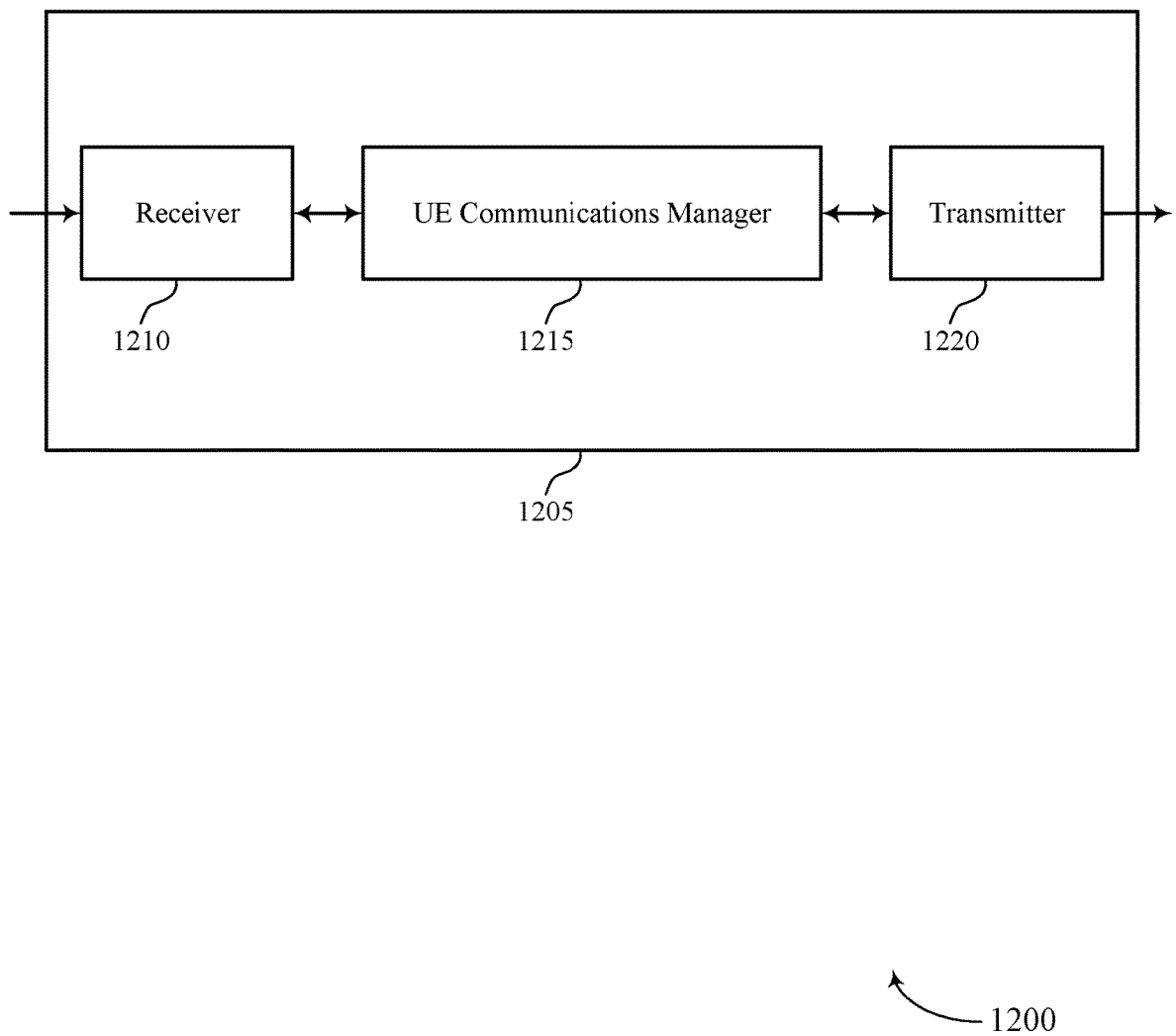
FIGS. 12 and 13 show block diagrams of devices that support ACK feedback for multiple active downlink SPS configurations in accordance with aspects of the present disclosure.

FIG. 12 shows a block diagram 1200 of a device 1205 that supports ACK feedback for multiple active downlink SPS configurations in accordance with aspects of the present disclosure. The device 1205 may be an example of aspects of a UE 115 as described herein. The device 1205 may include a receiver 1210, a UE communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to ACK feedback for multiple active downlink SPS configurations, etc.). Information may be passed on to other components of the device 1205. The receiver 1210 may be an example of aspects of the transceiver 1520 described with reference to FIG. 15. The receiver 1210 may utilize a single antenna or a set of antennas.

The UE communications manager 1215 may receive a configuration identifying a plurality of sets of control channel resources for a plurality of SPS configurations, the plurality of sets of control channel resources including at least one set corresponding to multiple of the plurality of SPS configurations. Additionally, the UE communications manager 1215 may receive a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot. In some cases, the UE communications manager 1215 may select, based on a number of ACK information bits for the first downlink signal and the second downlink signal, a set of control channel resources of the plurality of sets of control channel resources identified by the received configuration. Accordingly, the UE communications manager 1215 may transmit the ACK information bits to the base station using the selected set of control channel resources. The UE communications manager 1215 may be an example of aspects of the UE communications manager 1510 described herein.

Based on the actions performed by the UE communications manager 1015 as described herein, a UE 115 may reduce latency for transmitting ACK feedback for multiple downlink signals received according to multiple SPS configurations. For example, rather than prioritizing one downlink signal and transmitting a single ACK feedback for the prioritized downlink signal (e.g., and refraining from transmitting ACK feedback for any additional downlink signals received and/or transmitting a NACK for the additional downlink signals), the UE 115 may use the configured control channel resources to transmit ACK feedback for each received downlink signal. Accordingly, the UE 115 may reduce the time needed to prepare ACK feedback for all of the downlink signals and may reduce the need of any retransmissions or mitigations for the SPS configurations.

The UE communications manager 1215, or its sub-components, may be implemented in hardware, code (e.g., software or firmware) executed by a processor, or any combination thereof. If implemented in code executed by a processor, the functions of the UE communications manager 1215, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 1215, or its sub-components, may be physically located at various positions, including being distributed such that portions of functions are implemented at different physical locations by one or more physical components. In some examples, the UE communications manager 1215, or its sub-components, may be a separate and distinct component in accordance with various aspects of the present disclosure. In some examples, the UE communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
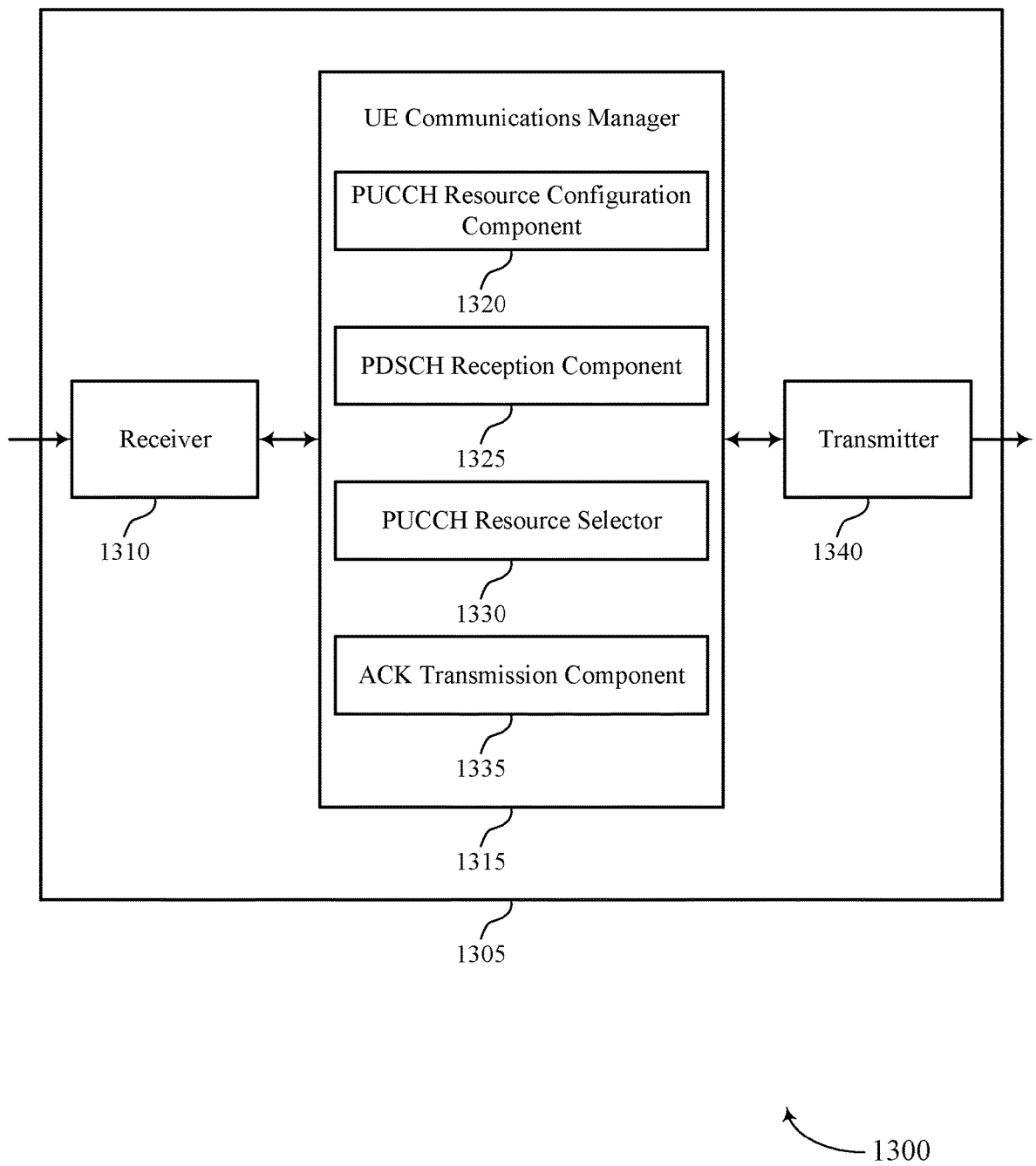

FIG. 13 shows a block diagram 1300 of a device 1305 that supports ACK feedback for multiple active downlink SPS configurations in accordance with aspects of the present disclosure. The device 1305 may be an example of aspects of a device 1205, or a UE 115 as described herein. The device 1305 may include a receiver 1310, a UE communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to ACK feedback for multiple active downlink SPS configurations, etc.). Information may be passed on to other components of the device 1305. The receiver 1310 may be an example of aspects of the transceiver 1520 described with reference to FIG. 15. The receiver 1310 may utilize a single antenna or a set of antennas.

The UE communications manager 1315 may be an example of aspects of the UE communications manager 1215 as described herein. The UE communications manager 1315 may include a PUCCH resource configuration component 1320, a PDSCH reception component 1325, a PUCCH resource selector 1330, and an ACK transmission component 1335. The UE communications manager 1315 may be an example of aspects of the UE communications manager 1510 described herein.

The PUCCH resource configuration component 1320 may receive a configuration identifying a plurality of sets of control channel resources for a plurality of SPS configurations, the plurality of sets of control channel resources including at least one set corresponding to multiple of the plurality of SPS configurations.

The PDSCH reception component 1325 may receive a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot.

The PUCCH resource selector 1330 may select, based on a number of ACK information bits for the first downlink signal and the second downlink signal, a set of control channel resources of the plurality of sets of control channel resources identified by the received configuration.

The ACK transmission component 1335 may transmit the ACK information bits to the base station using the selected set of control channel resources.

Based on receiving the configuration identifying the control channel resources for a plurality of SPS configurations, a processor of a UE 115 (e.g., controlling the receiver 1110, the transmitter 1140, or a transceiver 1320 as described with reference to FIG. 13) may efficiently prepare ACK information bits to transmit to a base station 105 for multiple received downlink signals from the base station 105. For example, the processor of the UE 115 may multiplex (e.g., or combine) the ACK information for each downlink signal and transmit the multiplexed ACK information on at least one control channel resource from the configuration identifying the control channel resources. Conventionally, the processor may have prepared individual ACK information for each downlink signal and transmitted the ACK information separately for each downlink signal, thereby increasing the amount of resources needed for each transmission and increasing latency for the amount of time needed for preparing each ACK information. Accordingly, by using the control channel resources from the configuration identifying the control channel resources, the UE 115 may efficiently use uplink resources for transmitting ACK information for all of the downlink signals simultaneously.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
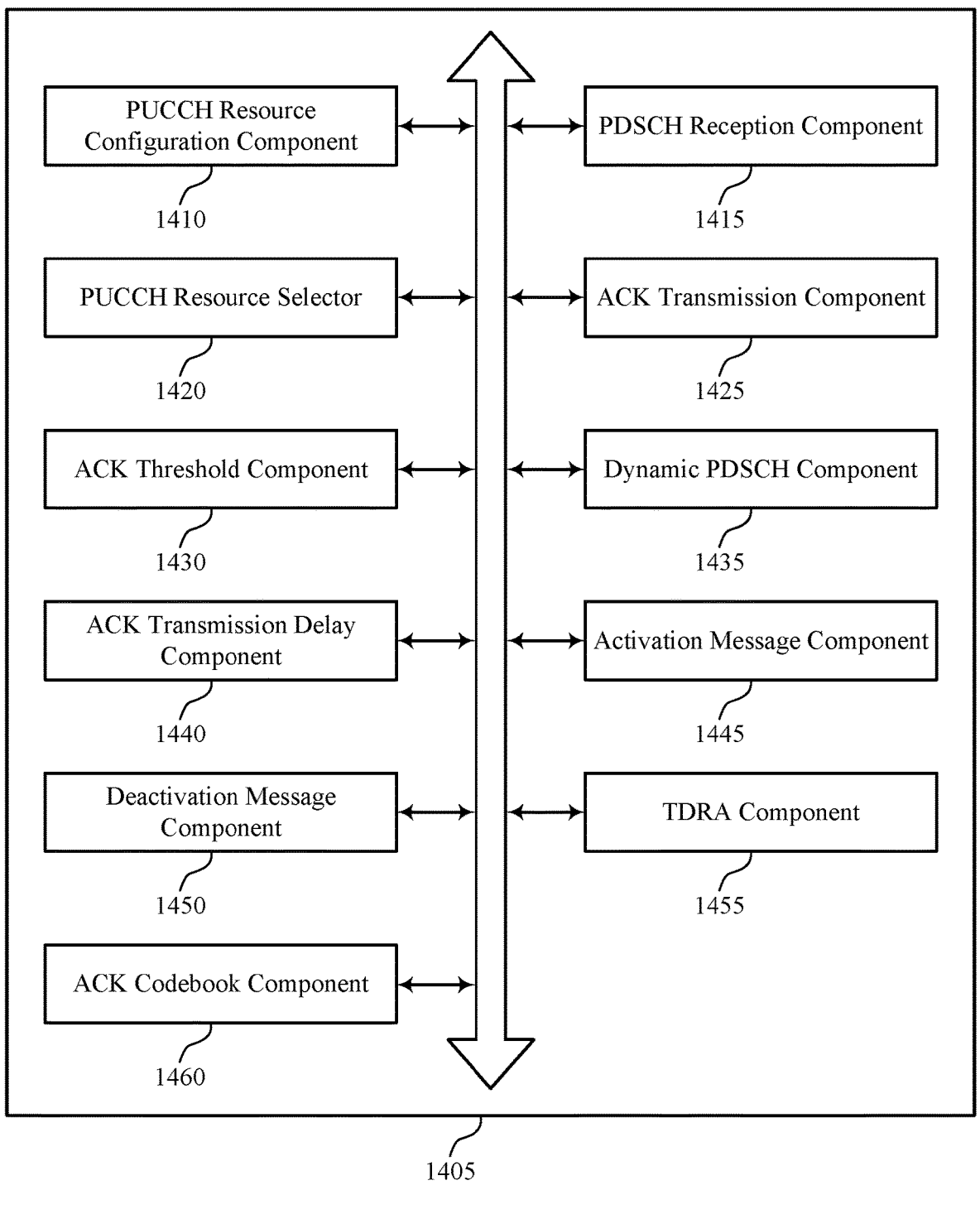
FIG. 14 shows a block diagram of a UE communications manager that supports ACK feedback for multiple active downlink SPS configurations in accordance with aspects of the present disclosure.

FIG. 14 shows a block diagram 1400 of a UE communications manager 1405 that supports ACK feedback for multiple active downlink SPS configurations in accordance with aspects of the present disclosure. The UE communications manager 1405 may be an example of aspects of a UE communications manager 1215, a UE communications manager 1315, or a UE communications manager 1510 described herein. The UE communications manager 1405 may include a PUCCH resource configuration component 1410, a PDSCH reception component 1415, a PUCCH resource selector 1420, an ACK transmission component 1425, an ACK threshold component 1430, a dynamic PDSCH component 1435, an ACK transmission delay component 1440, an activation message component 1445, a deactivation message component 1450, a TDRA component 1455, and an ACK codebook component 1460. Each of these modules may communicate, directly or indirectly, with one another (e.g., via one or more buses).

The PUCCH resource configuration component 1410 may receive a configuration identifying a plurality of sets of control channel resources for a set of SPS configurations, the plurality of sets of control channel resources including at least one set corresponding to multiple of the plurality of SPS configurations. In some examples, multiple of the plurality of SPS configurations may be active for the UE during a same time. In some cases, the plurality of SPS configurations may be configured on a set of CCs. Additionally, the at least one set corresponding to the individual one of the plurality of SPS configurations may be received in a corresponding SPS configuration of the plurality of SPS configurations. In some cases, the configuration identifying the at least one set of control channel resources corresponding to the multiple of the plurality of SPS configurations may be received in a PUCCH configuration.

The PDSCH reception component 1415 may receive a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot. In some examples, the PDSCH reception component 1415 may receive, from the base station, the plurality of SPS configurations, including the first SPS configuration and the second SPS configuration. Additionally, the second SPS configuration of the plurality of SPS configurations may be a same SPS configuration as the first SPS configuration or may be a different SPS configuration than the first SPS configuration.

The PUCCH resource selector 1420 may select, based on a number of ACK information bits for the first downlink signal and the second downlink signal, a set of control channel resources of the plurality of sets of control channel resources identified by the received configuration. In some examples, the PUCCH resource selector 1420 may determine to use a set of the at least one set of control channel resources corresponding to the multiple of the plurality of SPS configurations based on identifying that the number of ACK information bits is greater than one. Additionally or alternatively, the PUCCH resource selector 1420 may determine to use a set of the at least one set of control channel resources corresponding to the individual one of the plurality of SPS configurations based on identifying that the number of ACK information bits is one.

The ACK transmission component 1425 may transmit the ACK information bits to the base station using the selected set of control channel resources. In some cases, the ACK information bits may include HARQ-ACK information bits.

The ACK threshold component 1430 may compare the number of ACK information bits to a threshold number of bits and may select the set of control channel resources from among the plurality of sets of control channel resources based on the comparing. In some examples, the ACK threshold component 1430 may identify a control channel format to use to transmit the ACK information bits and may transmit the ACK information bits to the base station according to the identified control channel format using the selected set of control channel resources. In some cases, the received configuration may further identify the threshold number of bits. Additionally, the threshold number of bits may include two bits.

The dynamic PDSCH component 1435 may receive, in the slot, a third downlink signal scheduled according to a dynamic configuration. In some examples, the dynamic PDSCH component 1435 may receive the first SPS configuration and the second SPS configuration in RRC signaling and may receive the dynamic configuration in DCI. Additionally, the dynamic PDSCH component 1435 may identify a type of codebook configured for the UE, the type of codebook being one of a semi-static codebook or a dynamic codebook, where the number of ACK bits are determined based on the identified type of codebook.

The ACK transmission delay component 1440 may identify a first slot for transmitting the ACK information bits using the selected set of control channel resources, determine that at least one symbol in the selected set of control channel resources in the identified first slot is unavailable for transmitting the ACK information bits, determine that a second slot is a next available slot for transmitting ACK information bits, and transmit the ACK information bits in the second slot based on the second slot being the next available slot. In some examples, the ACK transmission delay component 1440 may identify the second slot for transmitting the ACK information bits for the one of the SPS configurations, where the second slot includes the slot during which the first downlink signal and the second downlink signal are scheduled to be transmitted, combine ACK information for the first downlink signal received according to the first SPS configuration and the second downlink signal received according to the one of the plurality of SPS configurations, and determine, for the combined ACK information, a set of control channel resources from the plurality of sets of control channel resources.

Additionally or alternatively, the ACK transmission delay component 1440 may receive, from the base station, an indication of a threshold number of slots allowable for the UE to delay transmitting the ACK information following the slot. Accordingly, the ACK transmission delay component 1440 may identify the threshold number of slots allowable to delay transmitting the ACK information and may transmit the ACK information bits in the second slot based on the second slot being the next available slot and the second slot being less than or equal to the threshold number of slots. In some cases, the second slot may immediately follow the first slot that is unavailable.

The activation message component 1445 may receive an activation message for starting communications according to the first SPS configuration, where the first downlink signal is received based on the activation message. Additionally, the activation message component 1445 may identify an uplink resource indicator in the activation message, the uplink resource indicator including an indication of an uplink resource for transmitting the ACK information bits to the base station, and may transmit a first set of the ACK information bits to the base station based on the uplink resource indicator. In some cases, the activation message component 1445 may transmit subsequent sets of the ACK information bits after the first set of ACK information bits based on the selected set of control channel resources.

In some examples, the activation message component 1445 may receive one or more dynamically scheduled downlink signals, where the dynamically scheduled downlink signals include an indication of corresponding ACK messages to be transmitted for the dynamically scheduled downlink signals, combine the first set of the ACK information bits with the ACK messages to be transmitted for the dynamically scheduled downlink signals, and transmit, to the base station, the combined first set of the ACK information bits with the ACK messages to be transmitted for the dynamically scheduled downlink signals based on an ACK codebook. In some cases, the ACK codebook may include a semi-static codebook based on a first occasion that the first downlink signal is received and a second occasion that the second downlink signal is received, where the ACK information bits for the first downlink signal and the second downlink signal may be combined with the ACK messages to be transmitted for the dynamically scheduled downlink signals based on the semi-static codebook. Additionally or alternatively, the ACK codebook may include a dynamic codebook (e.g., based on a downlink assignment index in the activation message), where the ACK information bits for the first downlink signal and the second downlink signal are appended to the ACK messages to be transmitted for the dynamically scheduled downlink signals based on the dynamic codebook.

The deactivation message component 1450 may receive a deactivation message for ending communications according to the first SPS configuration, determine an uplink resource for transmitting an ACK message based on receiving the deactivation message, and transmit the ACK message using the determined uplink resource. In some examples, the deactivation message component 1450 may combine the ACK message with one or more additional ACK messages from additional SPS configurations, dynamic downlink messages, or a combination thereof, and may transmit, to the base station, the combined ACK messages based on an ACK codebook. In some cases, the ACK codebook may include a semi-static codebook based on one or more occasions where downlink messages are received according to the plurality of SPS configurations and an occasion where the deactivation message is received or may include a dynamic codebook based on concatenating the ACK message for the deactivation message to the ACK information bits for the first downlink signal and the second downlink signal. In some cases, the determined uplink resource may include an indicated uplink resource via an uplink resource indicator included in the deactivation message or the selected set of control channel resources.

The TDRA component 1455 may determine a list of TDRAs for receiving corresponding downlink signals for the plurality of SPS configurations in the first slot, where at least one SPS configuration of the plurality of SPS configurations includes a periodicity less than a length of a first slot (e.g., subslot periodicity). Additionally, the TDRA component 1455 may determine an additional TDRA for the at least one SPS configuration that occurs in the first slot with the list of TDRAs based on the periodicity being less than the length of the first slot. Subsequently, the TDRA component 1455 may determine an ACK codebook based on the list of TDRAs and the additional TDRA. Accordingly, the TDRA component 1455 may transmit ACK messages for the corresponding downlink signals for the plurality of SPS configurations according to the determined ACK codebook. In some cases, the additional TDRA may be determined based on an indicated TDRA in an activation message for starting communications according to one or more SPS configurations of the plurality of SPS configurations (e.g., activation DCI). Additionally or alternatively, the additional TDRA may be determined based on all of the TDRAs in the list of TDRAs that have a length smaller than or equal to a period of the at least one SPS configuration.

In some examples, the TDRA component 1455 may determine the ACK codebook based on a list of potential TDRAs. Additionally or alternatively, the TDRA component 1455 may receive, from the base station, an indication of the list of TDRAs including the additional TDRA. In some cases, the indication may be received within an activation message for starting communications according to one or more SPS configurations of the plurality of SPS configurations.

The ACK codebook component 1460 may determine an order of a set of downlink signals received according to the plurality of SPS configurations and may generate, for transmitting the ACK information bits to the base station, an ACK codebook based on the determined order of the set of downlink signals. For example, the order of the set of downlink signs may be determined based on a corresponding index of each of the plurality of SPS configurations. In some cases, the determined order of the set of downlink signals may include a time-first, CC-second order; a CC-first, time-second order; a time-first, CC-second, slot-third order; or a combination thereof. Additionally, the ACK codebook component 1460 may determine, for each TTI that a downlink signal can be received for each of the plurality of SPS configurations, a common index number based on a downlink serving cell with a highest SCS, where the CC-first, time-second order is determined based on the determined common index number. In some cases, the ACK codebook component 1460 may also determine for the time-first, CC-second, slot-third order, a slot to use for the determined order based on a slot of a downlink cell with a lowest SCS, a slot duration of an uplink cell used for transmitting the ACK information bits, or a combination thereof.

Additionally or alternatively, the ACK codebook component 1460 may generate a semi-static ACK codebook including the ACK information bits and default values for transmission occasions where no downlink signal is received. Subsequently, the ACK codebook component 1460 may extract the ACK information bits from the semi-static ACK codebook to generate a dynamic acknowledgment codebook, where an order of the ACK information bits is the same for the semi-static ACK codebook and the dynamic ACK codebook.

Figure 15:
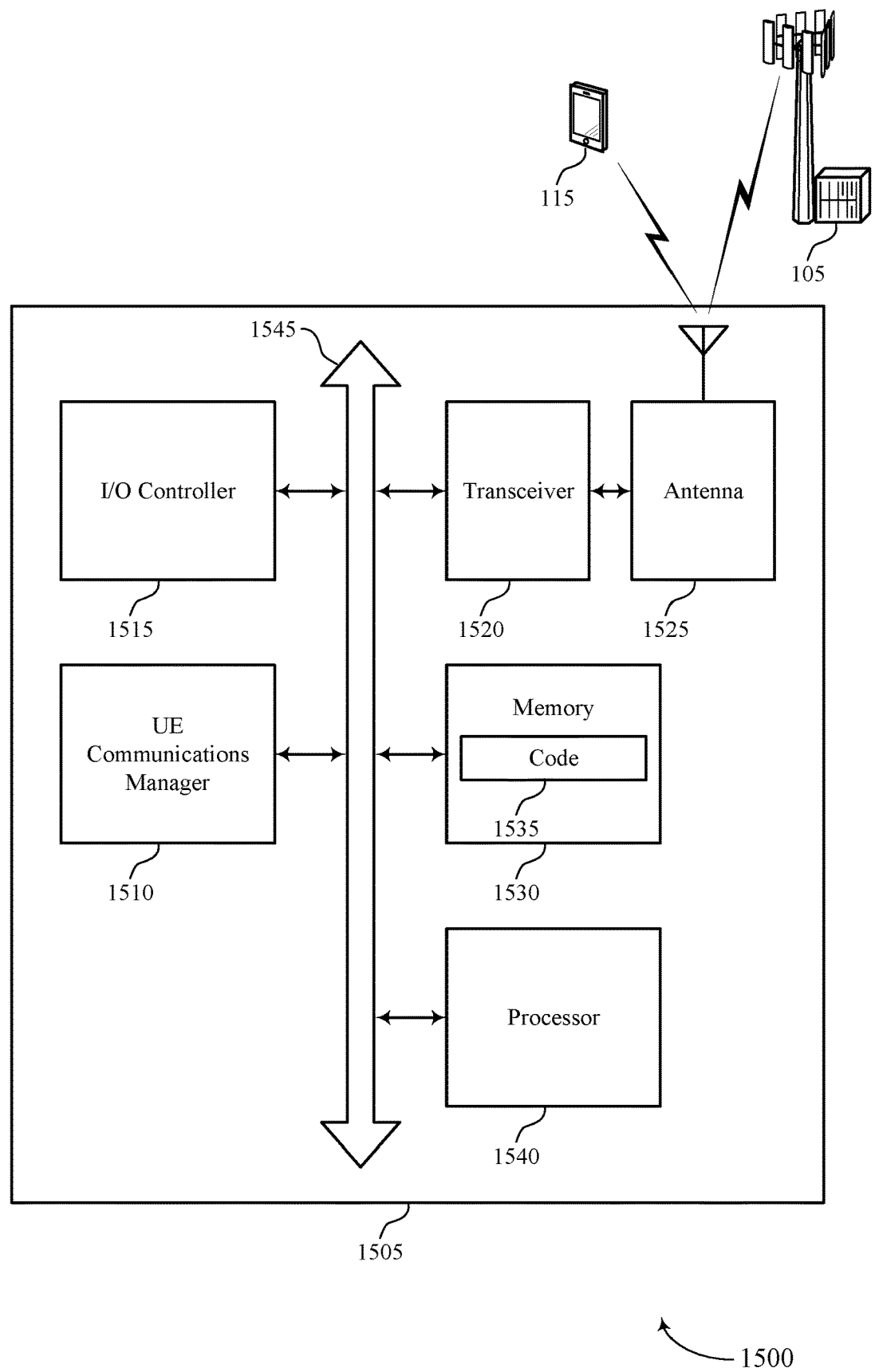
FIG. 15 shows a diagram of a system including a device that supports ACK feedback for multiple active downlink SPS configurations in accordance with aspects of the present disclosure.

FIG. 15 shows a diagram of a system 1500 including a device 1505 that supports ACK feedback for multiple active downlink SPS configurations in accordance with aspects of the present disclosure. The device 1505 may be an example of or include the components of device 1205, device 1305, or a UE 115 as described herein. The device 1505 may include components for bi-directional voice and data communications including components for transmitting and receiving communications, including a UE communications manager 1510, an I/O controller 1515, a transceiver 1520, an antenna 1525, memory 1530, and a processor 1540. These components may be in electronic communication via one or more buses (e.g., bus 1545).

The UE communications manager 1510 may receive a configuration identifying a plurality of sets of control channel resources for a plurality of SPS configurations, the plurality of sets of control channel resources including at least one set corresponding to multiple of the plurality of SPS configurations. Additionally, the UE communications manager 1510 may receive a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot. In some cases, the UE communications manager 1510 may select, based on a number of ACK information bits for the first downlink signal and the second downlink signal, a set of control channel resources of the plurality of sets of control channel resources identified by the received configuration. Accordingly, the UE communications manager 1510 may transmit the ACK information bits to the base station using the selected set of control channel resources.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include random-access memory (RAM) and read-only memory (ROM). The memory 1530 may store computer-readable, computer-executable code 1535 including instructions that, when executed, cause the processor to perform various functions described herein. In some cases, the memory 1530 may contain, among other things, a basic I/O system (BIOS) which may control basic hardware or software operation such as the interaction with peripheral components or devices.

The processor 1540 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting ACK feedback for multiple active downlink SPS configurations).

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
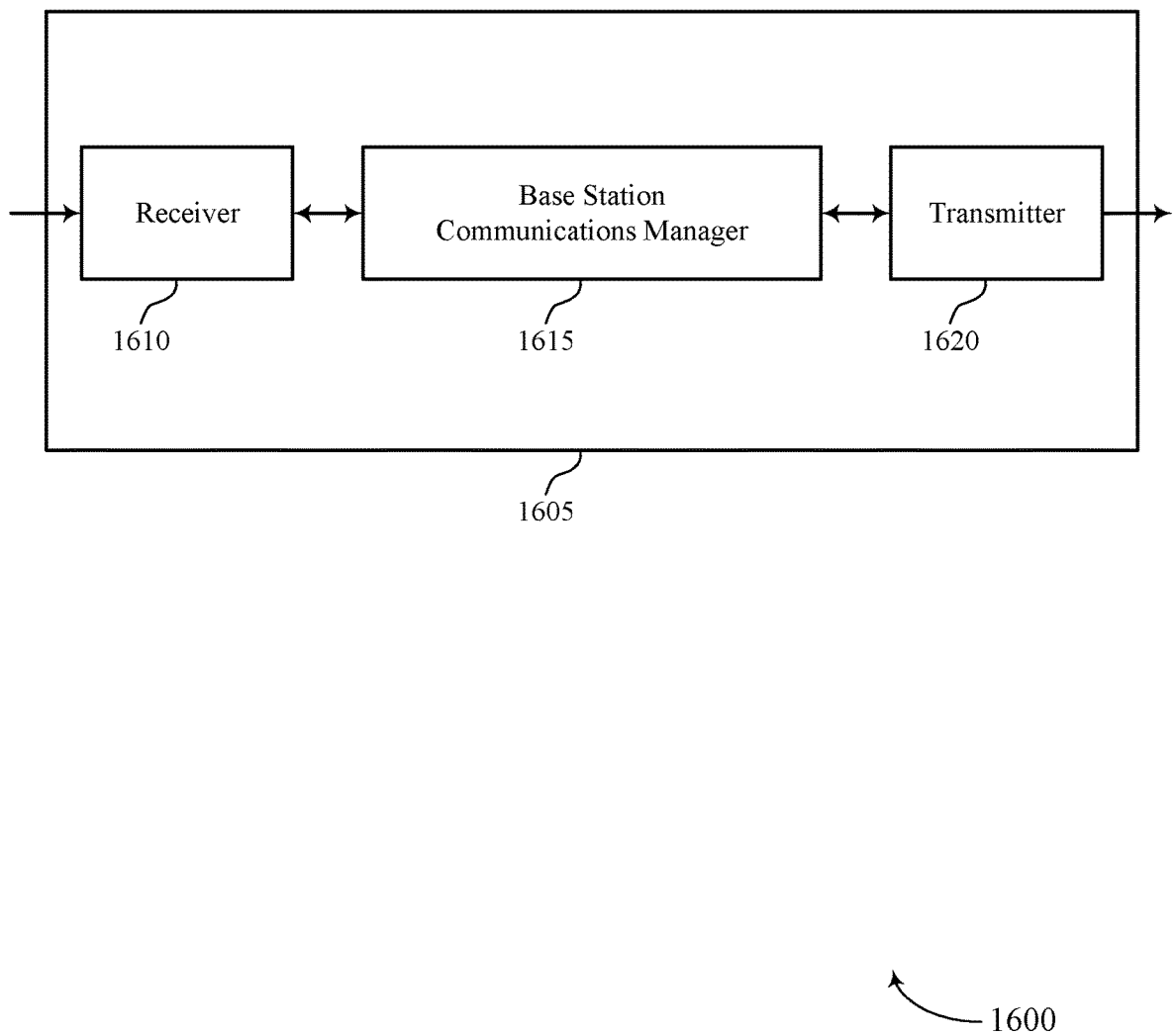
FIGS. 16 and 17 show block diagrams of devices that support ACK feedback for multiple active downlink SPS configurations in accordance with aspects of the present disclosure.

FIG. 16 shows a block diagram 1600 of a device 1605 that supports ACK feedback for multiple active downlink SPS configurations in accordance with aspects of the present disclosure. The device 1605 may be an example of aspects of a base station 105 as described herein. The device 1605 may include a receiver 1610, a base station communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to ACK feedback for multiple active downlink SPS configurations, etc.). Information may be passed on to other components of the device 1605. The receiver 1610 may be an example of aspects of the transceiver 1920 described with reference to FIG. 19. The receiver 1610 may utilize a single antenna or a set of antennas.

The base station communications manager 1615 may transmit a configuration identifying a plurality of sets of control channel resources for a plurality of SPS configurations of a UE, the plurality of sets of control channel resources including at least one set corresponding to multiple of the plurality of SPS configurations. Additionally, the base station communications manager 1615 may transmit a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot. In some cases, the base station communications manager 1615 may select, based on a number of ACK information bits for the first downlink signal and the second downlink signal, a set of control channel resources of the plurality of sets of control channel resources identified by the transmitted configuration. Accordingly, the base station communications manager 1615 may receive the ACK information bits from the UE using the selected set of control channel resources. The base station communications manager 1615 may be an example of aspects of the base station communications manager 1910 described herein.

The base station communications manager 1615, or its sub-components, may be implemented in hardware, code (e.g., software or firmware) executed by a processor, or any combination thereof. If implemented in code executed by a processor, the functions of the base station communications manager 1615, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1615, or its sub-components, may be physically located at various positions, including being distributed such that portions of functions are implemented at different physical locations by one or more physical components. In some examples, the base station communications manager 1615, or its sub-components, may be a separate and distinct component in accordance with various aspects of the present disclosure. In some examples, the base station communications manager 1615, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
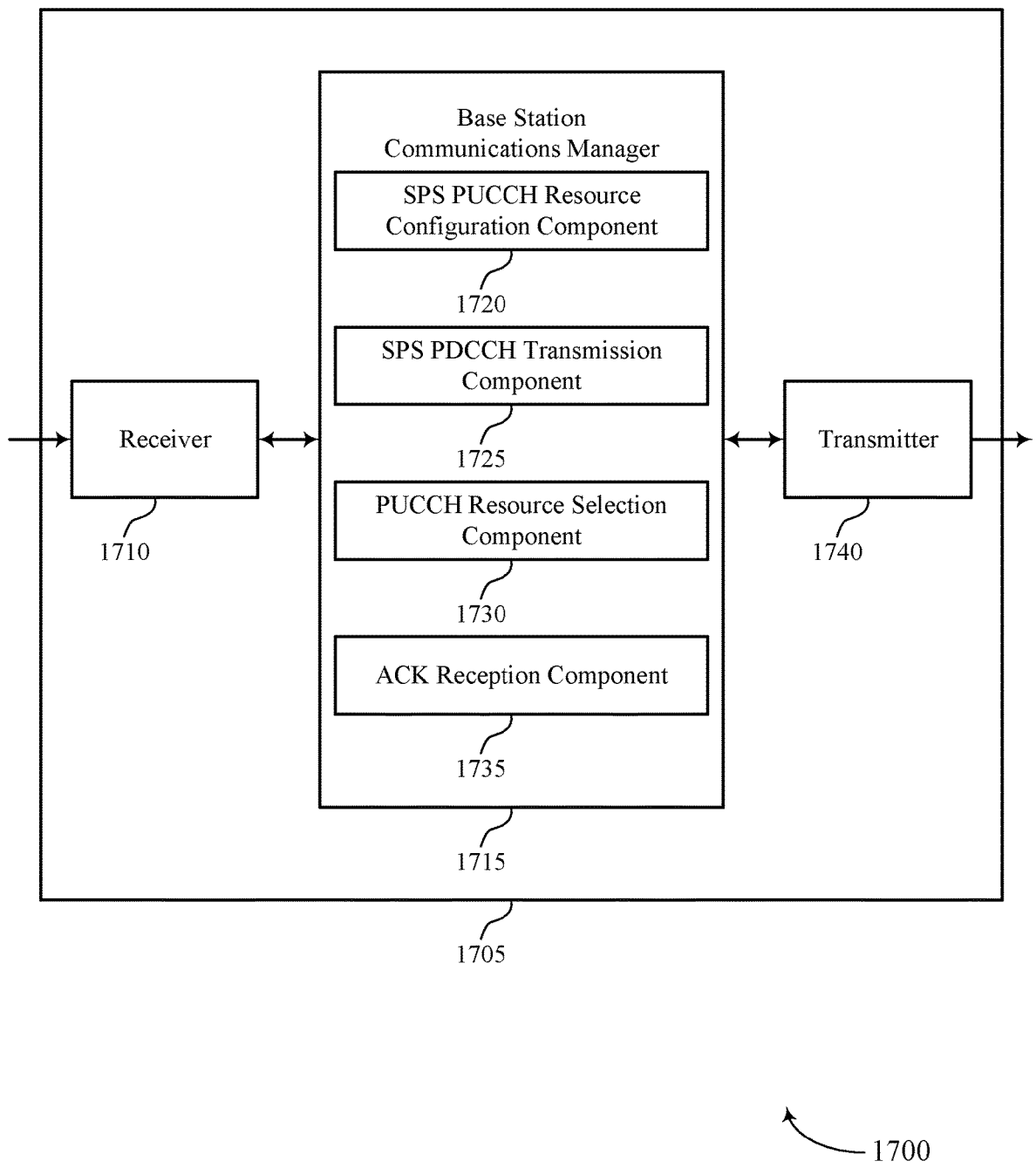

FIG. 17 shows a block diagram 1700 of a device 1705 that supports ACK feedback for multiple active downlink SPS configurations in accordance with aspects of the present disclosure. The device 1705 may be an example of aspects of a device 1605, or a base station 105 as described herein. The device 1705 may include a receiver 1710, a base station communications manager 1715, and a transmitter 1740. The device 1705 may also include a processor. Each of these components may be in communication with one another (e.g., via one or more buses).

The receiver 1710 may receive information such as packets, user data, or control information associated with various information channels (e.g., control channels, data channels, and information related to ACK feedback for multiple active downlink SPS configurations, etc.). Information may be passed on to other components of the device 1705. The receiver 1710 may be an example of aspects of the transceiver 1920 described with reference to FIG. 19. The receiver 1710 may utilize a single antenna or a set of antennas.

The base station communications manager 1715 may be an example of aspects of the base station communications manager 1615 as described herein. The base station communications manager 1715 may include an SPS PUCCH resource configuration component 1720, an SPS PDCCH transmission component 1725, a PUCCH resource selection component 1730, and an ACK reception component 1735. The base station communications manager 1715 may be an example of aspects of the base station communications manager 1910 described herein.

The SPS PUCCH resource configuration component 1720 may transmit a configuration identifying a plurality of sets of control channel resources for a plurality of SPS configurations of a UE, the plurality of sets of control channel resources including at least one set corresponding to multiple of the plurality of SPS configurations.

The SPS PDCCH transmission component 1725 may transmit a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot.

The PUCCH resource selection component 1730 may select, based on a number of ACK information bits for the first downlink signal and the second downlink signal, a set of control channel resources of the plurality of sets of control channel resources identified by the transmitted configuration.

The ACK reception component 1735 may receive the ACK information bits from the UE using the selected set of control channel resources.

The transmitter 1740 may transmit signals generated by other components of the device 1705. In some examples, the transmitter 1740 may be collocated with a receiver 1710 in a transceiver module. For example, the transmitter 1740 may be an example of aspects of the transceiver 1920 described with reference to FIG. 19. The transmitter 1740 may utilize a single antenna or a set of antennas.

Figure 18:
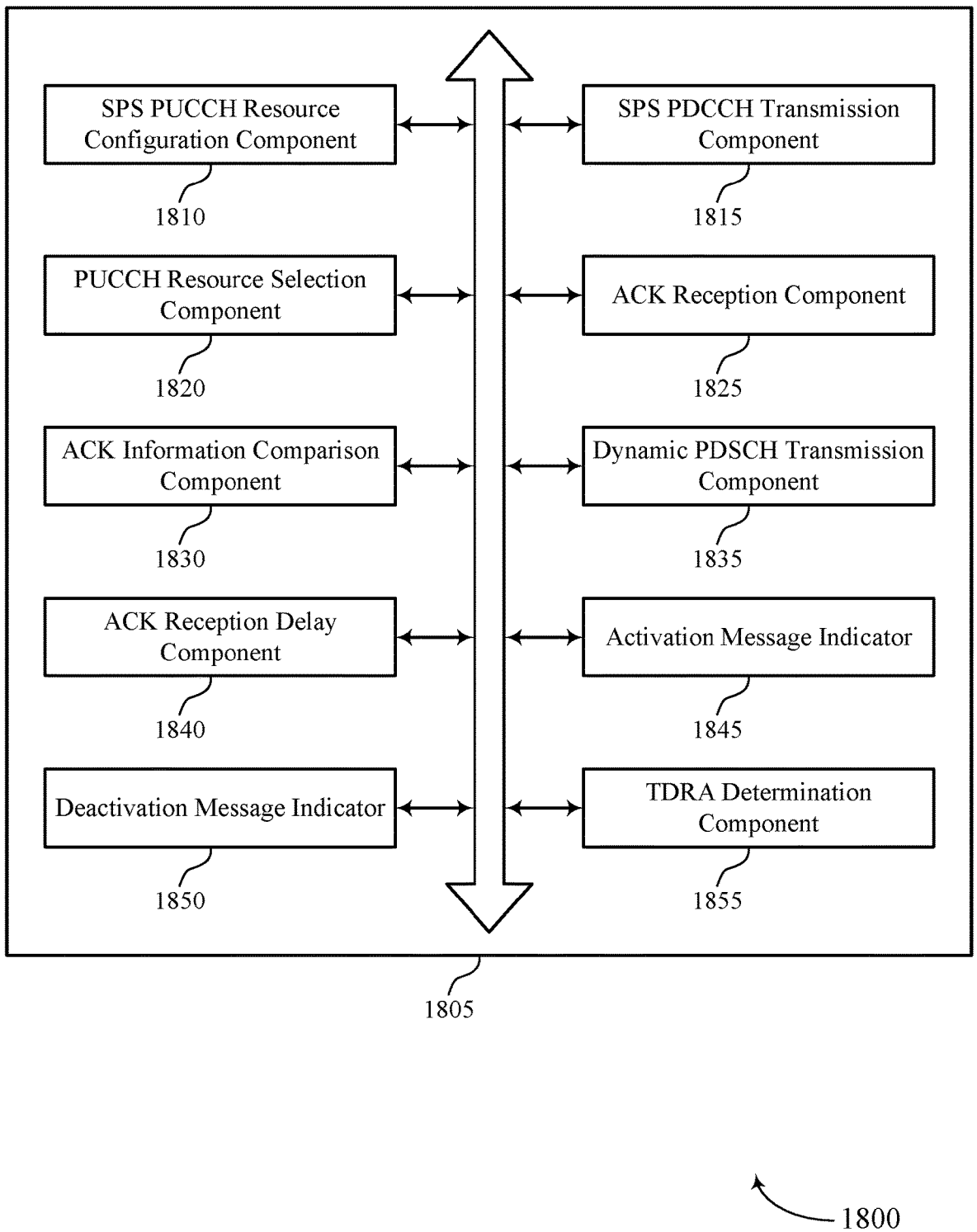
FIG. 18 shows a block diagram of a base station communications manager that supports ACK feedback for multiple active downlink SPS configurations in accordance with aspects of the present disclosure.

FIG. 18 shows a block diagram 1800 of a base station communications manager 1805 that supports ACK feedback for multiple active downlink SPS configurations in accordance with aspects of the present disclosure. The base station communications manager 1805 may be an example of aspects of a base station communications manager 1615, a base station communications manager 1715, or a base station communications manager 1910 described herein. The base station communications manager 1805 may include an SPS PUCCH resource configuration component 1810, an SPS PDCCH transmission component 1815, a PUCCH resource selection component 1820, an ACK reception component 1825, an ACK information comparison component 1830, a dynamic PDSCH transmission component 1835, an ACK reception delay component 1840, an activation message indicator 1845, a deactivation message indicator 1850, and a TDRA determination component 1855. Each of these modules may communicate, directly or indirectly, with one another (e.g., via one or more buses).

The SPS PUCCH resource configuration component 1810 may transmit a configuration identifying a plurality of sets of control channel resources for a plurality of SPS configurations of a UE, the plurality of sets of control channel resources including at least one set corresponding to multiple of the plurality of SPS configurations. In some examples, the multiple of the plurality of SPS configurations may be active for the UE during a same time. In some cases, the individual one of the plurality of SPS configurations may be a same SPS configuration as the first SPS configuration or may be a different SPS configuration than the first SPS configuration. Additionally, the plurality of SPS configurations are configured on a set of CCs. In some cases, the configuration identifying the at least one set corresponding to the individual one of the plurality of SPS configurations may be transmitted in a corresponding SPS configuration of the plurality of SPS configurations or may be transmitted in a PUCCH configuration.

The SPS PDCCH transmission component 1815 may transmit a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot. In some examples, the SPS PDCCH transmission component 1815 may transmit, to the UE, the plurality of SPS configurations, including the first SPS configuration and the second SPS configuration.

The PUCCH resource selection component 1820 may select, based on a number of ACK information bits for the first downlink signal and the second downlink signal, a set of control channel resources of the plurality of sets of control channel resources identified by the transmitted configuration. In some examples, the PUCCH resource selection component 1820 may determine that the UE is to use a set of the at least one set of control channel resources corresponding to the multiple of the plurality of SPS configurations based on identifying that the number of ACK information bits to be transmitted by the UE is greater than one. Additionally or alternatively, the PUCCH resource selection component 1820 may determine that the UE to use a set of the at least one set of control channel resources corresponding to the individual one of the plurality of SPS configurations based on identifying that the number of ACK information bits to be transmitted by the UE is one.

The ACK reception component 1825 may receive the ACK information bits from the UE using the selected set of control channel resources. In some cases, the ACK information bits may include HARQ-ACK information bits. Additionally or alternatively, the ACK information bits are received based on a dynamic ACK codebook including the ACK information bits in an order that is based on when each of a set of downlink signals are transmitted for each of the plurality of SPS configurations, a CC that each of the set of downlink signals are transmitted on, a slot in which each of the set of downlink signals are transmitted, a semi-static ACK codebook, or a combination thereof.

The ACK information comparison component 1830 may compare the determined number of ACK information bits to a threshold number of bits and may select the set of control channel resources from among the plurality of sets of control channel resources based on the comparing. In some examples, the ACK information comparison component 1830 may identify a control channel format to use to receive the ACK information bits and may receive the ACK information bits from the UE according to the identified control channel format using the selected set of control channel resources. In some cases, the transmitted configuration may further identify the threshold number of bits. Additionally, the threshold number of bits includes two bits.

The dynamic PDSCH transmission component 1835 may transmit, in the slot, a third downlink signal scheduled according to a dynamic configuration. In some examples, the dynamic PDSCH transmission component 1835 may transmit the first SPS configuration and the second SPS configuration in RRC signaling and may transmit the dynamic configuration in DCI. Additionally, the dynamic PDSCH transmission component 1835 may identify a type of codebook configured for the UE, the type of codebook being one of a semi-static codebook or a dynamic codebook, where the number of ACK bits are determined based on the identified type of codebook.

The ACK reception delay component 1840 may identify a first slot for receiving the ACK information bits using the selected set of control channel resources, determine that at least one symbol in the selected set of control channel resources in the identified first slot is unavailable for the UE to transmit the ACK information bits, determine that a second slot is a next available slot for the UE to transmit ACK information bits, and receive the ACK information bits in the second slot based on the second slot being the next available slot. In some examples, the ACK reception delay component 1840 may identify the second slot for receiving the ACK information bits for the one of the SPS configurations, where the second slot includes the slot during which the first downlink signal and the second downlink signal are scheduled to be transmitted, determine that the UE is to combine ACK information for the first downlink signal transmitted according to the first SPS configuration and the second downlink signal transmitted according to the one of the plurality of SPS configurations, and determine, for the combined ACK information, a set of control channel resources from the plurality of sets of control channel resources.

Additionally or alternatively, the ACK reception delay component 1840 may transmit, to the UE, an indication of a threshold number of slots allowable for the UE to delay transmitting the ACK information following the slot. Accordingly, the ACK reception delay component 1840 may identify a threshold number of slots allowable for the UE to delay transmitting the ACK information and may receive the ACK information bits in the second slot based on the second slot being the next available slot and the second slot being less than or equal to the threshold number of slots. In some cases, the second slot may immediately follow the first slot that is unavailable.

The activation message indicator 1845 may transmit an activation message for starting communications according to the first SPS configuration, where the activation message includes an uplink resource indicator that indicates an uplink resource for the UE to transmit the ACK information bits, may receive a first set of the ACK information bits from the UE based on the uplink resource indicator, and may receive subsequent sets of the ACK information bits after the first set of ACK information bits based on the selected set of control channel resources.

The deactivation message indicator 1850 may transmit a deactivation message for ending communications according to the first SPS configuration, may determine an uplink resource for receiving an ACK message based on transmitting the deactivation message, and may receive the ACK message using the determined uplink resource. In some cases, the determined uplink resource may include an indicated uplink resource via an uplink resource indicator included in the deactivation message or the selected set of control channel resources.

The TDRA determination component 1855 may determine a list of TDRAs for transmitting corresponding downlink signals for the plurality of SPS configurations in the first slot, may determine an additional TDRA for the at least one SPS configuration that occurs in the first slot with the list of TDRAs based on the periodicity being less than the length of the first slot, and may receive ACK messages for the corresponding downlink signals for the plurality of SPS configurations based on the TDRAs, the additional TDRA, or a combination thereof. In some cases, the additional TDRA may be determined based on an indicated TDRA in an activation message for starting communications according to one or more SPS configurations of the plurality of SPS configurations (e.g., activation DCI). Additionally or alternatively, the additional TDRA may be determined based on all of the TDRAs in the list of TDRAs that have a length smaller than or equal to a period of the at least one SPS configuration. In some examples, the TDRA determination component 1855 may transmit, to the UE, an indication of the list of TDRAs including the additional TDRA. In some cases, the indication may be transmitted within an activation message for starting communications according to one or more SPS configurations of the plurality of SPS configurations.

Figure 19:
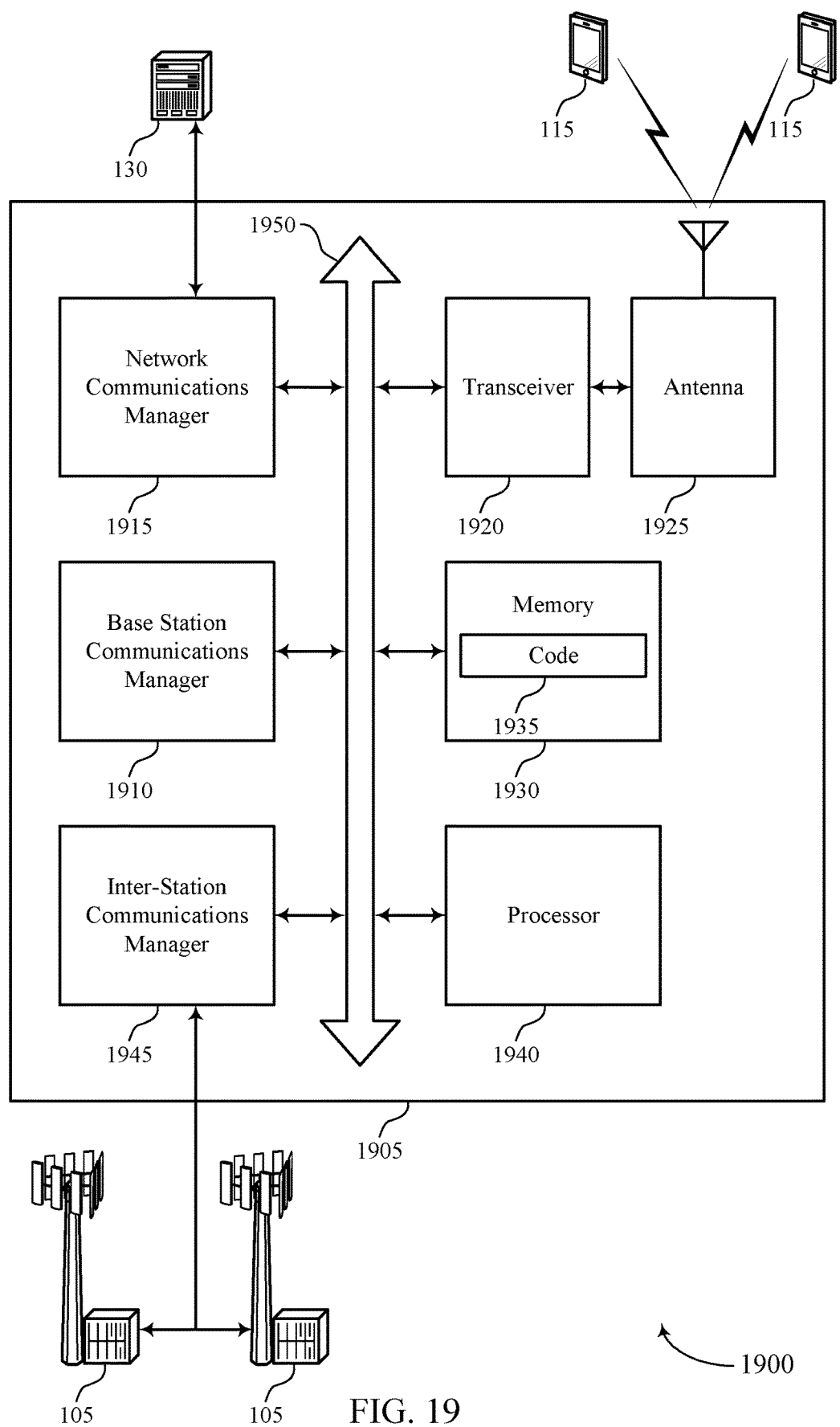
FIG. 19 shows a diagram of a system including a device that supports ACK feedback for multiple active downlink SPS configurations in accordance with aspects of the present disclosure.

FIG. 19 shows a diagram of a system 1900 including a device 1905 that supports ACK feedback for multiple active downlink SPS configurations in accordance with aspects of the present disclosure. The device 1905 may be an example of or include the components of device 1605, device 1705, or a base station 105 as described herein. The device 1905 may include components for bi-directional voice and data communications including components for transmitting and receiving communications, including a base station communications manager 1910, a network communications manager 1915, a transceiver 1920, an antenna 1925, memory 1930, a processor 1940, and an inter-station communications manager 1945. These components may be in electronic communication via one or more buses (e.g., bus 1950).

The base station communications manager 1910 may transmit a configuration identifying a plurality of sets of control channel resources for a plurality of SPS configurations of a UE, the plurality of sets of control channel resources including at least one set corresponding to multiple of the plurality of SPS configurations. Additionally, the base station communications manager 1910 may transmit a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot. In some cases, the base station communications manager 1910 may select, based on a number of ACK information bits for the first downlink signal and the second downlink signal, a set of control channel resources of the plurality of sets of control channel resources identified by the transmitted configuration. Accordingly, the base station communications manager 1910 may receive the ACK information bits from the UE using the selected set of control channel resources.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device 1905 to perform various functions (e.g., functions or tasks supporting ACK feedback for multiple active downlink SPS configurations).

The inter-station communications manager 1945 may manage communications with other base station 105 and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
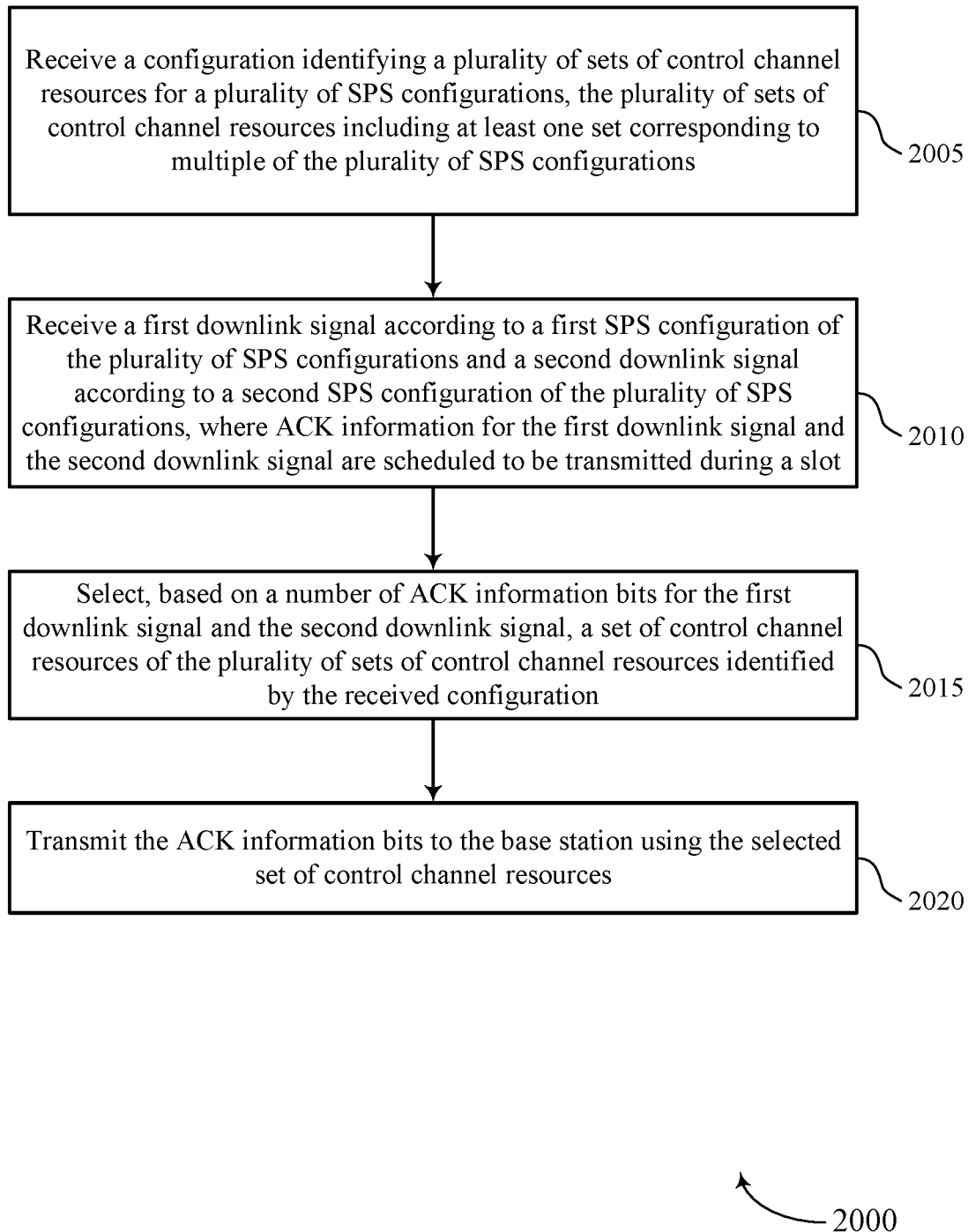
FIGS. 20 through 24 show flowcharts illustrating methods that support ACK feedback for multiple active downlink SPS configurations in accordance with aspects of the present disclosure.

FIG. 20 shows a flowchart illustrating a method 2000 that supports ACK feedback for multiple active downlink SPS configurations in accordance with aspects of the present disclosure. The operations of method 2000 may be implemented by a UE 115 or its components as described herein. For example, the operations of method 2000 may be performed by a UE communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2005, the UE may receive a configuration identifying a plurality of sets of control channel resources for a plurality of SPS configurations, the plurality of sets of control channel resources including at least one set corresponding to multiple of the plurality of SPS configurations. The operations of 2005 may be performed according to the methods described herein. In some examples, aspects of the operations of 2005 may be performed by a PUCCH resource configuration component as described with reference to FIGS. 12 through 15.

At 2010, the UE may receive a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot. The operations of 2010 may be performed according to the methods described herein. In some examples, aspects of the operations of 2010 may be performed by a PDSCH reception component as described with reference to FIGS. 12 through 15.

At 2015, the UE may select, based on a number of ACK information bits for the first downlink signal and the second downlink signal, a set of control channel resources of the plurality of sets of control channel resources identified by the received configuration. The operations of 2015 may be performed according to the methods described herein. In some examples, aspects of the operations of 2015 may be performed by a PUCCH resource selector as described with reference to FIGS. 12 through 15.

At 2020, the UE may transmit the ACK information bits to the base station using the selected set of control channel resources. The operations of 2020 may be performed according to the methods described herein. In some examples, aspects of the operations of 2020 may be performed by an ACK transmission component as described with reference to FIGS. 12 through 15.

Figure 21:
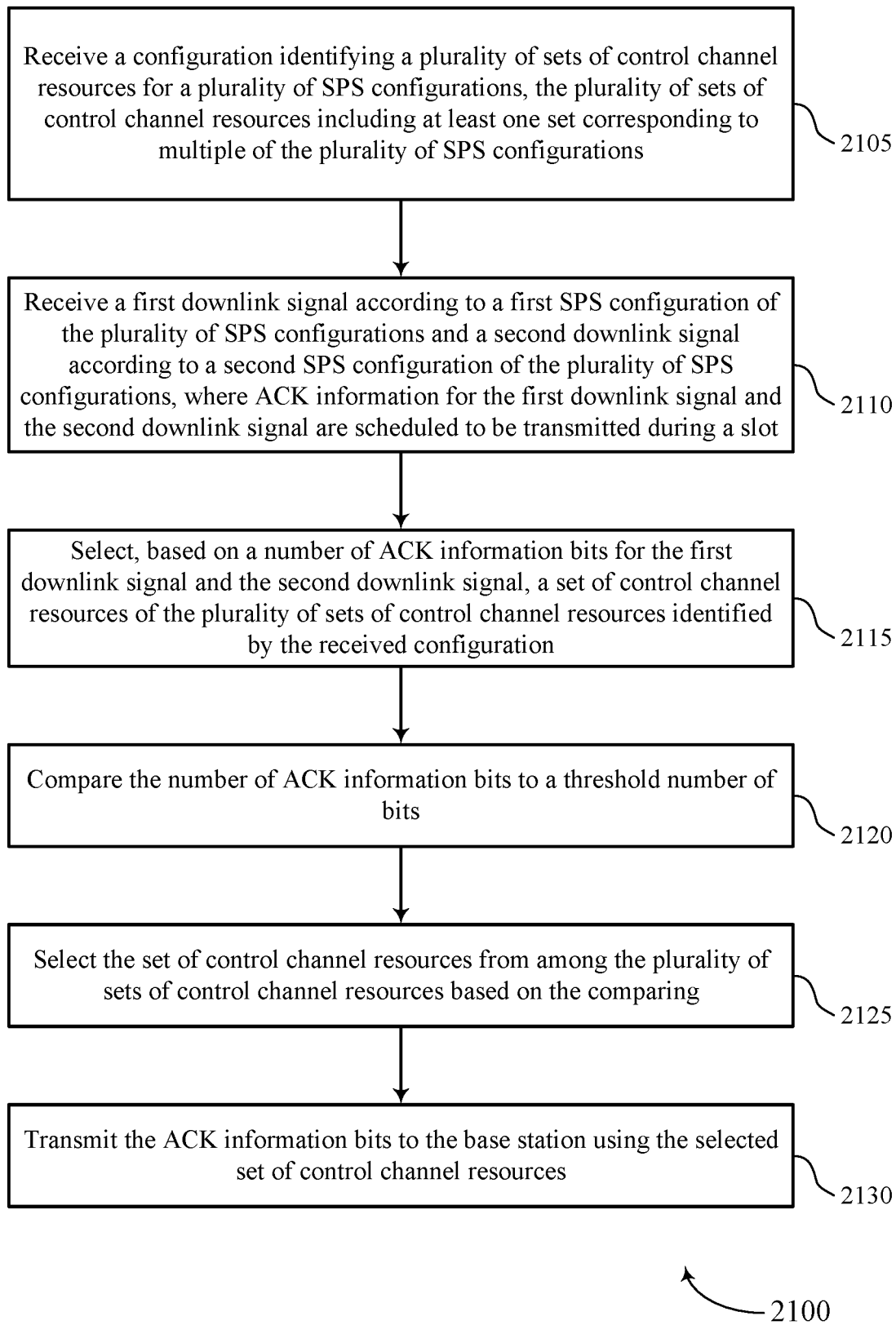

FIG. 21 shows a flowchart illustrating a method 2100 that supports ACK feedback for multiple active downlink SPS configurations in accordance with aspects of the present disclosure. The operations of method 2100 may be implemented by a UE 115 or its components as described herein. For example, the operations of method 2100 may be performed by a UE communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2105, the UE may receive a configuration identifying a plurality of sets of control channel resources for a plurality of SPS configurations, the plurality of sets of control channel resources including at least one set corresponding to multiple of the plurality of SPS configurations. The operations of 2105 may be performed according to the methods described herein. In some examples, aspects of the operations of 2105 may be performed by a PUCCH resource configuration component as described with reference to FIGS. 12 through 15.

At 2110, the UE may receive a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot. The operations of 2110 may be performed according to the methods described herein. In some examples, aspects of the operations of 2110 may be performed by a PDSCH reception component as described with reference to FIGS. 12 through 15.

At 2115, the UE may select, based on a number of ACK information bits for the first downlink signal and the second downlink signal, a set of control channel resources of the plurality of sets of control channel resources identified by the received configuration. The operations of 2115 may be performed according to the methods described herein. In some examples, aspects of the operations of 2115 may be performed by a PUCCH resource selector as described with reference to FIGS. 12 through 15.

At 2120, the UE may compare the number of ACK information bits to a threshold number of bits. The operations of 2120 may be performed according to the methods described herein. In some examples, aspects of the operations of 2120 may be performed by an ACK threshold component as described with reference to FIGS. 12 through 15.

At 2125, the UE may select the set of control channel resources from among the plurality of sets of control channel resources based on the comparing. The operations of 2125 may be performed according to the methods described herein. In some examples, aspects of the operations of 2125 may be performed by an ACK threshold component as described with reference to FIGS. 12 through 15.

At 2130, the UE may transmit the ACK information bits to the base station using the selected set of control channel resources. The operations of 2130 may be performed according to the methods described herein. In some examples, aspects of the operations of 2130 may be performed by an ACK transmission component as described with reference to FIGS. 12 through 15.

Figure 22:
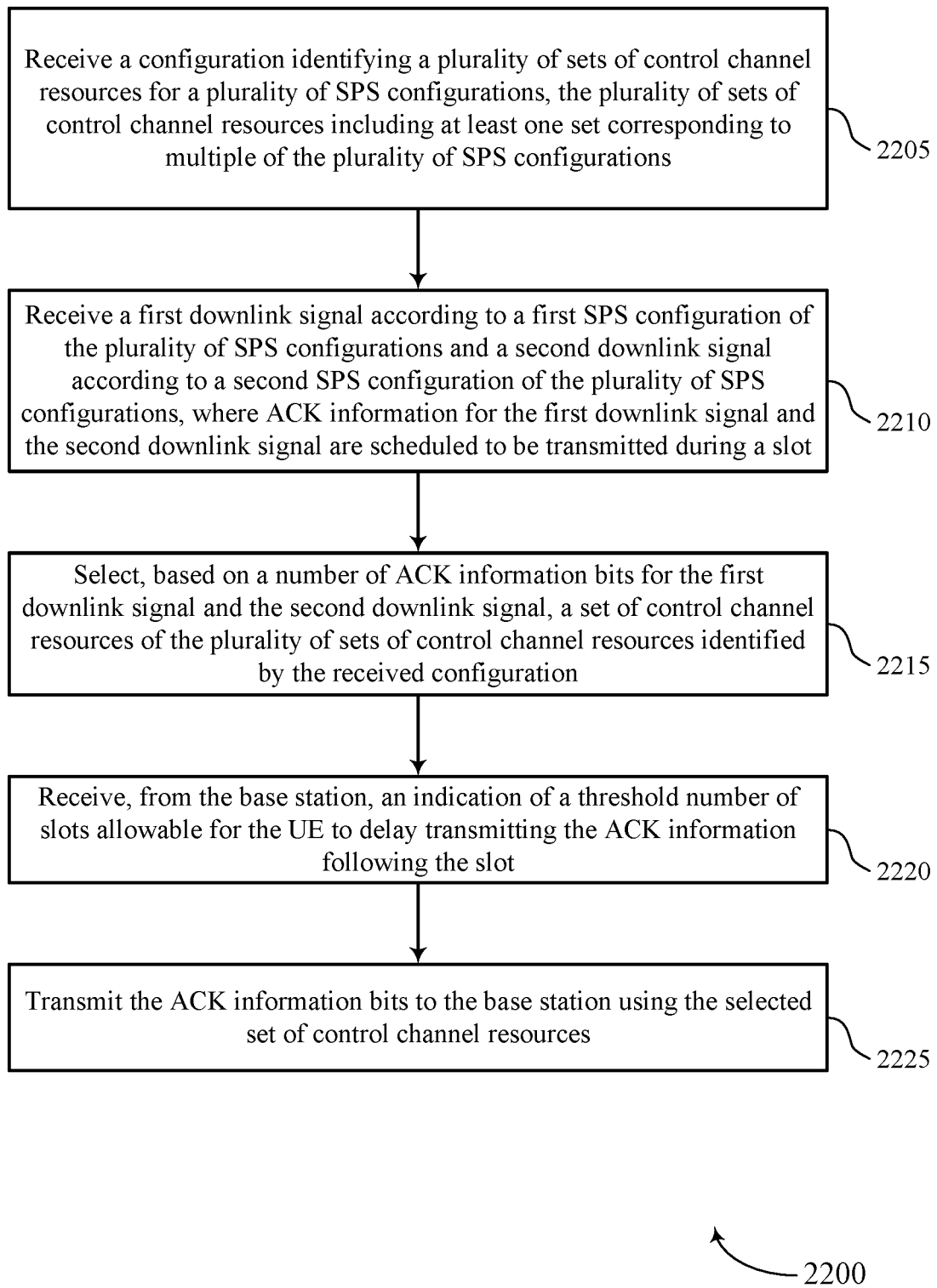

FIG. 22 shows a flowchart illustrating a method 2200 that supports ACK feedback for multiple active downlink SPS configurations in accordance with aspects of the present disclosure. The operations of method 2200 may be implemented by a UE 115 or its components as described herein. For example, the operations of method 2200 may be performed by a UE communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2205, the UE may receive a configuration identifying a plurality of sets of control channel resources for a plurality of SPS configurations, the plurality of sets of control channel resources including at least one set corresponding to multiple of the plurality of SPS configurations. The operations of 2205 may be performed according to the methods described herein. In some examples, aspects of the operations of 2205 may be performed by a PUCCH resource configuration component as described with reference to FIGS. 12 through 15.

At 2210, the UE may receive a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot. The operations of 2210 may be performed according to the methods described herein. In some examples, aspects of the operations of 2210 may be performed by a PDSCH reception component as described with reference to FIGS. 12 through 15.

At 2215, the UE may select, based on a number of ACK information bits for the first downlink signal and the second downlink signal, a set of control channel resources of the plurality of sets of control channel resources identified by the received configuration. The operations of 2215 may be performed according to the methods described herein. In some examples, aspects of the operations of 2215 may be performed by a PUCCH resource selector as described with reference to FIGS. 12 through 15.

At 2220, the UE may receive, from the base station, an indication of a threshold number of slots allowable for the UE to delay transmitting the ACK information following the slot. The operations of 2220 may be performed according to the methods described herein. In some examples, aspects of the operations of 2220 may be performed by an ACK transmission delay component as described with reference to FIGS. 12 through 15.

At 2225, the UE may transmit the ACK information bits to the base station using the selected set of control channel resources. The operations of 2225 may be performed according to the methods described herein. In some examples, aspects of the operations of 2225 may be performed by an ACK transmission component as described with reference to FIGS. 12 through 15.

Figure 23:
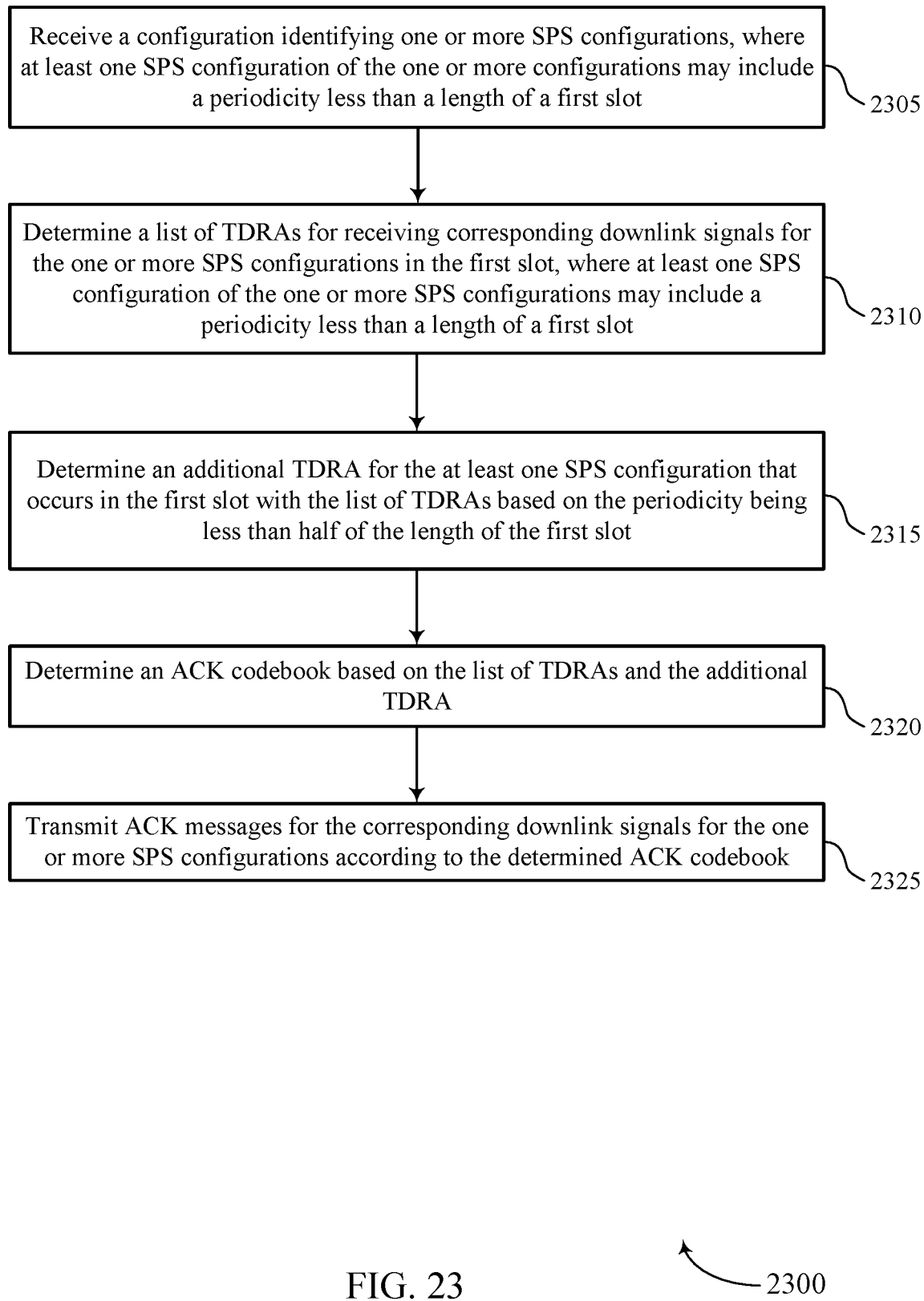

FIG. 23 shows a flowchart illustrating a method 2300 that supports acknowledgement feedback for multiple active downlink semi-persistent scheduling configurations in accordance with aspects of the present disclosure. The operations of method 2300 may be implemented by a UE 115 or its components as described herein. For example, the operations of method 2300 may be performed by a UE communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2305, the UE may receive a configuration identifying a plurality of sets of control channel resources for a plurality of SPS configurations, the plurality of sets of control channel resources including at least one set corresponding to multiple of the plurality of SPS configurations. In some cases, the UE may receive a configuration identifying one or more SPS configurations (e.g., from the plurality of SPS configurations), where at least one SPS configuration of the one or more SPS configurations may include a periodicity less than a length of the first slot. The operations of 2305 may be performed according to the methods described herein. In some examples, aspects of the operations of 2305 may be performed by a PUCCH resource configuration component as described with reference to FIGS. 12 through 15. As described herein, in some cases, the UE may then receive a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot. Subsequently, the UE may select, based on a number of ACK information bits for the first downlink signal and the second downlink signal, a set of control channel resources of the plurality of sets of control channel resources identified by the received configuration.

At 2310, with at least one SPS configuration of the one or more SPS configurations including a periodicity less than a length of the first slot, the UE may determine a list of TDRAs for receiving corresponding downlink signals for the one or more SPS configurations in the first slot. For example, a base station may use a DCI (e.g., a downlink grant) to indicate to the UE one or more TDRAs used by a particular PDSCH transmission for an SPS configuration. Accordingly, the UE may determine a minimum ACK codebook size within each time resource (e.g., slot, minislot, etc.) that can accommodate all ACK feedback messages corresponding to non-overlapping PDSCH transmissions. Subsequently, the UE may then map each of the TDRAs to a particular location in the codebook. The operations of 2310 may be performed according to the methods described herein. In some examples, aspects of the operations of 2310 may be performed by a TDRA component as described with reference to FIGS. 12 through 15.

At 2315, the UE may determine an additional TDRA for the at least one SPS configuration that occurs in the first slot with the list of TDRAs based on the periodicity being less than the length of the first slot. For example, the base station may indicate for the UE to receive a first PDSCH according to an SPS configuration for a TDRA, and if the periodicity for the SPS for the first PDSCH according to the TDRA is less than or equal to a period value for the first PDSCH of the SPS configuration, then the UE may derive the additional TDRA for receiving a second PDSCH according to the same SPS configuration (e.g., in the same slot). The operations of 2315 may be performed according to the methods described herein. In some examples, aspects of the operations of 2315 may be performed by a TDRA component as described with reference to FIGS. 12 through 15.

At 2320, the UE may determine an ACK codebook based on the list of TDRAs and the additional TDRA. For example, the UE may then form a semi-static codebook (e.g., type I codebook) based on the configured TDRAs (e.g., list of determine TDRAs) as well as the derived (e.g. virtual) additional TDRA(s). The operations of 2320 may be performed according to the methods described herein. In some examples, aspects of the operations of 2320 may be performed by a TDRA component as described with reference to FIGS. 12 through 15.

At 2325, the UE may transmit ACK messages for the corresponding downlink signals for the one or more SPS configurations according to the determined ACK codebook. The operations of 2325 may be performed according to the methods described herein. In some examples, aspects of the operations of 2325 may be performed by a TDRA component as described with reference to FIGS. 12 through 15.

Figure 24:
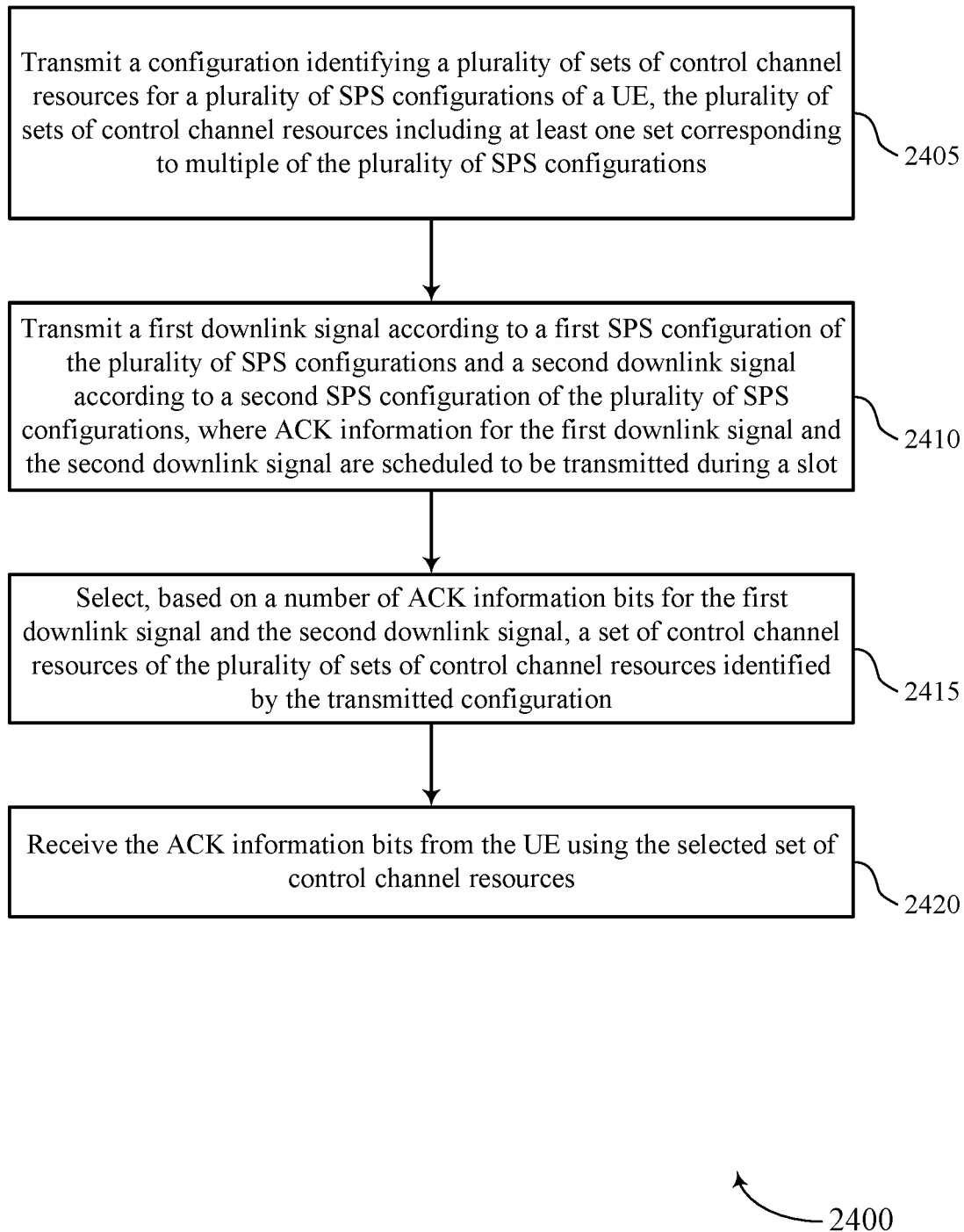

FIG. 24 shows a flowchart illustrating a method 2400 that supports ACK feedback for multiple active downlink SPS configurations in accordance with aspects of the present disclosure. The operations of method 2400 may be implemented by a base station 105 or its components as described herein. For example, the operations of method 2400 may be performed by a base station communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2405, the base station may transmit a configuration identifying a plurality of sets of control channel resources for a plurality of SPS configurations of a UE, the plurality of sets of control channel resources including at least one set corresponding to multiple of the plurality of SPS configurations. The operations of 2405 may be performed according to the methods described herein. In some examples, aspects of the operations of 2405 may be performed by an SPS PUCCH resource configuration component as described with reference to FIGS. 16 through 19.

At 2410, the base station may transmit a first downlink signal according to a first SPS configuration of the plurality of SPS configurations and a second downlink signal according to a second SPS configuration of the plurality of SPS configurations, where ACK information for the first downlink signal and the second downlink signal are scheduled to be transmitted during a slot. The operations of 2410 may be performed according to the methods described herein. In some examples, aspects of the operations of 2410 may be performed by an SPS PDCCH transmission component as described with reference to FIGS. 16 through 19.

At 2415, the base station may select, based on a number of ACK information bits for the first downlink signal and the second downlink signal, a set of control channel resources of the plurality of sets of control channel resources identified by the transmitted configuration. The operations of 2415 may be performed according to the methods described herein. In some examples, aspects of the operations of 2415 may be performed by a PUCCH resource selection component as described with reference to FIGS. 16 through 19.

At 2420, the base station may receive the ACK information bits from the UE using the selected set of control channel resources. The operations of 2420 may be performed according to the methods described herein. In some examples, aspects of the operations of 2420 may be performed by an ACK reception component as described with reference to FIGS. 16 through 19.

It should be noted that the methods described herein describe possible implementations, and that the operations and the steps may be rearranged or otherwise modified and that other implementations are possible. Further, aspects from two or more of the methods may be combined.

The following provides an overview of further examples of the present invention:

Example 1

A method for wireless communication at a user equipment (UE), comprising receiving a configuration identifying a plurality of sets of control channel resources for a plurality of semi-persistent scheduling (SPS) configurations, the plurality of sets of control channel resources including at least one set corresponding to multiple of the plurality of SPS configurations receiving a first downlink signal according to a first SPS configuration of the plurality of SPS configurations and a second downlink signal according to a second SPS configuration of the plurality of SPS configurations, wherein acknowledgment information for the first downlink signal and the second downlink signal are scheduled to be transmitted during a slot selecting, based at least in part on a number of acknowledgment information bits for the first downlink signal and the second downlink signal, a set of control channel resources of the plurality of sets of control channel resources identified by the received configuration transmitting the acknowledgment information bits to the base station using the selected set of control channel resources.

Example 2

The method of example 1, further comprising receiving, from the base station, the plurality of SPS configurations, including the first SPS configuration and the second SPS configuration.

Example 3

The method of any one of examples 1 through 2, wherein selecting the set of control channel resources comprises: comparing the number of acknowledgment information bits to a threshold number of bits selecting the set of control channel resources from among the plurality of sets of control channel resources based at least in part on the comparing.

Example 4

The method of example 3, wherein transmitting the acknowledgment information bits comprises: identifying a control channel format to use to transmit the acknowledgment information bits transmitting the acknowledgment information bits to the base station according to the identified control channel format using the selected set of control channel resources.

Example 5

The method of any one of examples 3 through 4, wherein the received configuration further identifies the threshold number of bits.

Example 6

The method of any one of examples 3 through 5, wherein the threshold number of bits comprises two bits.

Example 7

The method of any one of examples 1 through 6, further comprising receiving, in the slot, a third downlink signal scheduled according to a dynamic configuration.

Example 8

The method of example 7, further comprising receiving the first SPS configuration and the second SPS configuration in radio resource control signaling receiving the dynamic configuration in downlink control information.

Example 9

The method of any one of examples 7 through 8, further comprising identifying a type of codebook configured for the UE, the type of codebook being one of a semi-static codebook or a dynamic codebook, wherein the number of acknowledgment bits are determined based at least in part on the identified type of codebook.

Example 10

The method of any one of examples 7 through 9, further comprising receiving one or more dynamically scheduled downlink signals according to the dynamic configuration, wherein the dynamically scheduled downlink signals comprise an indication of corresponding acknowledgment messages to be transmitted for the dynamically scheduled downlink signals combining the acknowledgment information bits for the first downlink signal and the second downlink signal with the acknowledgment messages to be transmitted for the dynamically scheduled downlink signals transmitting, to the base station, the combined acknowledgment information bits with the acknowledgment messages to be transmitted for the dynamically scheduled downlink signals based at least in part on an acknowledgment codebook.

Example 11

The method of 10, wherein the acknowledgment codebook comprises a semi-static codebook based at least in part on a first occasion that the first downlink signal is received and a second occasion that the second downlink signal is received, and wherein the acknowledgment information bits for the first downlink signal and the second downlink signal are combined with the acknowledgment messages to be transmitted for the dynamically scheduled downlink signals based at least in part on the semi-static codebook.

Example 12

The method of example 10, wherein the acknowledgment codebook comprises a dynamic codebook, and wherein the acknowledgment information bits for the first downlink signal and the second downlink signal are appended to the acknowledgment messages to be transmitted for the dynamically scheduled downlink signals based at least in part on the dynamic codebook.

Example 13

The method of any one of examples 1 through 12, wherein the plurality of SPS configurations are configured on a plurality of component carriers.

Example 14

The method of any one of examples 1 through 13, wherein multiple of the plurality of SPS configurations are active for the UE during a same time.

Example 15

The method of any one of examples 1 through 14, wherein the configuration identifying the at least one set of control channel resources corresponding to the multiple of the plurality of SPS configurations is received in a physical uplink control channel configuration.

Example 16

The method of any one of examples 1 through 15, further comprising receiving an activation message for starting communications according to the first SPS configuration, wherein the first downlink signal is received based at least in part on the activation message identifying an uplink resource indicator in the activation message, the uplink resource indicator comprising an indication of an uplink resource for transmitting the acknowledgment information bits to the base station transmitting a first set of the acknowledgment information bits to the base station based at least in part on the uplink resource indicator transmitting subsequent sets of the acknowledgment information bits after the first set of acknowledgment information bits based at least in part on the selected set of control channel resources.

Example 17

The method of any one of examples 1 through 16, further comprising receiving a deactivation message for ending communications according to the first SPS configuration determining an uplink resource for transmitting an acknowledgment message based at least in part on receiving the deactivation message transmitting the acknowledgment message using the determined uplink resource.

Example 18

The method of example 17, further comprising combining the acknowledgment message with one or more additional acknowledgment messages from additional SPS configurations, dynamic downlink messages, or a combination thereof transmitting, to the base station, the combined acknowledgment messages based at least in part on an acknowledgment codebook.

Example 19

The method of any one of examples 17 through 18, wherein the determined uplink resource comprises an indicated uplink resource via an uplink resource indicator included in the deactivation message.

Example 20

A method for wireless communication at a user equipment (UE), comprising receiving a plurality of semi-persistent scheduling (SPS) configurations receiving a first downlink signal according to a first SPS configuration of the plurality of SPS configurations and a second downlink signal according to a second SPS configuration of the plurality of SPS configurations, wherein acknowledgment information for the first downlink signal and the second downlink signal are scheduled to be transmitted during a slot determining an order of a plurality of downlink signals received according to the plurality of SPS configurations, the plurality of downlink signals comprising at least the first downlink signal and the second downlink signal generating, for transmitting acknowledgment information bits to the base station, an acknowledgment codebook based at least in part on the determined order of the plurality of downlink signals transmitting the acknowledgment information bits to the base station using the generated dynamic acknowledgment codebook.

Example 21

The method of example 20, wherein the determined order of the plurality of downlink signals comprises a time-first, component carrier-second order.

Example 22

The method of any one of examples 20 through 21, wherein the order of the plurality of downlink signals is determined based at least in part on a corresponding index of each of the plurality of SPS configurations and a component carrier index, and wherein each of the plurality of SPS configurations are configured within a same component carrier associated with the component carrier index.

Example 23

The method of any one of examples 20 through 22, further comprising generating a semi-static acknowledgment codebook comprising the acknowledgment information bits and default values for transmission occasions where no downlink signal is received extracting the acknowledgment information bits from the semi-static acknowledgment codebook to generate a dynamic acknowledgment codebook, wherein an order of the acknowledgment information bits is the same for the semi-static acknowledgment codebook and the dynamic acknowledgment codebook.

Example 24

A method for wireless communication at a base station, comprising transmitting a configuration identifying a plurality of sets of control channel resources for a plurality of semi-persistent scheduling (SPS) configurations of a user equipment (UE), the plurality of sets of control channel resources including at least one set corresponding to multiple of the plurality of SPS configurations transmitting a first downlink signal according to a first SPS configuration of the plurality of SPS configurations and a second downlink signal according to a second SP configuration of the plurality of SPS configurations, wherein acknowledgment information for the first downlink signal and the second downlink signal are scheduled to be transmitted during a slot selecting, based at least in part on a number of acknowledgment information bits for the first downlink signal and the second downlink signal, a set of control channel resources of the plurality of sets of control channel resources identified by the transmitted configuration receiving the acknowledgment information bits from the UE using the selected set of control channel resources.

Example 25

The method of example 24, further comprising transmitting, to the UE, the plurality of SPS configurations, including the first SPS configuration and the second SPS configuration.

Example 26

The method of any one of examples 24 through 25, wherein selecting the set of control channel resources comprises: comparing the determined number of acknowledgment information bits to a threshold number of bits selecting the set of control channel resources from among the plurality of sets of control channel resources based at least in part on the comparing.

Example 27

The method of example 26, wherein receiving the acknowledgment information bits comprises: identifying a control channel format to use to receive the acknowledgment information bits receiving the acknowledgment information bits from the UE according to the identified control channel format using the selected set of control channel resources.

Example 28

The method of any one of examples 26 through 27, wherein the transmitted configuration further identifies the threshold number of bits, and wherein the threshold number of bits comprises two bits.

Example 29

The method of any one of examples 26 through 28, wherein the acknowledgment information bits are received based at least in part on a dynamic acknowledgment codebook comprising the acknowledgment information bits in an order that is based at least in part on when each of a plurality of downlink signals are transmitted for each of the plurality of SPS configurations, a component carrier that each of the plurality of downlink signals are transmitted on, a slot in which each of the plurality of downlink signals are transmitted, a semi-static acknowledgment codebook, or a combination thereof.

Example 30

An apparatus for wireless communication at a base station comprising at least one means for performing a method of any one of examples 1 through 19.

Example 31

An apparatus for wireless communication at a base station comprising a processor, memory in electronic communication with the processor, and instructions stored in the memory and executable by the processor to cause the apparatus to perform a method of any one of examples 1 through 19.

Example 32

A non-transitory computer-readable medium storing code for wireless communication at a base station comprising a processor, memory in electronic communication with the processor, and instructions stored in the memory and executable by the processor to cause the apparatus to perform a method of any one of examples 1 through 19.

Example 33

An apparatus for wireless communication at a base station comprising at least one means for performing a method of any one of examples 20 through 23.

Example 34

An apparatus for wireless communication at a base station comprising a processor, memory in electronic communication with the processor, and instructions stored in the memory and executable by the processor to cause the apparatus to perform a method of any one of examples 20 through 23.

Example 35

A non-transitory computer-readable medium storing code for wireless communication at a base station comprising a processor, memory in electronic communication with the processor, and instructions stored in the memory and executable by the processor to cause the apparatus to perform a method of any one of examples 20 through 23.

Example 36

An apparatus for wireless communication at a base station comprising at least one means for performing a method of any one of examples 24 through 29.

Example 37

An apparatus for wireless communication at a base station comprising a processor, memory in electronic communication with the processor, and instructions stored in the memory and executable by the processor to cause the apparatus to perform a method of any one of examples 24 through 29.

Example 38

A non-transitory computer-readable medium storing code for wireless communication at a base station comprising a processor, memory in electronic communication with the processor, and instructions stored in the memory and executable by the processor to cause the apparatus to perform a method of any one of examples 24 through 29.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UNITS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving a configuration identifying a plurality of sets of control channel resources for a plurality of semi-persistent scheduling (SPS) configurations, the plurality of sets of control channel resources including at least one set corresponding to multiple of the plurality of SPS configurations;
receiving a first downlink data according to a first SPS configuration of the plurality of SPS configurations and a second downlink data according to a second SPS configuration of the plurality of SPS configurations, wherein acknowledgment information for the first downlink data and the second downlink data are scheduled to be transmitted during a slot;
selecting, based at least in part on a number of acknowledgment information bits for the first downlink data and the second downlink data, a set of control channel resources of the plurality of sets of control channel resources identified by the received configuration; and
transmitting the acknowledgment information bits to the base station using the selected set of control channel resources.

2. The method of claim 1, further comprising:
receiving, from the base station, the plurality of SPS configurations, including the first SPS configuration and the second SPS configuration.

3. The method of claim 1, wherein selecting the set of control channel resources comprises:
comparing the number of acknowledgment information bits to a threshold number of bits; and
selecting the set of control channel resources from among the plurality of sets of control channel resources based at least in part on the comparing.

4. The method of claim 3, wherein transmitting the acknowledgment information bits comprises:
identifying a control channel format to use to transmit the acknowledgment information bits; and
transmitting the acknowledgment information bits to the base station according to the identified control channel format using the selected set of control channel resources.

5. The method of claim 3, wherein the received configuration further identifies the threshold number of bits.

6. The method of claim 3, wherein the threshold number of bits comprises two bits.

7. The method of claim 1, further comprising:
receiving, in the slot, a third downlink data scheduled according to a dynamic configuration.

8. The method of claim 7, further comprising:
receiving the first SPS configuration and the second SPS configuration in radio resource control signaling; and
receiving the dynamic configuration in downlink control information.

9. The method of claim 7, further comprising:
identifying a type of codebook configured for the UE, the type of codebook being one of a semi-static codebook or a dynamic codebook, wherein the number of acknowledgment bits are determined based at least in part on the identified type of codebook.

10. The method of claim 7, further comprising:
receiving one or more dynamically scheduled downlink data signals according to the dynamic configuration;
combining the acknowledgment information bits for the first downlink data and the second downlink data with acknowledgment messages to be transmitted for the dynamically scheduled downlink data; and
transmitting, to the base station, the combined acknowledgment information bits with the acknowledgment messages to be transmitted for the dynamically scheduled downlink data based at least in part on an acknowledgment codebook.

11. The method of claim 10, wherein the acknowledgment codebook comprises a semi-static codebook based at least in part on a first occasion that the first downlink data is received and a second occasion that the second downlink data is received, and wherein the acknowledgment information bits for the first downlink data and the second downlink data are combined with the acknowledgment messages to be transmitted for the dynamically scheduled downlink data based at least in part on the semi-static codebook.

12. The method of claim 10, wherein the acknowledgment codebook comprises a dynamic codebook, and wherein the acknowledgment information bits for the first downlink data and the second downlink data are appended to the acknowledgment messages to be transmitted for the dynamically scheduled downlink data based at least in part on the dynamic codebook.

13. The method of claim 1, wherein the plurality of SPS configurations are configured on a plurality of component carriers.

14. The method of claim 1, wherein multiple of the plurality of SPS configurations are active for the UE during a same time.

15. The method of claim 1, wherein the configuration identifying the at least one set of control channel resources corresponding to the multiple of the plurality of SPS configurations is received in a physical uplink control channel configuration.

16. The method of claim 1, further comprising:
receiving an activation message for starting communications according to the first SPS configuration, wherein the first downlink data is received based at least in part on the activation message;
identifying an uplink resource indicator in the activation message, the uplink resource indicator comprising an indication of an uplink resource for transmitting the acknowledgment information bits to the base station;
transmitting a first set of the acknowledgment information bits to the base station based at least in part on the uplink resource indicator; and
transmitting subsequent sets of the acknowledgment information bits after the first set of acknowledgment information bits based at least in part on the selected set of control channel resources.

17. The method of claim 1, further comprising:
receiving a deactivation message for ending communications according to the first SPS configuration;
determining an uplink resource for transmitting an acknowledgment message based at least in part on receiving the deactivation message; and
transmitting the acknowledgment message using the determined uplink resource.

18. The method of claim 17, further comprising:
combining the acknowledgment message with one or more additional acknowledgment messages from additional SPS configurations, dynamic downlink messages, or a combination thereof; and transmitting, to the base station, the combined acknowledgment messages based at least in part on an acknowledgment codebook.

19. The method of claim 17, wherein the determined uplink resource comprises an indicated uplink resource via an uplink resource indicator included in the deactivation message.

20. A method for wireless communication at a user equipment (UE), comprising:
receiving a plurality of semi-persistent scheduling (SPS) configurations;
receiving a first downlink data according to a first SPS configuration of the plurality of SPS configurations and a second downlink data according to a second SPS configuration of the plurality of SPS configurations, wherein acknowledgment information for the first downlink data and the second downlink data are scheduled to be transmitted during a slot;
generating, for transmitting acknowledgment information bits to the base station, an acknowledgment codebook based at least in part on a corresponding index of each of the plurality of SPS configurations and a component carrier index, wherein each of the plurality of SPS configurations are configured within a same component carrier associated with the component carrier index; and
transmitting the acknowledgment information bits to the base station using the generated acknowledgment codebook.

21. The method of claim 20, further comprising:
determining an order of a plurality of downlink data received according to the plurality of SPS configurations, the plurality of downlink data comprising at least the first downlink data and the second downlink data, wherein the determined order of the plurality of downlink data comprises a time-first, component carrier-second order.

22. The method of claim 20, further comprising:
generating a semi-static acknowledgment codebook comprising the acknowledgment information bits and default values for transmission occasions where no downlink data is received; and
extracting the acknowledgment information bits from the semi-static acknowledgment codebook to generate a dynamic acknowledgment codebook, wherein an order of the acknowledgment information bits is the same for the semi-static acknowledgment codebook and the dynamic acknowledgment codebook.

23. A method for wireless communication at a base station, comprising:
transmitting a configuration identifying a plurality of sets of control channel resources for a plurality of semi-persistent scheduling (SPS) configurations of a user equipment (UE), the plurality of sets of control channel resources including at least one set corresponding to multiple of the plurality of SPS configurations;
transmitting a first downlink data according to a first SPS configuration of the plurality of SPS configurations and a second downlink data according to a second SP configuration of the plurality of SPS configurations, wherein acknowledgment information for the first downlink data and the second downlink data are scheduled to be transmitted during a slot;
selecting, based at least in part on a number of acknowledgment information bits for the first downlink data and the second downlink data, a set of control channel resources of the plurality of sets of control channel resources identified by the transmitted configuration; and
receiving the acknowledgment information bits from the UE using the selected set of control channel resources.

24. The method of claim 23, further comprising:
transmitting, to the UE, the plurality of SPS configurations, including the first SPS configuration and the second SPS configuration.

25. The method of claim 23, wherein selecting the set of control channel resources comprises:
comparing the number of acknowledgment information bits to a threshold number of bits; and
selecting the set of control channel resources from among the plurality of sets of control channel resources based at least in part on the comparing.

26. The method of claim 25, wherein receiving the acknowledgment information bits comprises:
identifying a control channel format to use to receive the acknowledgment information bits; and
receiving the acknowledgment information bits from the UE according to the identified control channel format using the selected set of control channel resources.

27. The method of claim 25, wherein the transmitted configuration further identifies the threshold number of bits, and wherein the threshold number of bits comprises two bits.

28. The method of claim 25, wherein the acknowledgment information bits are received based at least in part on a dynamic acknowledgment codebook comprising the acknowledgment information bits in an order that is based at least in part on when each of a plurality of downlink data are transmitted for each of the plurality of SPS configurations, a component carrier that each of the plurality of downlink data are transmitted on, a slot in which each of the plurality of downlink data are transmitted, a semi-static acknowledgment codebook, or a combination thereof.

29. An apparatus for wireless communication at a user equipment (UE), comprising:
a processor,
memory coupled with the processor; and
instructions stored in the memory and executable by the processor to cause the apparatus to:
receive a configuration identifying a plurality of sets of control channel resources for a plurality of semi-persistent scheduling (SPS) configurations, the plurality of sets of control channel resources including at least one set corresponding to multiple of the plurality of SPS configurations;
receive a first downlink data according to a first SPS configuration of the plurality of SPS configurations and a second downlink data according to a second SPS configuration of the plurality of SPS configurations, wherein acknowledgment information for the first downlink data and the second downlink data are scheduled to be transmitted during a slot;
select, based at least in part on a number of acknowledgment information bits for the first downlink data and the second downlink data, a set of control channel resources of the plurality of sets of control channel resources identified by the received configuration; and
transmit the acknowledgment information bits to the base station using the selected set of control channel resources.

* * * * *